United States Patent
Maeda

(10) Patent No.: US 7,476,998 B2
(45) Date of Patent: Jan. 13, 2009

(54) MAGNETIC DRIVE DEVICE

(75) Inventor: Toshinari Maeda, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 547 days.

(21) Appl. No.: 11/185,983

(22) Filed: Jul. 21, 2005

(65) Prior Publication Data

US 2007/0273217 A1 Nov. 29, 2007

(30) Foreign Application Priority Data

| Jul. 21, 2004 | (JP) | ............................. 2004-213170 |
| Mar. 24, 2005 | (JP) | ............................. 2005-085313 |
| Jul. 8, 2005 | (JP) | ............................. 2005-200937 |

(51) Int. Cl.
*H02K 1/00* (2006.01)

(52) U.S. Cl. .................. 310/181; 310/154.02

(58) Field of Classification Search ................. 310/181, 310/152, 154.01, 154.02
See application file for complete search history.

(56) References Cited

U.S. PATENT DOCUMENTS

| 3,370,189 A * | 2/1968 | Haydon et al. ............. 310/49 R |
| 6,069,431 A * | 5/2000 | Satoh et al. ................... 310/260 |
| 6,342,746 B1 * | 1/2002 | Flynn .......................... 310/181 |

FOREIGN PATENT DOCUMENTS

| JP | 54-126917 | 10/1979 |
| JP | 10-066364 | 3/1998 |
| JP | 2002-090473 | 3/2002 |

\* cited by examiner

*Primary Examiner*—Dang D Le
(74) *Attorney, Agent, or Firm*—Westerman, Hattori, Daniels & Adrian, LLP.

(57) ABSTRACT

A magnetic drive apparatus including a rotor with a rotor magnetic flux generator, a stator with a stator magnetic flux generator and stator magnetic paths, and a magnetic flux controller provided in intermediate positions in said stator magnetic paths for controlling a magnetic flux flowing through the stator magnetic paths.

18 Claims, 55 Drawing Sheets

Magnetic flux generator

Magnetic flux generator

Magnetic flux generator

Magnetic flux generator

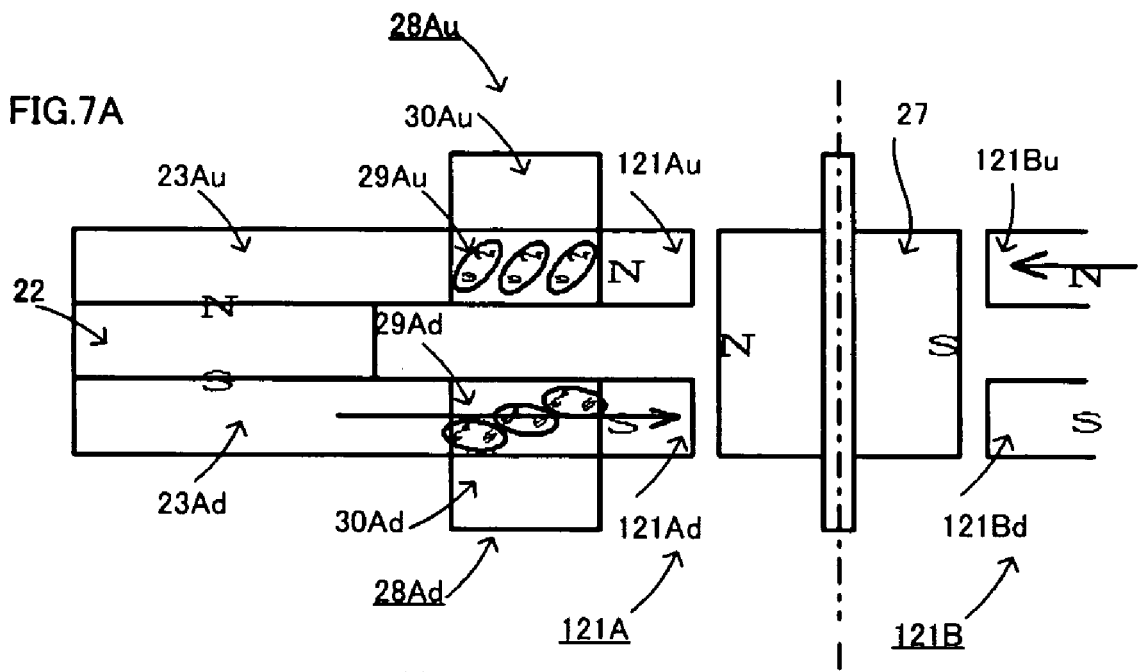
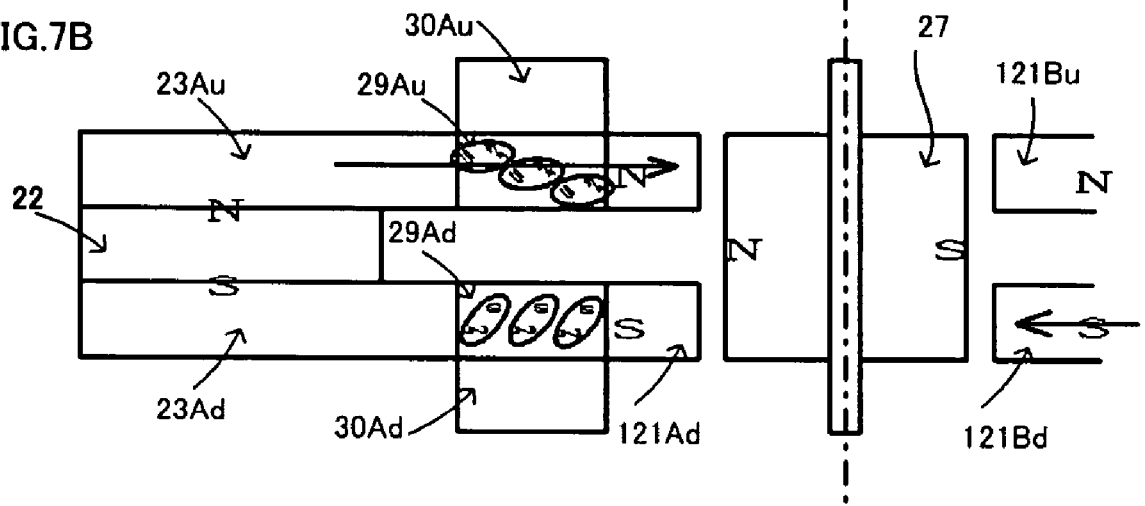

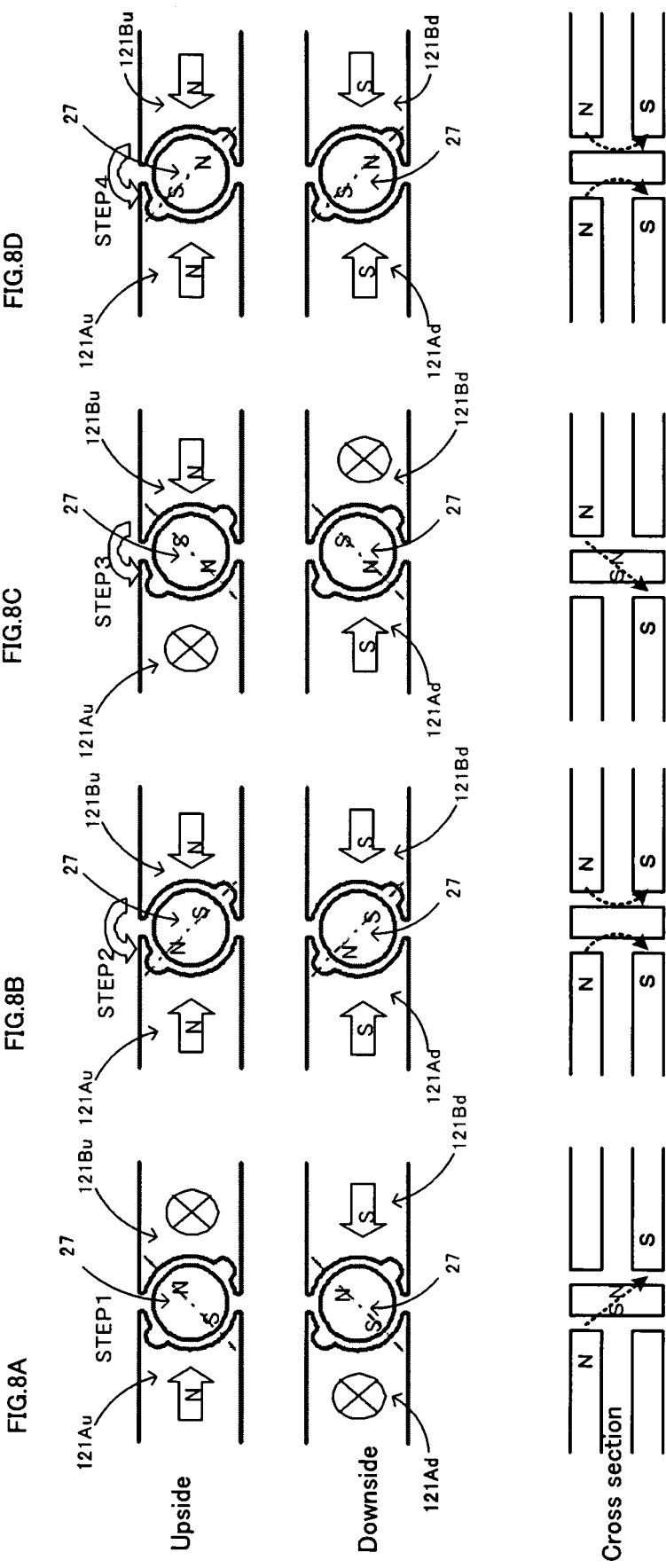

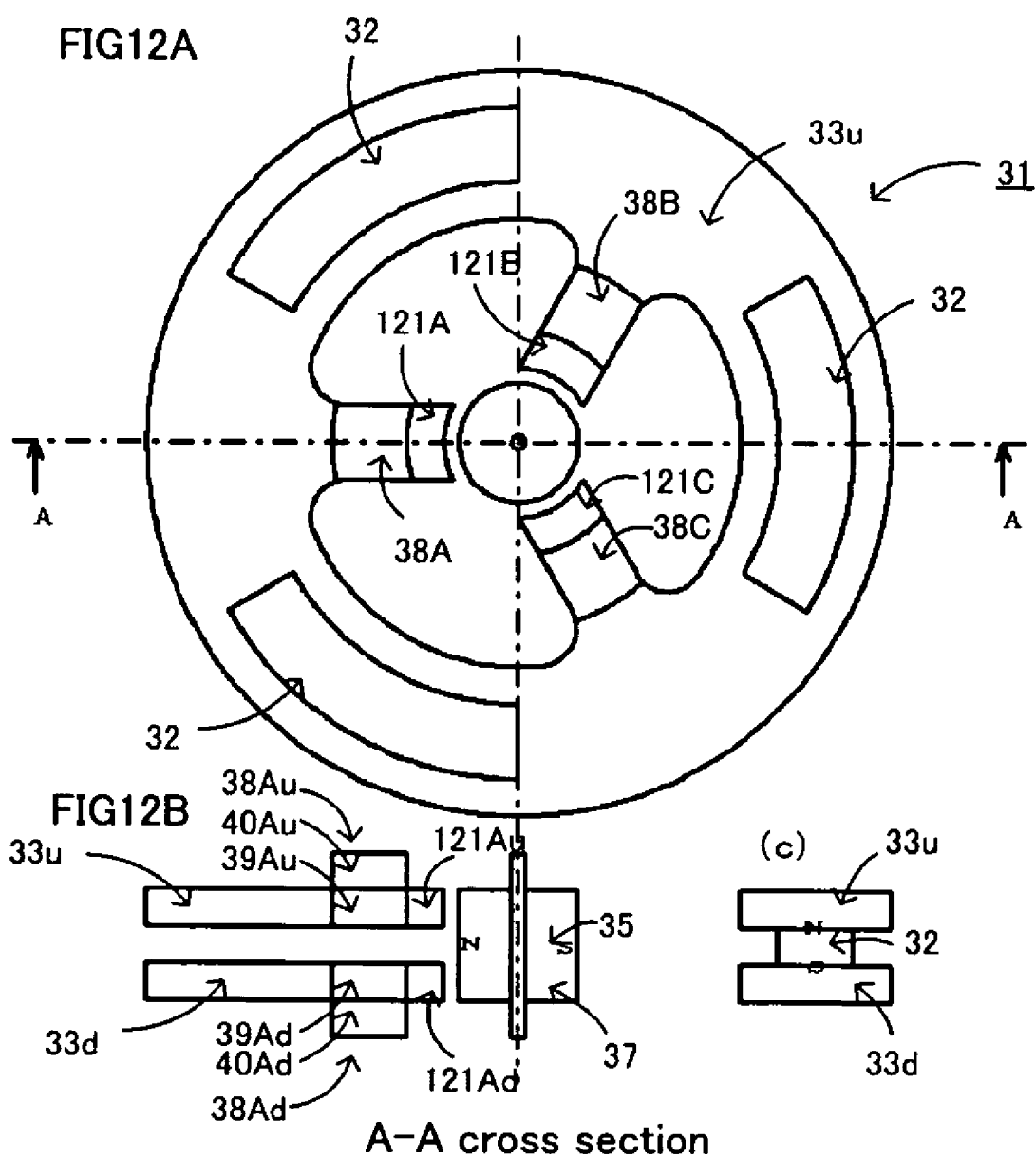

FIG. 13A 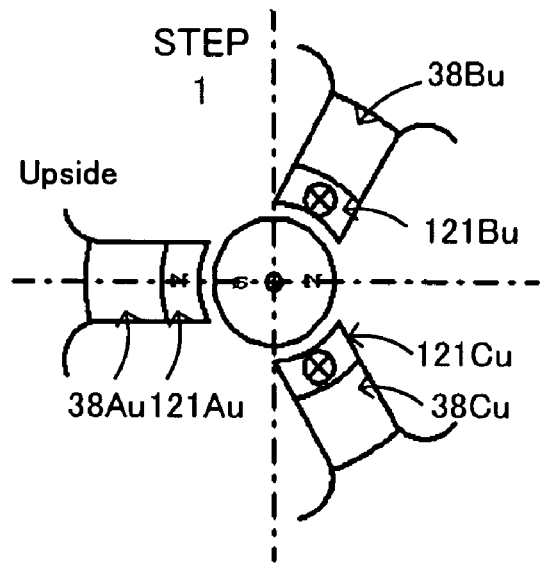 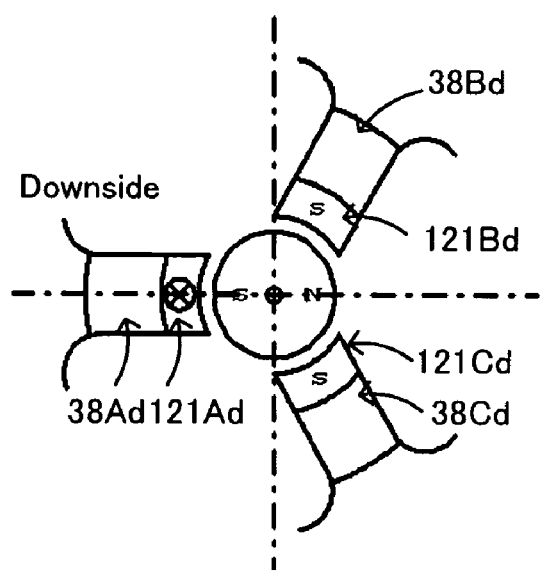
FIG. 13B 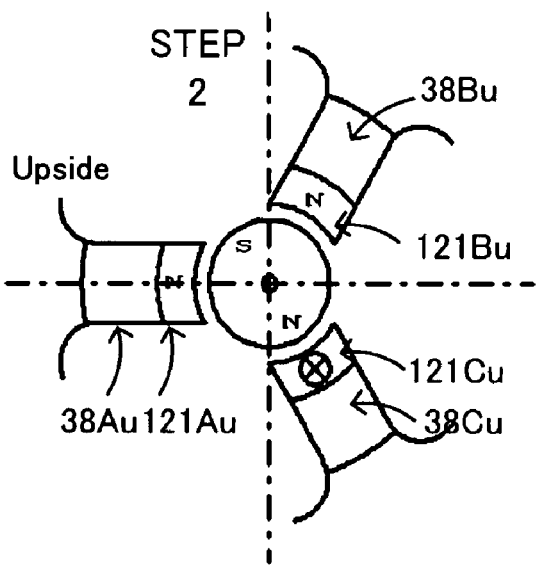 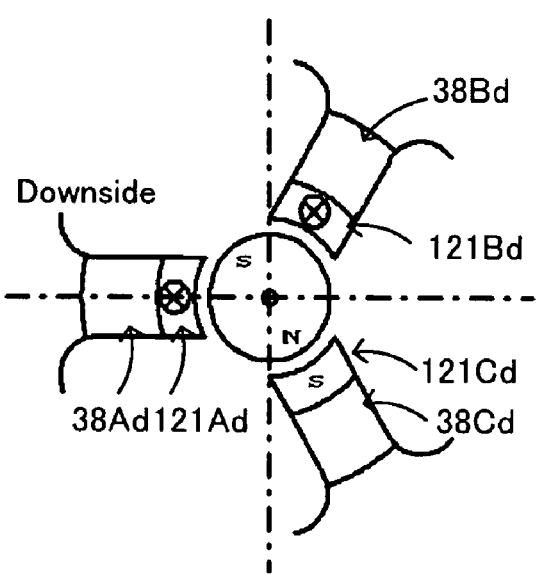

FIG. 14A
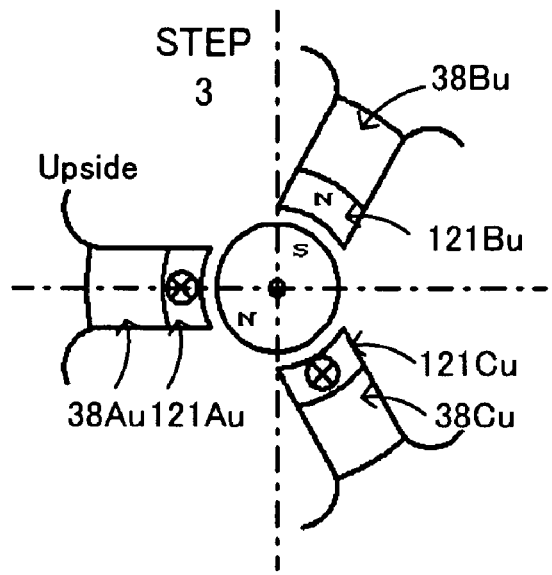
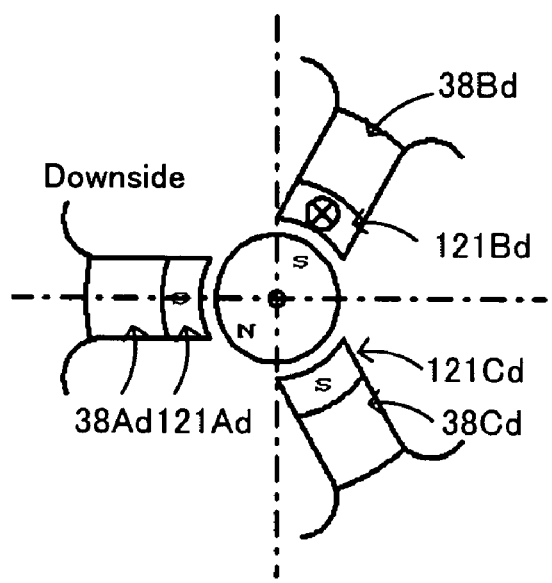
FIG. 14B
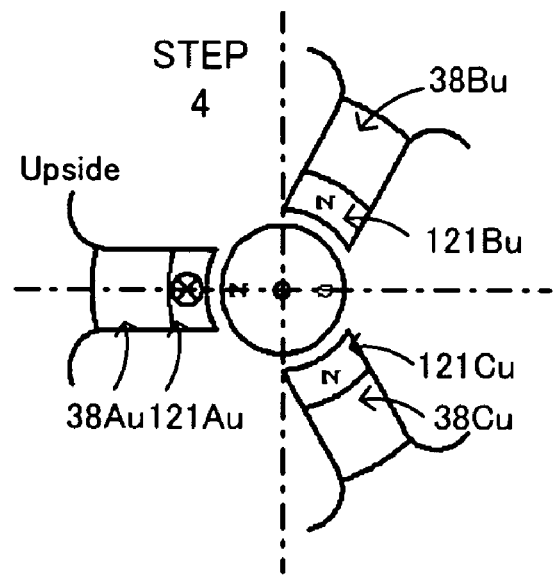
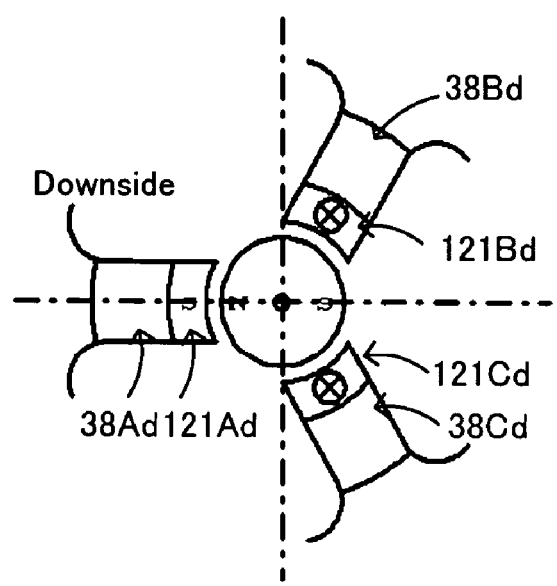

FIG. 15A
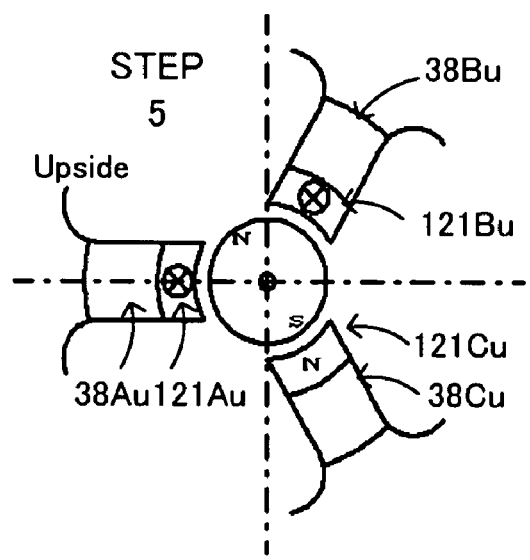
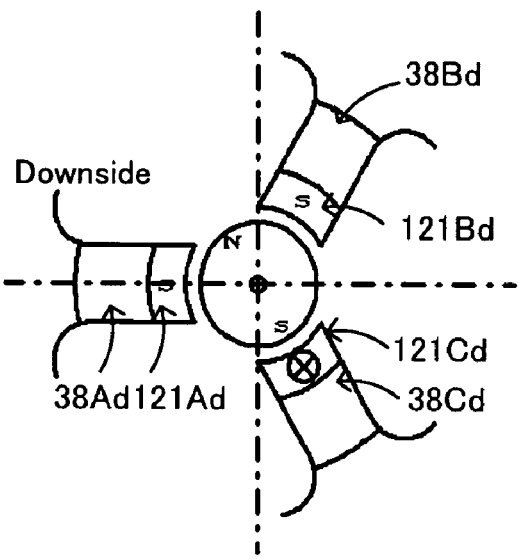
FIG. 15B
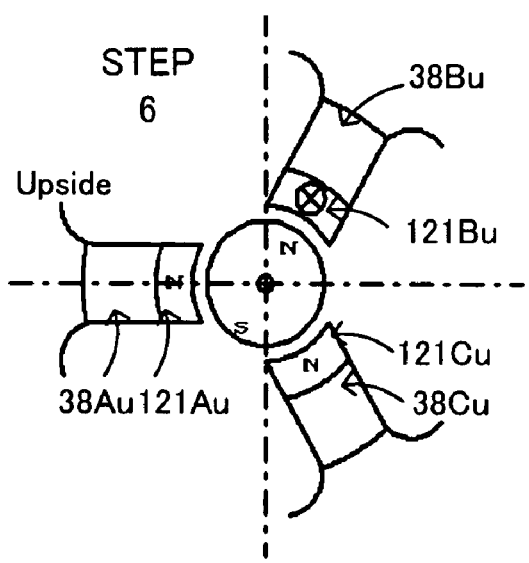
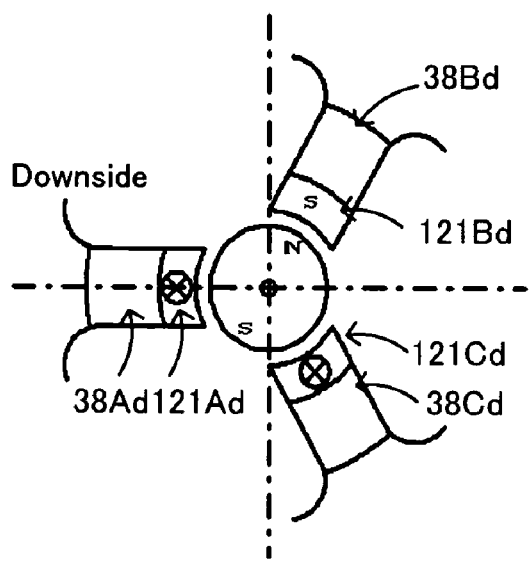

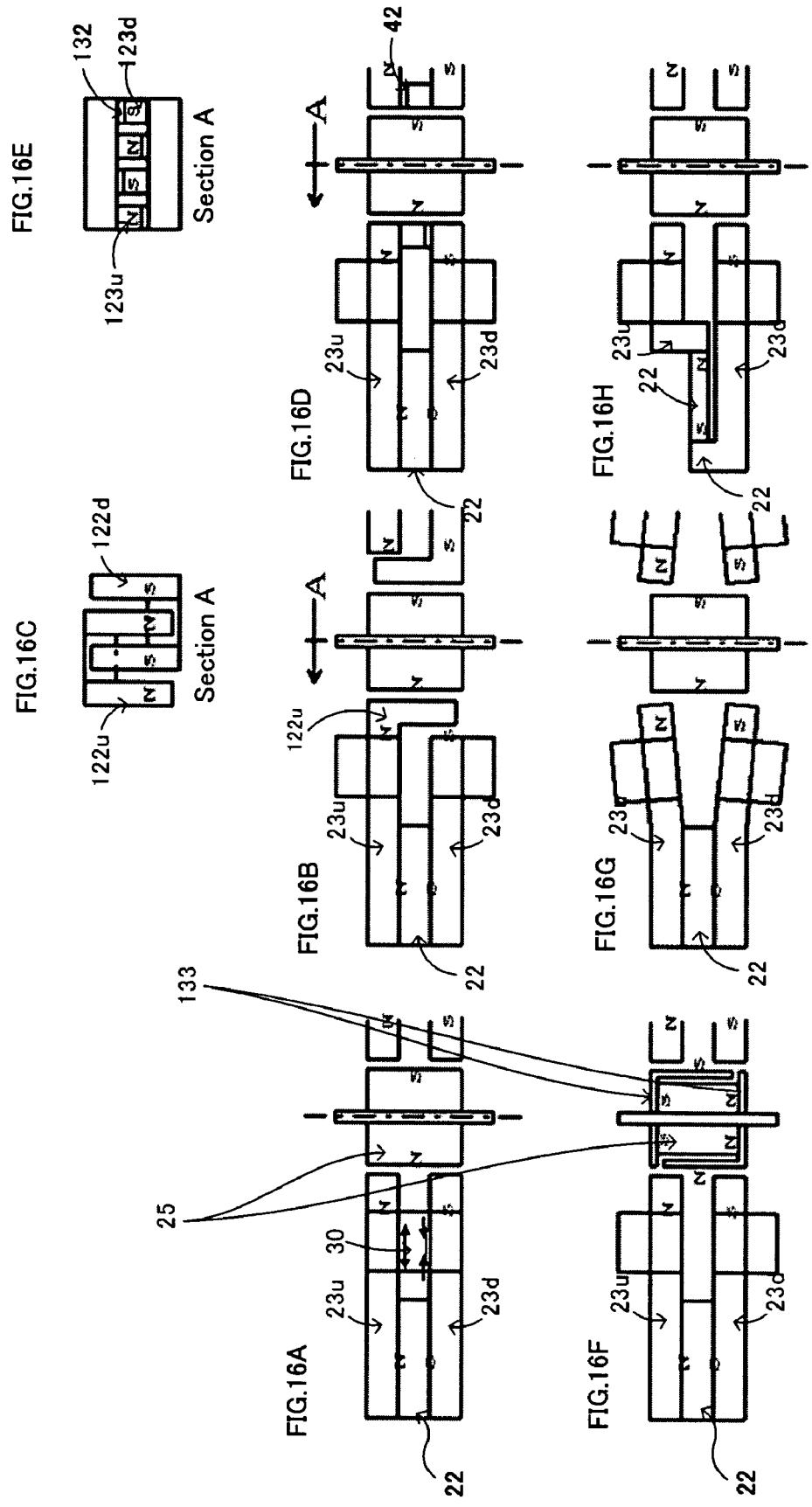

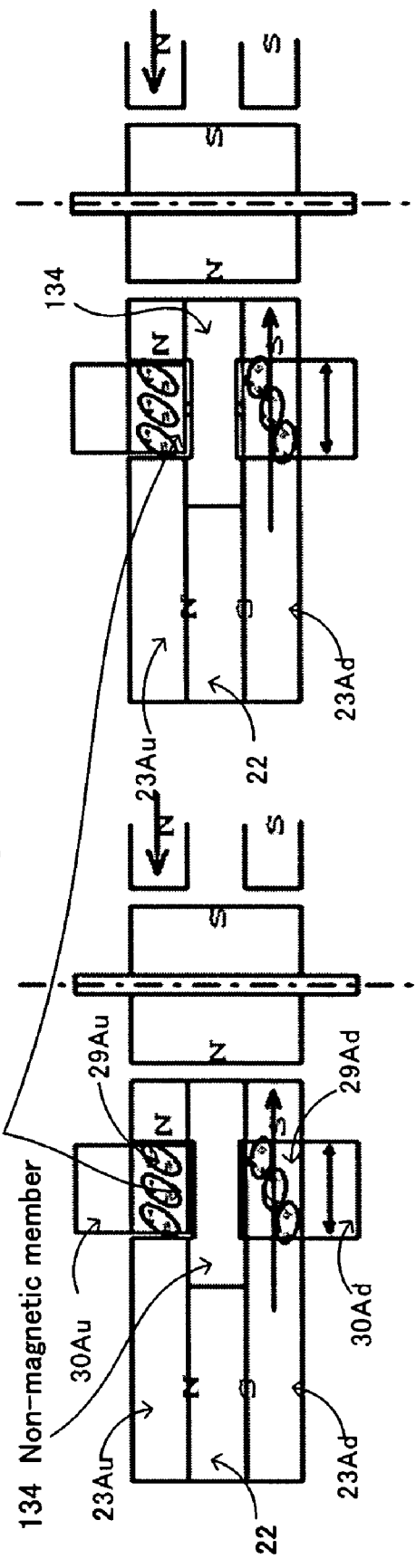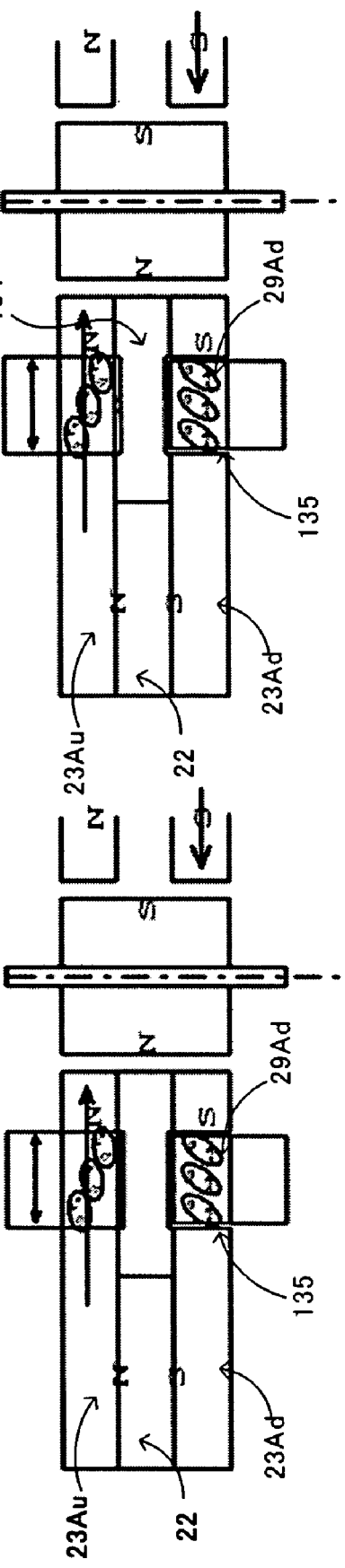

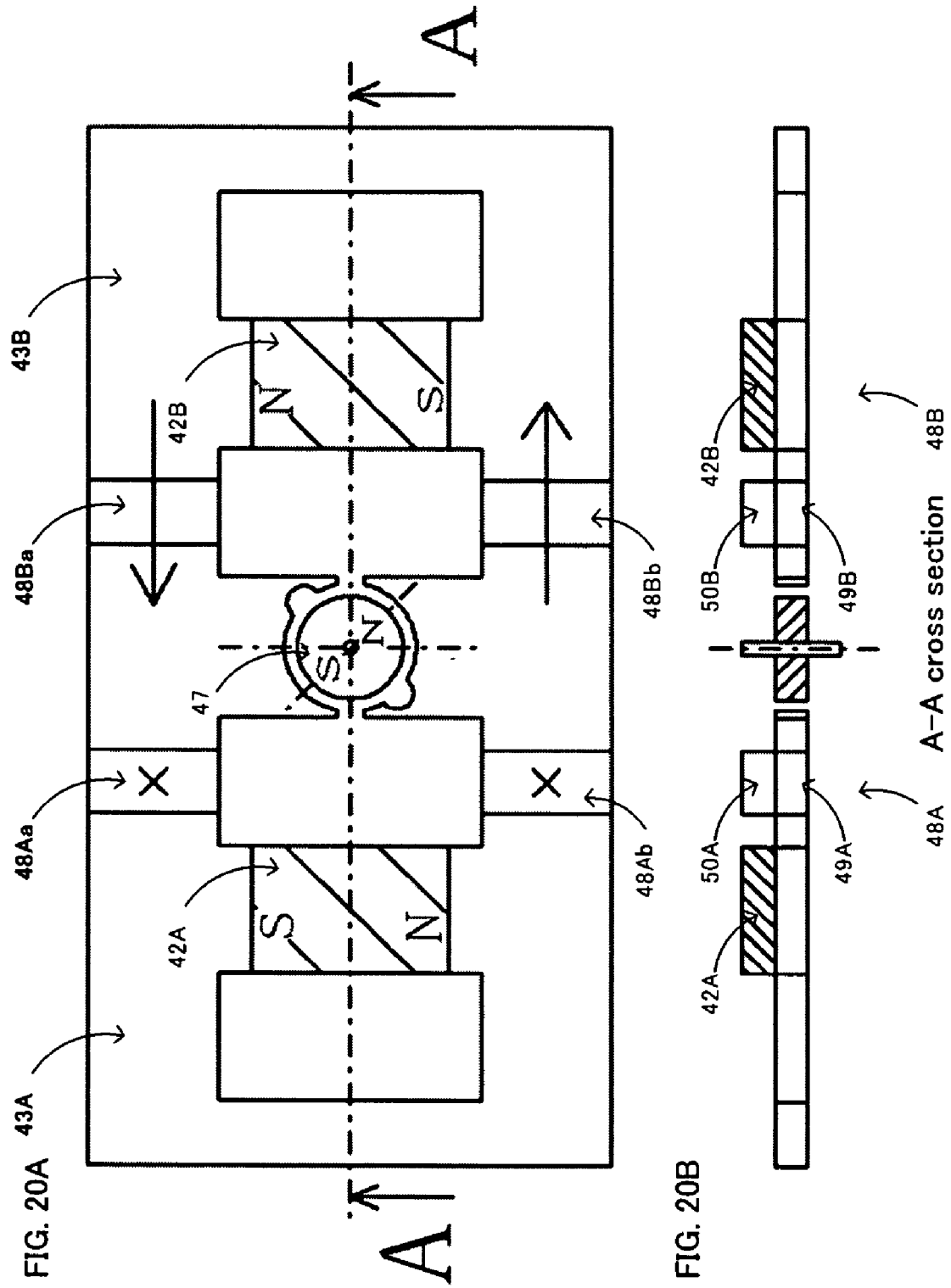

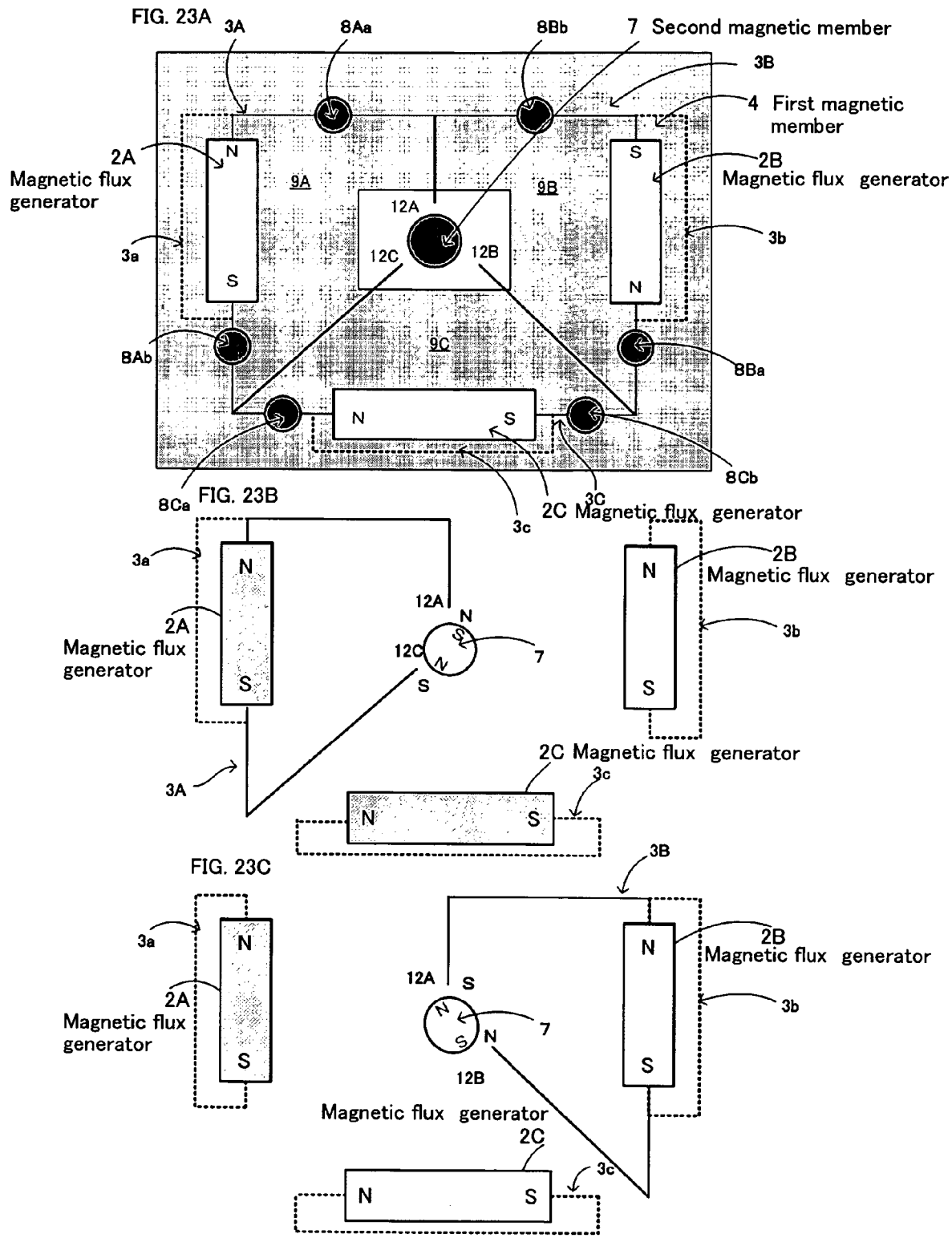

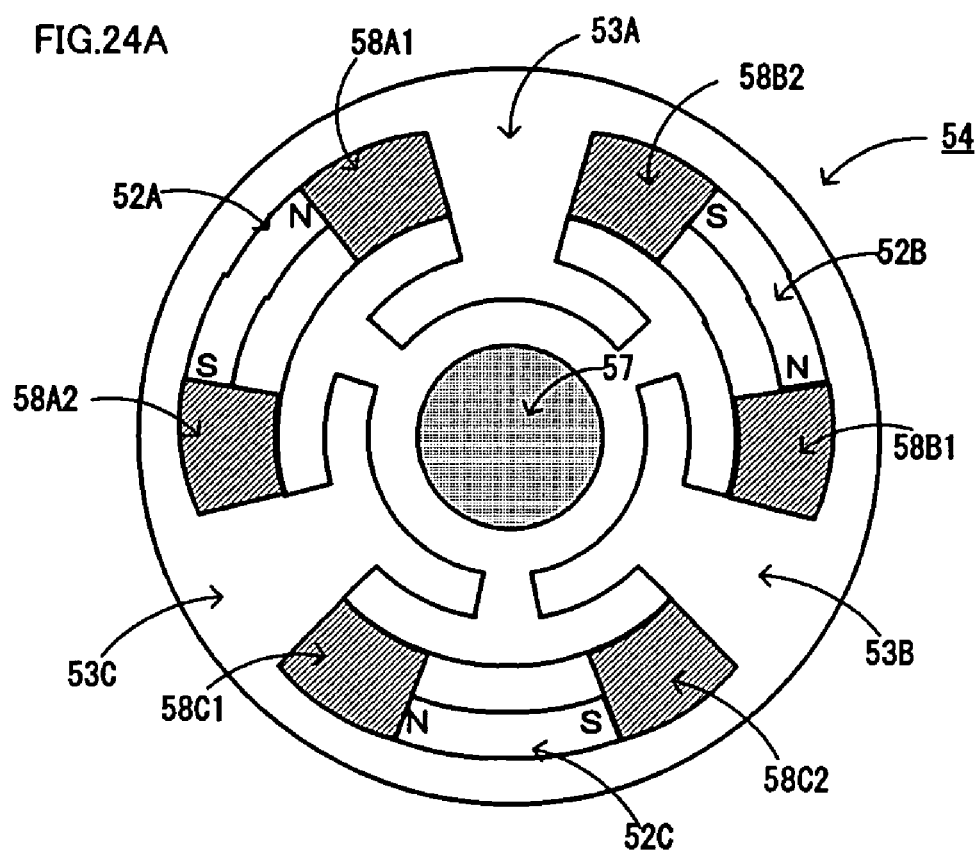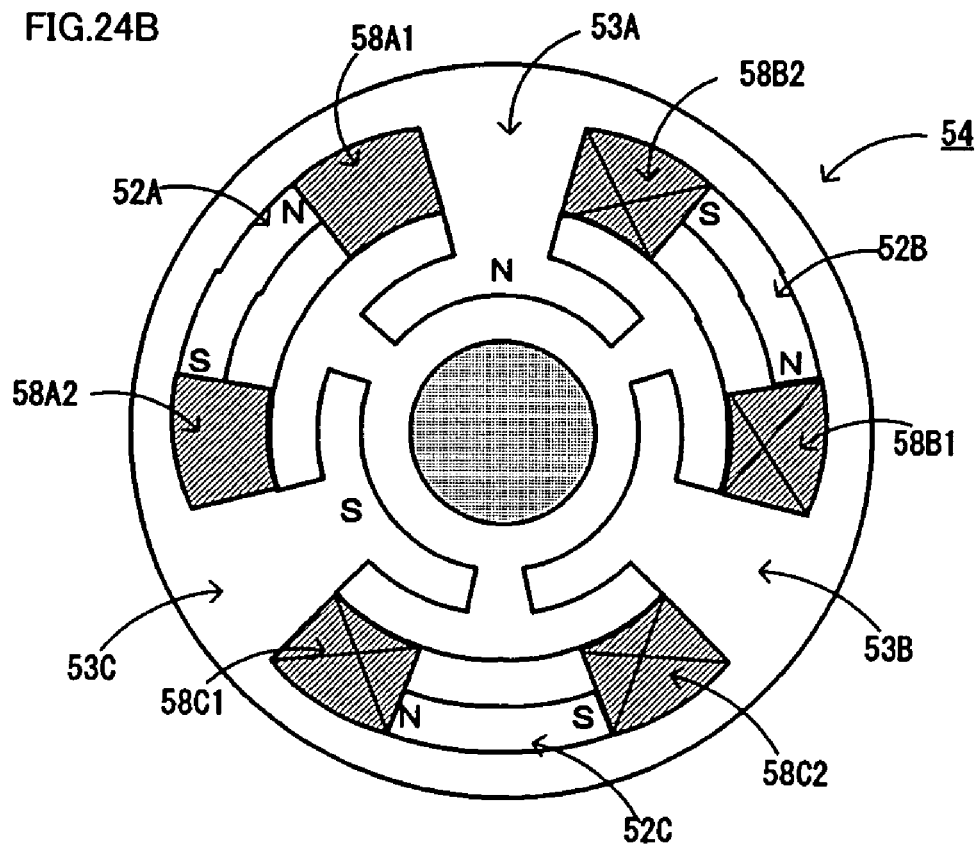

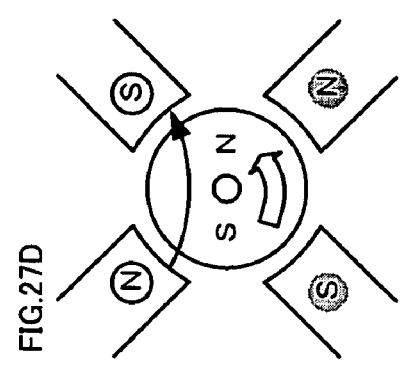
FIG.27A
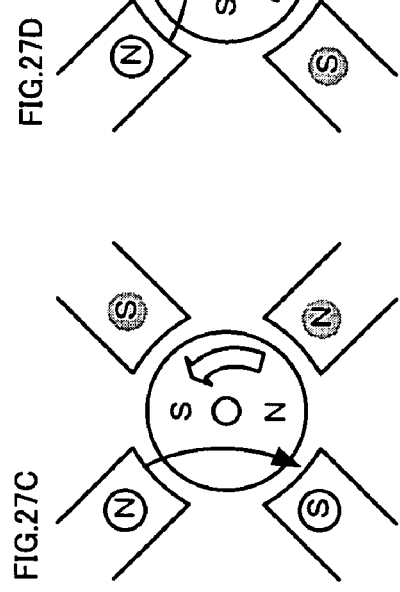
FIG.27B
FIG.27C
FIG.27D
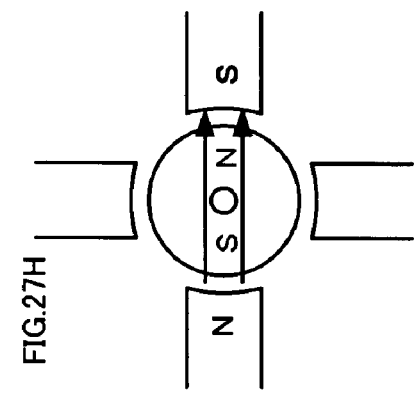
FIG.27H
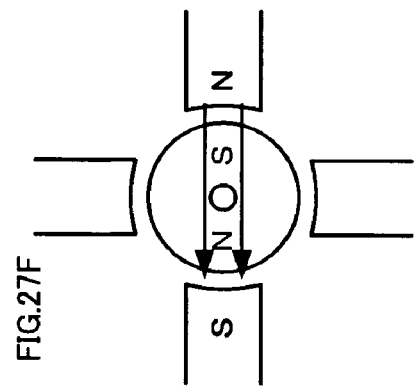
FIG.27G
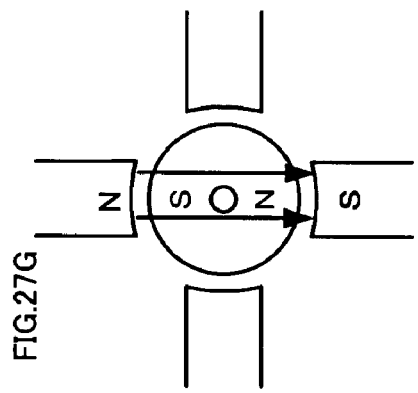
FIG.27F
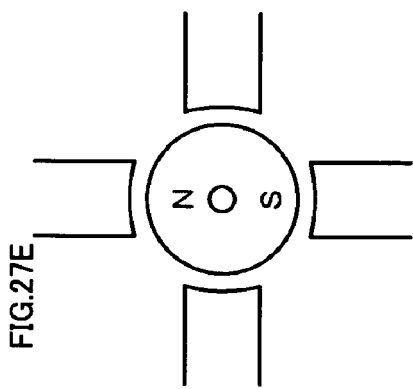
FIG.27E
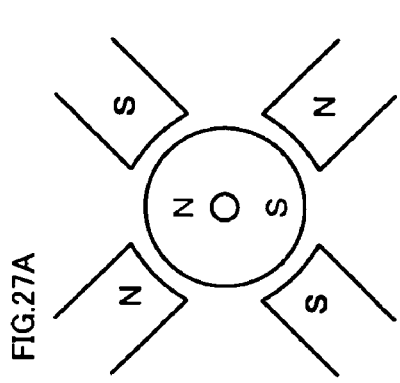
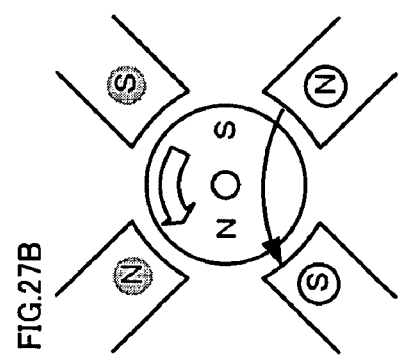

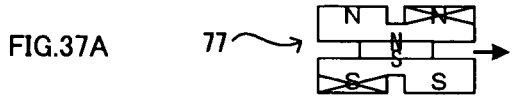
FIG.37A
FIG.37B
FIG.37C
FIG.37D
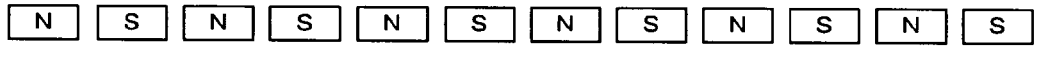
FIG.37E
FIG.37F

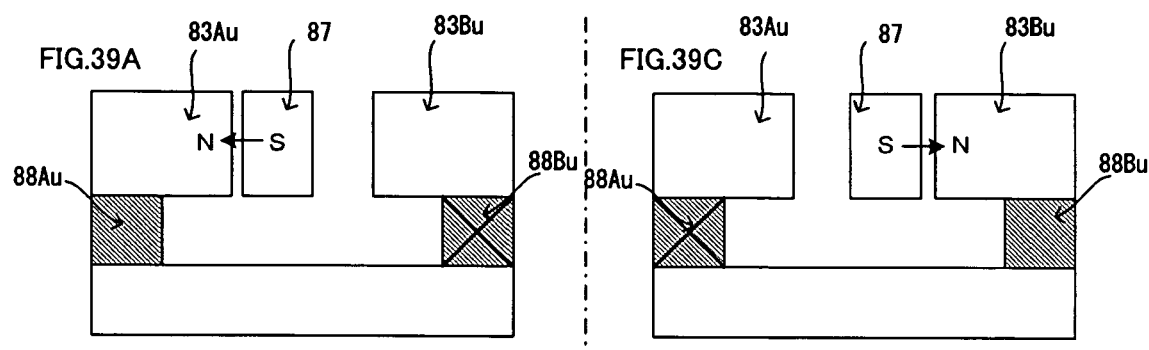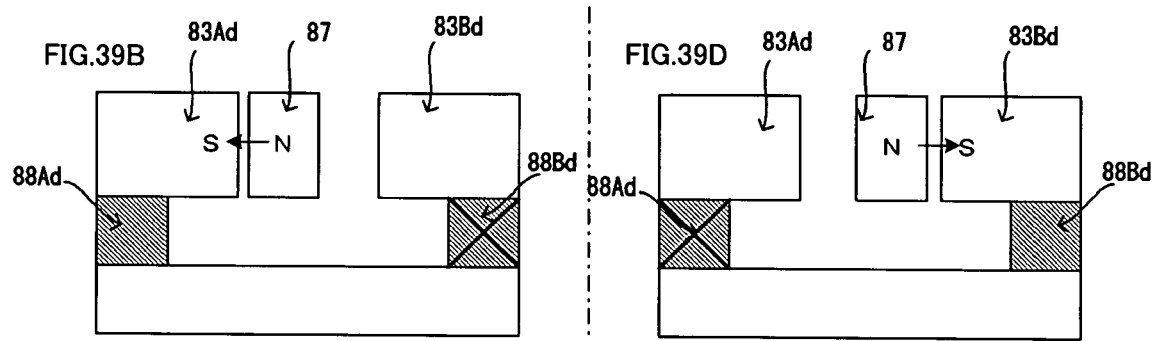

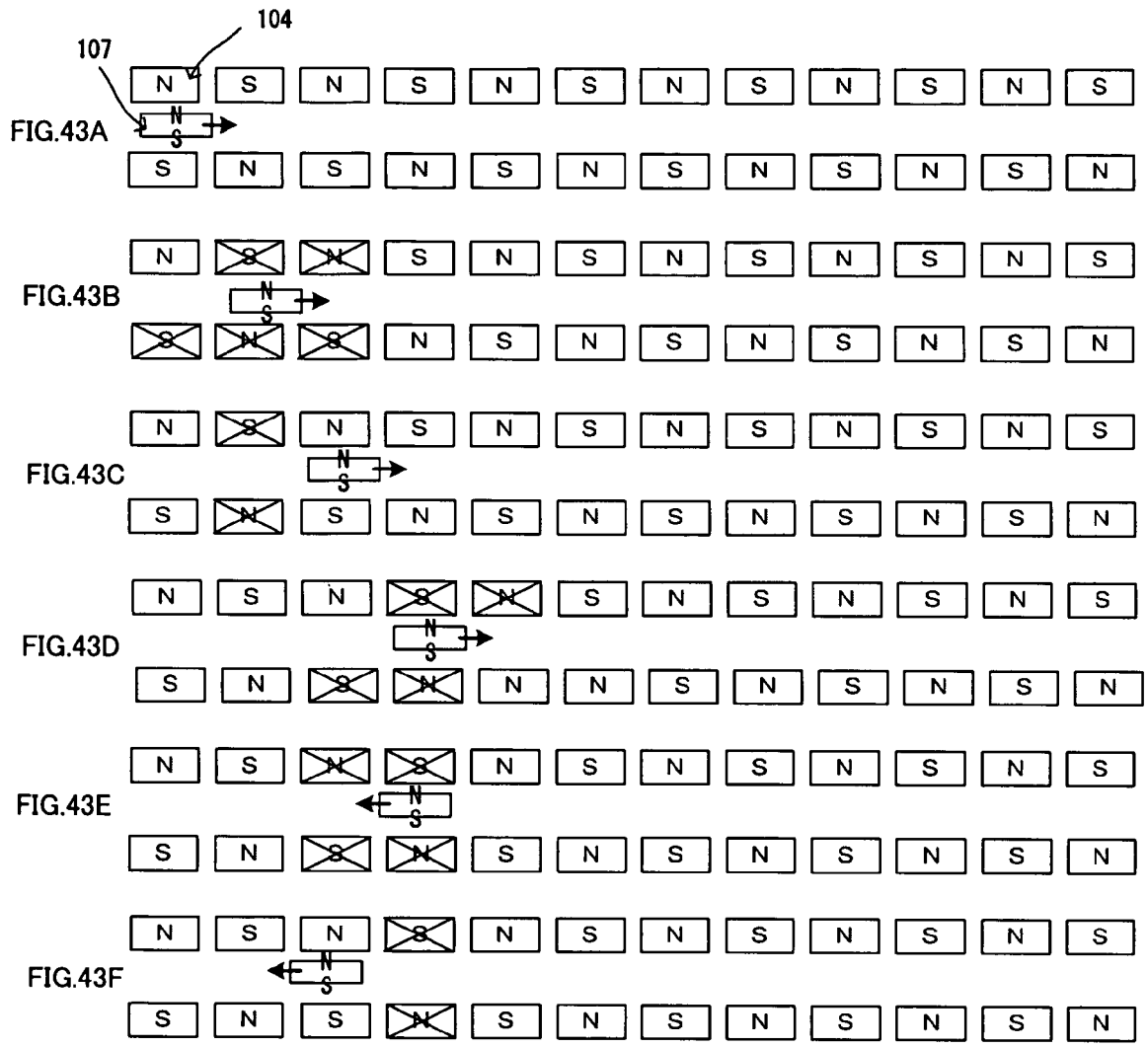

MAGNETIC DRIVE DEVICE

BACKGROUND OF THE INVENTION

1. Field of the Invention

The present invention relates to a magnetic drive apparatus, and more particularly to a driving apparatus that does not require driving force through coils.

2. Description of the Related Art

In a driving apparatus using magnetic force, an electric current is usually supplied to the excitation coils to generate magnetic force that rotates the rotor magnets. When this driving apparatus is used, for example, as the driving source of a clock, a stepping motor with the configuration described above is driven intermittently based on the reference signal generated by a quartz oscillator (for example, see Japanese Patent Laid-Open Publication No. 2002-90473).

One of the problems with a magnetic drive apparatus, in which the excitation coils described above are used, is that it is difficult to provide high energy efficiency because there is a copper loss generated when the driving current flows through the excitation coils and therefore difficult to reduce the power consumption.

The size of a magnetic drive apparatus, in which excitation coils are used, is limited by the coil diameter. Therefore, a compact, low profile magnetic drive apparatus requires that the coil diameter be small. Therefore, another problem in this case is that, because a smaller coil diameter results in a reduction in the torque, the magnetic drive apparatus must be larger enough to ensure a predetermined torque.

As described above, a conventional magnetic drive apparatus has problems caused by excitation coils used in the driving part; for example, the problems include the limitation on the amount of magnetic flux due to power consumption and magnetic saturation and the limitation on size reduction and low-profile design due to the coil diameter.

In view of the problems described above, a driving apparatus is proposed in which magnetic switching elements are used to open and close the flow of the magnetic flux of a permanent magnet into the stator (for example, Japanese Patent Laid-Open Publication No. Sho 54-126917).

As described above, a magnetic drive apparatus, in which excitation coils are used as the driving source, has problems caused by excitation coils used as the driving source, for example, large power consumption and the limitation on size reduction and low-profile design due to the coil diameter.

To solve this problem, Patent Document 2 discloses a driving method for on/off controlling the magnetic flux using magnetoresistance switching elements instead of the coil driving method. However, this driving method uses coils as the magnetic resistance switching elements and, therefore, does not give the full effect of power saving, size reduction, and low-profile design. Even if magnetic resistance switching elements that do not use coils are used, the flow of the magnetic flux to the rotor is switched simply in two directions because whether the magnetic flux of a permanent magnet is supplied to the stator is on/off controlled in the configuration proposed in Patent Document 2. The problem with this magnetic flux switching is that it is difficult to change the driving direction freely and to perform smooth driving control.

Another problem is that, because the magnetic flux is not supplied to the rotor but is returned to the permanent magnet when the magnetic flux is switched, the magnetic flux does not contribute to the driving of the rotor and thus does not fully achieve high driving efficiency.

OBJECTS AND SUMMARY OF THE INVENTION

Therefore, it is an object of the present invention to solve the problems in the prior art and to configure a driving apparatus that does not require excitation coils in a magnetic drive apparatus.

It is another object of the present invention to eliminate the need for excitation coils to reduce energy consumption, which is caused by a copper loss of the excitation coils, for lower power consumption and to provide a small, low profile driving apparatus which does not depend on the coil diameter.

It is still another object of the present invention to enable the movement direction to be changed freely and to increase the holding torque for better disturbance resistance.

It is still another object of the present invention to smoothly control the driving and to increase the driving efficiency.

A magnetic drive apparatus according to the present invention uses a magnetic flux generator, such as a permanent magnet, instead of excitation coils as the driving source. A magnetic drive apparatus using excitation coils can switch the poles by switching the direction of electric current flowing to the excitation coils, while a magnetic drive apparatus using a magnetic flux generator such as a permanent magnet cannot switch the magnetic poles from the positive pole to the negative pole or from the negative pole to the positive pole by changing the direction electric current as for the excitation coils. Therefore, the magnetic drive apparatus according to the present invention implements a driving apparatus that switches the balance between positive and negative magnetic forces appearing at the magnetic pole ends by controlling the flow of the magnetic flux from the magnetic flux generator and thereby drives the magnetic members.

A magnetic drive apparatus according to the present invention comprises a first magnetic member and a second magnetic member each having a magnetic flux generator.

The first magnetic member forms a magnetic circuit via magnetic paths connecting both magnetic poles of the magnetic flux generator of the first magnetic member. The magnetic circuit configures a magnetic bridge using branch paths provided on both magnetic poles of the magnetic flux generator and a plurality of magnetic pole ends at branch ends of the branch paths. The bridge has magnetic flux control means for controlling a flow of a magnetic flux flowing through the magnetic circuit.

The second magnetic member is arranged between the plurality of magnetic pole ends. The magnetic flux control means controls magnetic characteristics of the magnetic paths to control the flow of the magnetic flux flowing to the magnetic pole ends in order to switch a balance between positive and negative magnetic forces appearing at the magnetic pole ends. The first magnetic member and the second magnetic member are relatively moved and driven by switching the balance between positive and negative magnetic forces to change a direction of the magnetic flux flowing to the second magnetic member.

The magnetic drive apparatus according to the present invention controls the flow of a magnetic flux from the magnetic flux generator by controlling the magnetic characteristics of the magnetic path using the magnetic flux control means, thus eliminating the need for excitation coils.

The magnetic drive apparatus according to the present invention can take a plurality of configuration modes for controlling the flow of a magnetic flux. The magnetic drive apparatus can also be applied to various motion modes such as the rotational motion, straight motion, and switching motion.

The flow of a magnetic flux is controlled by switching a bridge-configuration magnetic circuit in a first embodiment of the magnetic drive apparatus according to the present invention, while the flow of a magnetic flux is controlled by selecting from a plurality of magnetic circuits in a second embodiment.

A magnetic drive apparatus in the first embodiment comprises a rotor having a rotor magnetic flux generator; a stator having a stator magnetic flux generator and stator magnetic paths; and magnetic flux control means provided in intermediate positions in the stator magnetic paths for controlling a magnetic flux flowing through the stator magnetic paths. The stator magnetic paths divide both poles of the stator magnetic flux generator into multiple branches with each branch end being a magnetic pole end of a single magnetic pole that is magnetically separated, and the magnetic pole ends are arranged around the rotor at a predetermined angle.

The magnetic flux control means controls magnetic characteristics of the stator magnetic paths to control a flow of the magnetic flux flowing to the magnetic pole ends in order to switch a balance between positive and negative magnetic forces appearing at the magnetic pole ends. Switching the balance between positive and negative magnetic forces changes a direction of the magnetic flux flowing to the rotor and causes the rotor to rotate with respect to the stator.

In this case, the magnetic flux direction between a pair of magnetic poles of the rotor and the magnetic flux direction between a pair of magnetic poles of the set are arranged so that they have components orthogonal each other. The positional relation between both magnetic flux directions is not limited to the orthogonal relation but may be any positional relation at least generating orthogonal components. Such a relation generates driving force for driving the rotor.

In the first embodiment, the spatial arrangement of the stator may be a three-dimensional arrangement or a two-dimensional arrangement.

In the three-dimensional arrangement, the magnetic pole ends of the same pole are each arranged in one of different planes to form a laminated configuration. Each of magnetic fluxes passing between the magnetic pole ends forms a magnetic path in one of different planes via the rotor.

In the two-dimensional arrangement, the magnetic pole ends are arranged in the same plane two-dimensionally. A magnetic flux passing between the magnetic pole ends forms a magnetic path via the same plane as that of a magnetic flux between a magnetic pole pair of the rotor.

The two-dimensional arrangement can be implemented by crossing a part of the stator magnetic paths, one on top of the other, and arranging the magnetic pole ends of the stator around the rotor in the same plane, with the magnetic pole ends of two magnetic characteristics arranged alternately.

Next, a second embodiment of a magnetic drive apparatus according to the present invention comprises a rotor and a stator as in the first embodiment. The rotor has a rotor magnetic flux generator. The stator has a plurality of sets each of which includes a stator magnetic flux generator, stator magnetic paths, and magnetic flux control means provided in intermediate positions in the stator magnetic paths for controlling a magnetic flux flowing through the stator magnetic paths. The stator magnetic paths divide both magnetic poles of the stator magnetic flux generator into multiple branches with each branch end being a magnetic pole end of a single magnetic pole that is magnetically separated. The magnetic pole ends are arranged around the rotor at a predetermined angle.

The magnetic flux control means controls magnetic characteristics of the stator magnetic paths to control a flow of the magnetic flux flowing to the magnetic pole ends in order to switch a balance between positive and negative magnetic forces appearing at the magnetic pole ends. Switching the balance between positive and negative magnetic forces changes a direction of the magnetic flux flowing to the rotor and causes the rotor to rotate with respect to the stator.

The magnetic drive apparatus according to the present invention can have a configuration in which a plurality of the rotors and the stators are arranged linearly, two-dimensionally, or on faces of a three-dimensional solid. In this configuration, the stators share a stator magnetic flux generator between neighboring rotors connected by branched stator magnetic paths.

In the first and second embodiments, the magnetic pole ends around the rotor are arranged at an equal interval.

In the first and second embodiments, the magnetic flux control means comprises a variable magnetic characteristics member whose magnetic characteristics are variable and magnetic characteristics control means for controlling magnetic characteristics of the variable magnetic characteristics member. The magnetic characteristics control means is next to, embedded in, or mixed with the variable magnetic characteristics member.

The variable magnetic characteristics member has the magnetic characteristics changed according to one of a stress, a temperature, and a magnetic field. The magnetic characteristics control means changes one of the stress, temperature, and magnetic field to change the magnetic characteristics of the variable magnetic characteristics member and thereby changes the amount of magnetic flux flowing through the magnetic circuit. The variable magnetic characteristics member is one of an anisotropic magnetic material, a magnetostrictive material, a magnetic material mixed with magnetic powder using resin as a binder, a compound material produced by mixing magnetic powder and piezoelectric powder using resin as a binder, and a thermal magnetic material.

The magnetic characteristics control means is one of a stress application element that applies stress to the variable magnetic characteristics member to control magnetic characteristics of the variable magnetic characteristics member, a temperature application element that changes a temperature of the variable magnetic characteristics member to control magnetic characteristics of the variable magnetic characteristics member, and a magnetic field application element that changes a magnetic field of the variable magnetic characteristics member to control magnetic characteristics of the variable magnetic characteristics member.

The magnetic characteristics control means is characterized in that one of its physical states, that is, stress, temperature, and magnetic field, varies according to the control signal. The control signal controls the physical amount of the stress, temperature, and magnetic field of the magnetic characteristics control means to control the magnetic characteristics of the variable magnetic characteristics member and, thereby, controls the amount of magnetic flux in the magnetic circuit.

The variable magnetic characteristics member is a magnetostrictive member whose magnetic characteristics vary according to an application of stress, and the magnetic characteristics control means is a stress application element that surrounds the magnetostrictive member and applies stress to the magnetostrictive member.

In the first and second embodiments, the magnetic drive apparatus further comprises movement direction regulation means for determining the movement direction of the second magnetic member. The movement direction regulation means determines the movement direction by causing asymmetry in magnetic characteristics around the second magnetic member.

One mode of the movement direction regulation means is notches formed on the magnetic pole ends of the first magnetic member. The notches determine the movement direction by making the magnetic characteristics asymmetric with respect to the second magnetic member.

Another mode of the movement direction regulation means comprises a variable magnetic characteristics material provided around the second magnetic member and magnetic characteristics control means for controlling magnetic characteristics of the variable magnetic characteristic material. The magnetic characteristics control means selectively changes the magnetic characteristics of the variable magnetic characteristics material to make the magnetic characteristics asymmetric with respect to the second magnetic member.

In the first and second embodiments, the magnetic drive apparatus further comprises magnetic flux detection means that detects an intensity of a magnetic flux flowing through a stator magnetic path leading to the magnetic pole ends. The magnetic flux detection means detects a distribution of a magnetic flux flowing from the magnetic pole ends to the second magnetic member. The magnetic flux detection means, which is an induction coil or a magnetic sensor, is provided next to, or embedded in, the stator magnetic path.

The magnetic drive apparatus further comprises a movement regulation processing unit for determining whether to relatively move the first magnetic member and the second magnetic member based on a detection signal from the magnetic flux detection means.

The magnetic drive apparatus further comprises magnetic flux adjustment means for adjusting the balance of the magnetic flux in stator magnetic paths at no-operation time based on a detection signal from the magnetic flux detection means. The magnetic flux adjustment means adjusts the magnetic flux balance in the magnetic paths so that the torque balance or the rotational speed change becomes constant. The magnetic flux adjustment means may also act as the magnetic characteristics control means.

A third embodiment of a magnetic drive apparatus according to the present invention controls the flow of a magnetic flux by combining the switching of a bridge-configuration magnetic circuit and the selection and switching of a plurality of magnetic circuits.

A magnetic drive apparatus in the third embodiment according to the present invention comprises a rotor and a stator. The rotor comprises a rotor magnetic flux generator. The stator comprises a plurality of magnetic units each comprising a set of a stator magnetic flux generator and stator magnetic paths through which a magnetic flux from the stator magnetic flux generator is sent to the rotor; a stator magnetic passage member provided between the plurality of magnetic units to form a magnetic circuit; and a plurality of magnetic flux control means provided in intermediate positions on the stator magnetic paths for controlling the magnetic flux flowing through the stator magnetic paths.

The plurality of magnetic units are laminated and magnetization directions of magnetic poles of the stator magnetic flux generators are set in the same direction in all magnetic units. The stator magnetic paths are arranged in the same plane.

In the third embodiment, a magnetization direction of magnetic poles of the rotor is made orthogonal to an axial direction of the rotor in one of two modes according to the relation between the magnetization direction of the magnetic poles of the stator magnetic flux generator and the axial direction of the rotor. In one mode, the magnetization direction of magnetic poles of the stator magnetic flux generator is set in the same direction as the axial direction of the rotor and, in another mode, those two directions are orthogonal.

The stator magnetic paths divide both poles of the stator magnetic flux generator into multiple branches with each branch end being a magnetic pole end of a single magnetic pole that is magnetically separated. The magnetic flux direction vector between the magnetic pole ends and the magnetic flux direction vector between a pair of magnetic poles of the rotor are set in the same plane.

Also in the third embodiment, the magnetic pole ends are arranged around the rotor at an interval of an equal angle.

The magnetic flux control means comprises a magnetostrictive member whose magnetic characteristics vary according to an application of stress and a stress application element that surrounds the magnetostrictive member and applies stress to the magnetostrictive member.

The magnetic flux control means and the stator magnetic flux generator are arranged in such a way that a magnetic flux direction between the magnetic pole pair of the magnetostrictive member and the magnetization direction of magnetic poles of the stator magnetic flux generator are in the same direction.

The magnetic flux control means are arranged so that the stress application direction of the stress application element and the direction between a pair of magnetic poles of the magnetostrictive member are set in the same direction so that compressive force can be applied to the magnetostrictive member.

One mode of the magnetic flux control means, in which the stress application element is longer than the magnetostrictive member in the stress application direction, further comprises a pair of soft magnetic members that hold both ends of the stress application element and the magnetostrictive member. This configuration increases the stress applied to the magnetostrictive member for greater magnetostriction.

Another mode of the magnetic flux control means further comprises a pair of soft magnetic members that hold both ends of the stress application element and the magnetostrictive member in the stress application direction and a nonmagnetic elastic body that pressurizes into the stress application direction via at least one of soft magnetic members. This pressurization eliminates a stress dead zone that is generated due to the initial characteristics of the magnetostrictive member.

A still another mode of the magnetic flux control means has a configuration in which a plurality of the magnetic flux control means are laminated into the stress application direction so that the magnetic flux control means can be driven all at a time or controlled individually. When the magnetic flux control means are driven all at a time, each stress application element can be driven at a lower voltage. When the magnetic flux control means are controlled individually, the flow of the magnetic flux can be controlled more flexibly.

In the embodiments of the magnetic drive apparatus according to the present invention, each of opposed surfaces of neighboring magnetic pole ends is shaped into a concave form. This decreases the magnetic resistance between the magnetic pole ends and the rotor, decreases the leakage flux, and increases the driving efficiency.

The magnetic drive apparatus according to the present invention has a configuration that does not require excitation coils.

The magnetic drive apparatus according to the present invention eliminates the need for excitation coils to reduce energy consumption due to a copper loss of the excitation coils and reduces power consumption.

The magnetic drive apparatus according to the present invention eliminates the need for excitation coils, making the driving mechanism compact and low profile regardless of the coil diameter.

The magnetic drive apparatus according to the present invention smoothly controls driving and increases driving efficiency.

The magnetic drive apparatus according to the present invention has movement direction regulation means for generating asymmetry in magnetic resistance around the magnetic member, making it possible to change the movement direction freely.

The magnetic drive apparatus according to the present invention has the rotor and the stator, each composed of a magnetic member, increases the magnetic latching force of the whole magnetic circuit and increases holding torque for better disturbance resistance.

BRIEF DESCRIPTION OF THE DRAWINGS

The foregoing and other objects and features of the invention will become apparent from the following description of preferred embodiments of the invention with reference to the accompanying drawings, in which:

FIG. 7 is a diagram showing the flow and the switching of a magnetic flux in the magnetic drive apparatus in the first embodiment of the present invention;

FIG. 8 is a diagram showing the driving operation performed by switching the flow of a magnetic flux in the magnetic drive apparatus in the first embodiment of the present invention;

FIG. 12 is a diagram showing a practical second configuration example of the magnetic drive apparatus in the first embodiment of the present invention;

FIG. 13 is a diagram showing the operation of a practical second configuration example of the magnetic drive apparatus in the first embodiment of the present invention;

FIG. 14 is a diagram showing the operation of a practical second configuration example of the magnetic drive apparatus in the first embodiment of the present invention;

FIG. 15 is a diagram showing the operation of a practical second configuration example of the magnetic drive apparatus in the first embodiment of the present invention;

FIG. 16 is a diagram showing a modified example of the magnetic drive apparatus in the first embodiment of the present invention;

FIG. 17 is a diagram showing a configuration example in which the length of the magnetic path is controlled in the magnetic drive apparatus in the first embodiment of the present invention;

FIG. 20 is a diagram showing a practical operation example of a magnetic drive apparatus in the second embodiment of the present invention;

FIG. 23 is a diagram showing a second configuration example in the second embodiment of the present invention;

FIG. 24 is a diagram showing a practical example of the second configuration in the second embodiment of the present invention;

FIG. 27 is diagram showing the flow of a magnetic flux when the rotor is driven;

FIG. 37 is a diagram showing the linear operation in a first mode of the present invention;

FIG. 39 is a diagram showing the switching operation in a first mode of the present invention;

FIG. 43 is a diagram showing the linear operation in a second mode of the present invention;

DETAILED DESCRIPTION OF THE PREFERRED EMBODIMENTS

A magnetic drive apparatus according to the present invention will be described below in detail.

First, the overview of the present invention will be described with reference to FIG. 1. A magnetic drive apparatus 1 according to the present invention drives a driving object by moving magnetic members with respect to one another. The magnetic members are moved by motions such as rotational motion, linear motion, twisting motion, and switching motion.

Figure 1A:
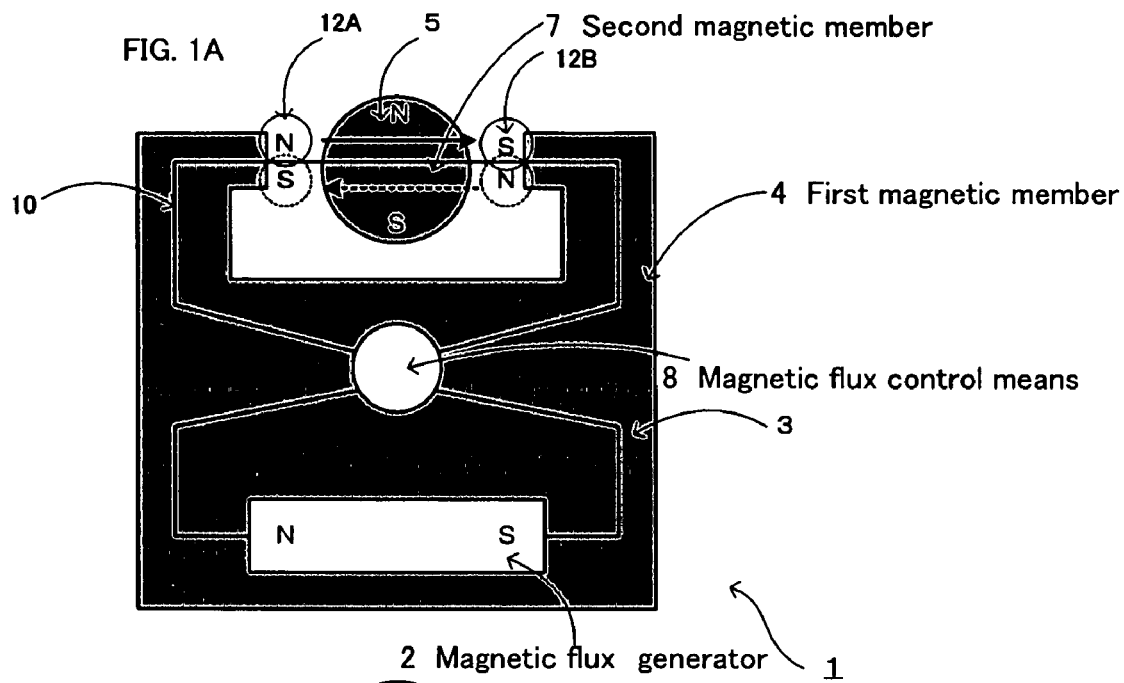
FIG. 1 is a diagram showing the overview of the present invention.

Referring to FIG. 1A, the magnetic drive apparatus 1 comprises a first magnetic member 4 and a second magnetic member 7 wherein both magnetic members are moved with respect to one another. Although the second magnetic member 7 is moved with respect to the first magnetic member 4 in the configuration example in FIG. 1, the first magnetic member 4 can also be moved with respect to the second magnetic member 7.

Referring to FIG. 1A, the first magnetic member 4 has a magnetic flux generator 2 and a magnetic path 3 to form a magnetic circuit 10. This magnetic circuit 10 includes magnetic flux control means 8 for controlling the flow of a magnetic flux flowing through the magnetic circuit 10. The magnetic circuit 10 also has a plurality of magnetic pole ends 12 (12A, 12B). The second magnetic member 7 is provided movably between the magnetic pole ends 12 (12A, 12B). The magnetic member 7 shown in the figure has a magnetic flux generator 5, and the interaction between the magnetic flux generated between the magnetic pole ends 12 (12A, 12B) and the magnetic flux generated by the magnetic flux generator 5 generates the driving force. The second magnetic member 7 shown in the figure as an example is a rotational body.

To drive the second magnetic member 7 continuously, it is necessary to change the direction of the magnetic flux between the magnetic pole ends 12 (12A, 12B) according to the rotational position of the second magnetic member 7. In a configuration where excitation coils are used, the magnetic poles can be switched by switching the direction of electric current flowing through the excitation coils; on the other hand, in a configuration where a magnetic flux generator such as a permanent magnet is used, the magnetic poles cannot be switched by the direction of electric current as in excitation coils. To solve this problem, the magnetic drive apparatus according to the present invention has a configuration where the balance between positive and negative magnetic forces at the magnetic pole ends is switched by controlling the flow of the magnetic flux from the magnetic flux generator to configure a driving apparatus for driving the magnetic members.

In the magnetic drive apparatus 1 according to the present invention, the direction of the magnetic flux between the magnetic pole ends 12 (12A, 12B) is switched by the magnetic flux control means 8 provided on the magnetic circuit 10. The magnetic flux control means 8 controls the magnetic characteristics of the magnetic path to control the flow of the magnetic flux to the magnetic pole ends 12 (12A, 12B) for switching the balance of magnetic force between the positive and negative magnetic poles at the magnetic pole ends 12 (12A, 12B). By switching the balance of magnetic force between positive and negative poles, the direction of the magnetic flux with respect to the second magnetic member 7 is changed to cause the second magnetic member 7 to move relative to the first magnetic member 4.

The magnetic drive apparatus according to the present invention has a configuration in which the magnetic flux control means 8 controls the magnetic characteristics of the magnetic path 3 to control the flow of the magnetic flux generated by the magnetic flux generator 2. This configuration eliminates the need for excitation coils required by the conventional magnetic drive apparatus. The controlled magnetic characteristics are, for example, magnetic resistance. The magnetic resistance of the magnetic circuit can be controlled by controlling the variable magnetic characteristics through a stress, a temperature, and a magnetic field.

Figure 1B:
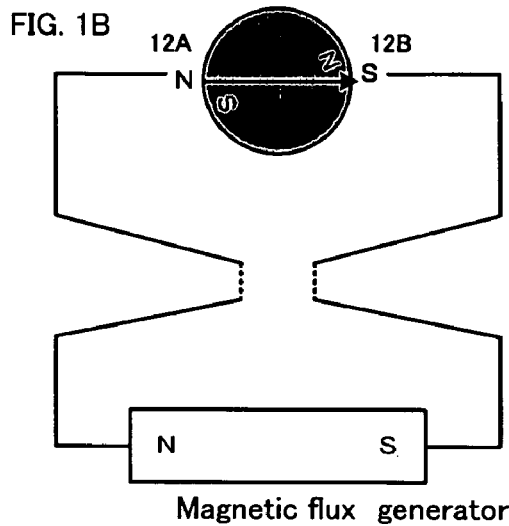

FIG. 1B shows the configuration, in which one magnetic pole end 12A is the positive pole (N pole) and the other magnetic pole end 12B is the negative pole (S pole). This configuration is established by the magnetic flux control means 8 that controls the increase/decrease in the amount of magnetism passing through the means and the direction of the magnetic flux (indicated by broken lines in the figure). This switching causes the magnetic flux to flow from the magnetic pole end 12A to the magnetic pole end 12B between the magnetic pole ends and moves the second magnetic member 7 according to this direction of the magnetic flux.

Figure 1C:
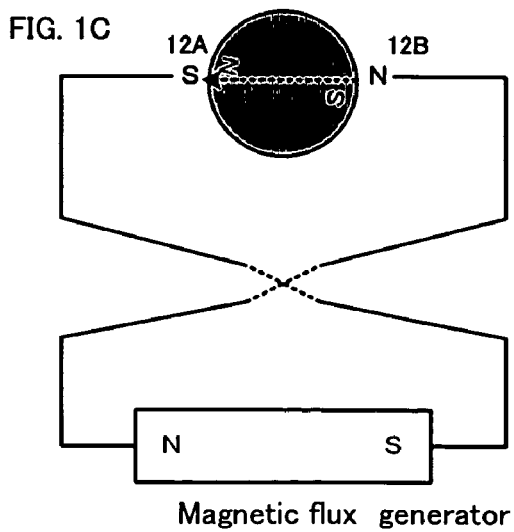

FIG. 1C shows the configuration in which the magnetic flux control means 8 controls the increase/decrease in the amount of magnetism passing through the means and the direction of the magnetic flux (indicated by broken lines in the figure) to switch the magnetic pole end 12A to the negative pole (S pole) and the magnetic pole end 12B to the positive pole (N pole). This switching causes the magnetic flux to flow from the magnetic pole end 12B to the magnetic pole end 12A between the magnetic pole ends. This direction is opposite to that described above. The second magnetic member 7 moves according to this direction of the magnetic flux.

Repeating the states shown in FIG. 1B and FIG. 1C to switch the increase/decrease in the effective amount of the magnetic flux of the second magnetic member causes the second magnetic member 7 to start the rotational motion with respect to the first magnetic member 4.

The magnetic drive apparatus according to the present invention can be applied not only to the rotational motion described above but also to various types of motion such as the linear motion, twisting motion, and switching motion as will be described later.

The configuration in which the flow of the magnetic flux is controlled as described above can be in one of a plurality of embodiments. The following describes a first embodiment in which the flow of the magnetic flux is controlled by switching the magnetic circuit in the bridge configuration, a second embodiment in which the flow of the magnetic flux is controlled by selecting from a plurality of magnetic circuits for switching, and a third embodiment corresponding to the combination of the two.

First, the following describes the first embodiment of the magnetic drive apparatus according to the present invention. In the first embodiment, the flow of the magnetic flux is controlled by switching the magnetic circuit in the bridge configuration. FIG. 2 is a general diagram showing the first embodiment.

Figure 2A:
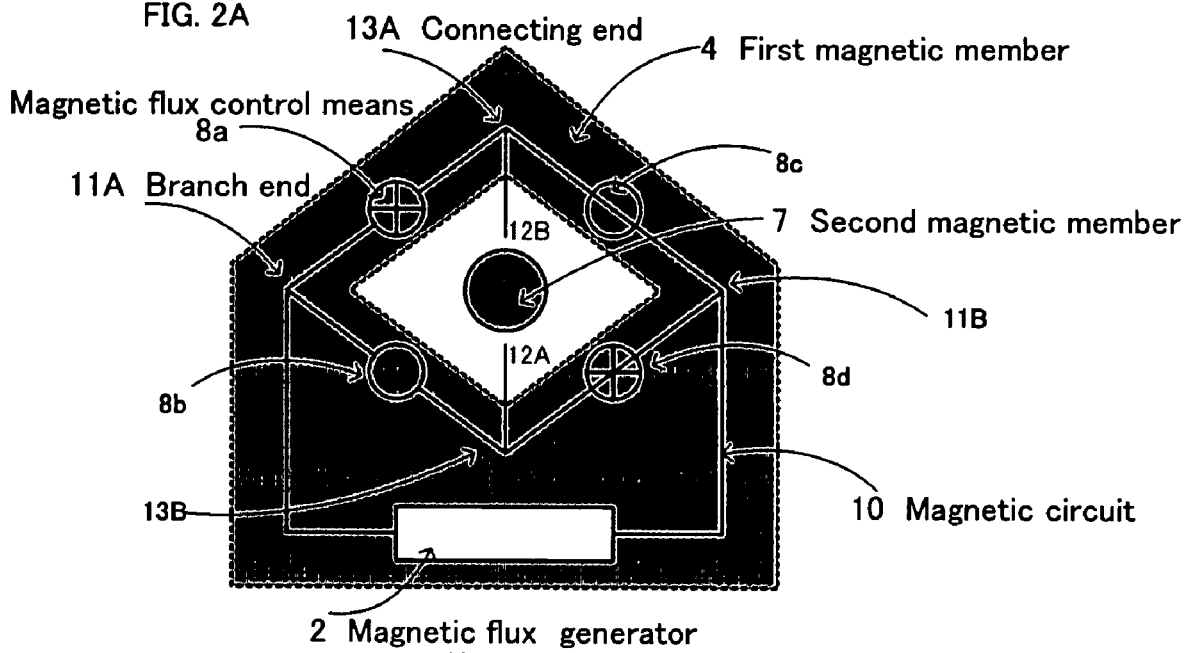
FIG. 2 is a diagram showing the overview of a first embodiment of the present invention.

Referring to FIG. 2A, a magnetic drive apparatus 1 comprises a first magnetic member 4 and a second magnetic member 7, and those magnetic members are moved with respect to one another.

The first magnetic member 4 forms a magnetic circuit 10 using a magnetic path connecting the both magnetic poles of the magnetic flux generator 2 of the first magnetic member 4. This magnetic circuit 10 forms a bridge using branch ends 11A and 11B, provided on the magnetic pole sides of the magnetic flux generator 2, and connecting ends 13A and 13B that connect the branch ends. The magnetic flux control means 8 (8a-8d) are provided on this bridge for controlling the flow of the magnetic flux flowing through the magnetic circuit 10. Referring to FIG. 2A, the magnetic flux control means 8a is provided on the magnetic circuit connecting the branch end 11A and the connecting end 13A, the magnetic flux control means 8b is provided on the magnetic circuit connecting the branch end 11A and the connecting end 13B, the magnetic flux control means 8c is provided on the magnetic circuit connecting the branch end 11B and the connecting end 13A, and the magnetic flux control means 8d is provided on the magnetic circuit connecting the branch end 11B and the connecting end 13B.

The second magnetic member 7 is provided between the magnetic pole ends 12A and 12B formed in an intermediate point on the magnetic circuit connecting the connecting ends 13A and 13B. The magnetic flux control means 8 (8a-8d) control the magnetic characteristics of the magnetic path to control the flow of magnetic flux to the magnetic pole ends 12A and 12B and switch the balance between positive and negative magnetic forces appearing at the magnetic pole ends 12A and 12B.

In the bridge configuration shown in FIG. 2, the switching control operation for alternating between the two sets (that is, the set of the magnetic flux control means 8a and the magnetic flux control means 8d and the set of the magnetic flux control means 8b and the magnetic flux control means 8c) switches the balance between positive and negative magnetic forces appearing at magnetic pole ends 12A and 12B.

Figure 2B:
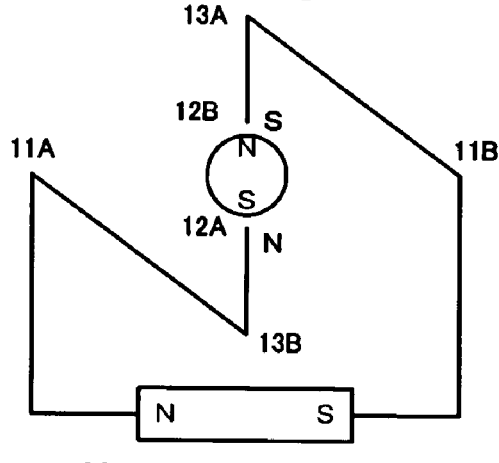

FIG. 2B shows one magnetic circuit state. In this magnetic circuit state, controlling the magnetic flux control means 8a and 8d (or magnetic flux control means 8b and 8c) decreases the amount of the magnetic flux flowing through the magnetic circuit between the branch end 11A and the connecting end 13A and the magnetic circuit between the branch end 11B and the connecting end 13B and forms a magnetic circuit beginning at the N pole of the magnetic flux generator 2 and ending at the S pole of the magnetic flux generator 2 via the branch end 11A, connecting end 13B, magnetic pole end 12B, magnetic pole end 12A, connecting end 13A, and branch end 11B.

This control of the increase/decrease in the amount of the magnetic flux forms the magnetic flux flow from the magnetic pole end 12B to the magnetic pole end 12A between the magnetic pole ends with the magnetic pole end 12A being the negative pole (S pole) and the magnetic pole end 12B being the positive pole (N pole). The second magnetic member 7 moves according to the direction of the magnetic flux.

Figure 2C:
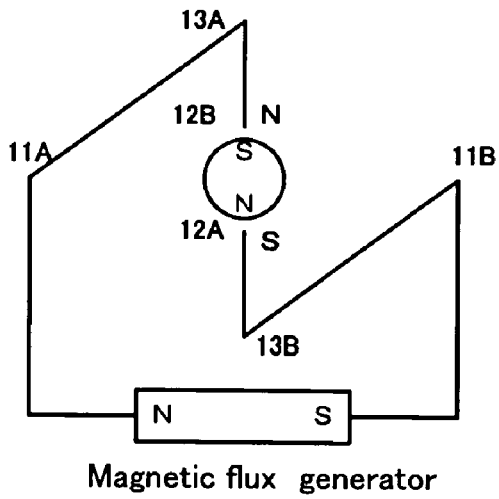

Next, FIG. 2C shows another magnetic circuit state. In this magnetic circuit state, controlling the magnetic flux control means 8b and 8c (or magnetic flux control means 8a and 8d) decreases the amount of the magnetic flux flowing through the magnetic circuit between the branch end 11A and the connecting end 13A and the magnetic circuit between the branch end 11B and the connecting end 13A and forms a magnetic circuit beginning at the N pole of the magnetic flux generator 2 and ending at the S pole of the magnetic flux generator 2 via the branch end 11A, connecting end 13A, magnetic pole end 12A, magnetic pole end 12B, connecting end 13B, and branch end 11B.

This control of the increase/decrease in the amount of the magnetic flux forms the magnetic flux flow from the magnetic pole end 12A to the magnetic pole end 12B between the magnetic pole ends, which is the opposite to the direction in FIG. 2B, with the magnetic pole end 12A being the positive pole (N pole) and the magnetic pole end 12B being the negative pole (S pole). The second magnetic member 7 moves according to the direction of the magnetic flux.

The second magnetic member 7 performs the rotational motion with respect to the first magnetic member 4 by repeating the states, shown in FIGS. 2B and 2C, to switch the direction of the magnetic flux.

Figure 3A:
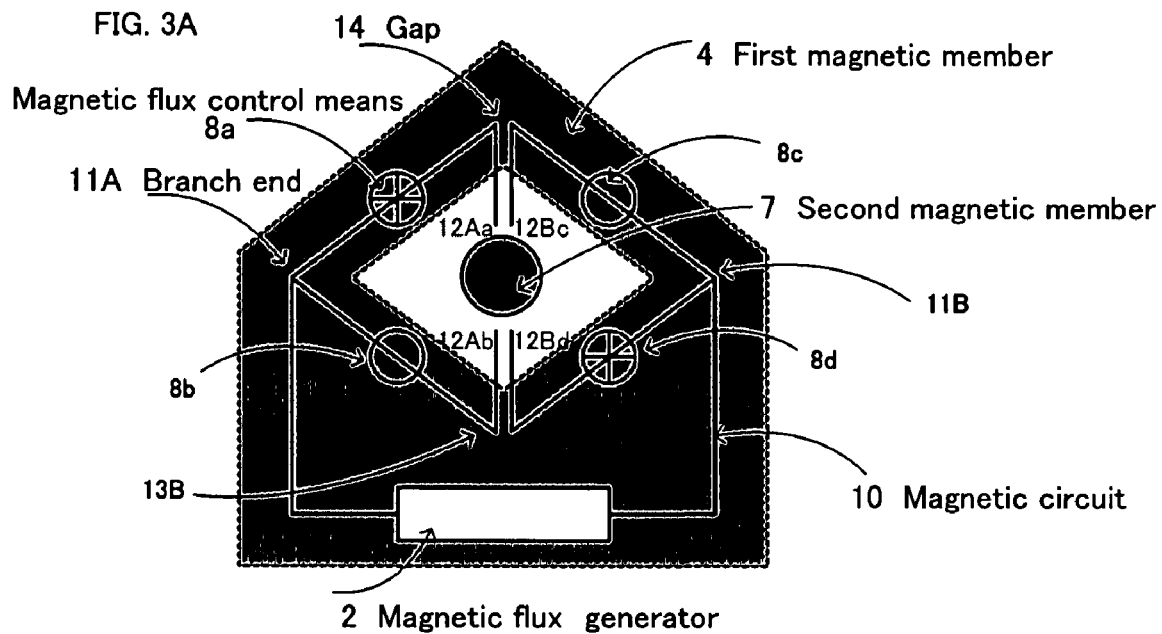
FIG. 3 is a diagram showing another bridge configuration of the present invention.

FIG. 3 is a diagram showing another bridge configuration. This bridge configuration is similar to the bridge configuration shown in FIG. 2 except the connecting ends.

In the bridge configuration shown in FIG. 3, the switching control operation for alternating between the two sets (that is, the set of the magnetic flux control means 8a and the magnetic flux control means 8d and the set of the magnetic flux control means 8b and the magnetic flux control means 8c) switches the balance between positive and negative magnetic forces at magnetic pole ends 12A and 12B, as in the example shown in FIG. 2. In this bridge configuration, a gap 14 formed in the connecting ends 13 magnetically separates the magnetic path. The ends of the gap 14 constitute magnetic pole ends 12Aa, 12Ab, 12Bc, and 12Bd.

Figure 3B:
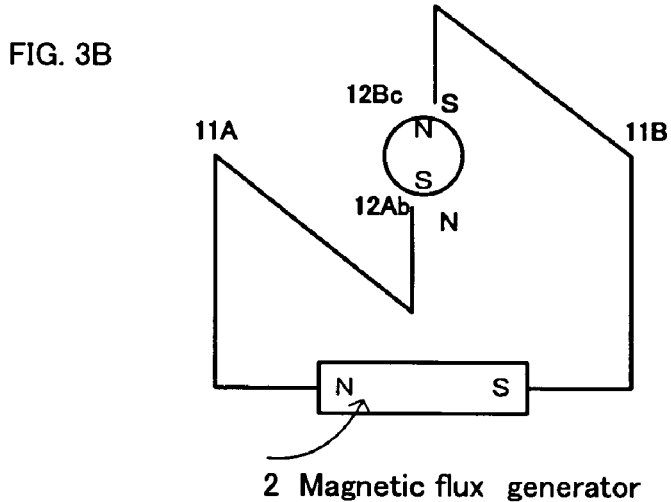

FIG. 3B shows one magnetic circuit state of the bridge configuration. In this magnetic circuit state, controlling the magnetic flux control means 8a and 8d (or magnetic flux control means 8b and 8c) decreases the amount of the magnetic flux flowing through the magnetic circuit between the branch end 11A and the magnetic pole end 12Aa and the magnetic circuit between the branch end 11B and the magnetic pole end 12Bd and forms a magnetic circuit beginning at the N pole of the magnetic flux generator 2 and ending at the S pole of the magnetic flux generator 2 via the branch end 11A, magnetic pole end 12Ab, magnetic pole end 12Bc, and branch end 11B.

This control of the increase/decrease in the amount of the magnetic flux forms the magnetic flux flow from the magnetic pole end 12Ab to the magnetic pole end 12Bc between the magnetic pole ends with the magnetic pole end 12Bc being the negative pole (S pole) and the magnetic pole end 12Ab being the positive pole (N pole). The second magnetic member 7 moves according to the direction of the magnetic flux.

Figure 3C:
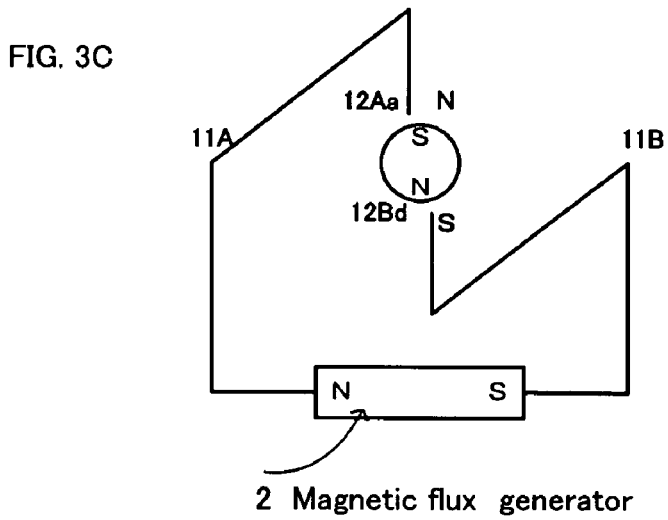

FIG. 3C shows another magnetic circuit state of the bridge configuration. In this magnetic circuit state, controlling the magnetic flux control means 8b and 8c (or magnetic flux control means 8a and 8d) decreases the amount of the magnetic flux flowing through the magnetic circuit between the branch end 11A and the connecting end 12Ab and the magnetic circuit between the branch end 11B and the connecting end 12Bc and forms a magnetic circuit beginning at the N pole of the magnetic flux generator 2 and ending at the S pole of the magnetic flux generator 2 via the branch end 11A, magnetic pole end 12Aa, magnetic pole end 12Bd, and branch end 11B.

This control of the increase/decrease in the amount of the magnetic flux forms the magnetic flux flow from the magnetic pole end 12Aa to the magnetic pole end 12Bd between the magnetic pole ends, which is the opposite to the direction in FIG. 3B, with the magnetic pole end 12Aa being the positive pole (N pole) and the magnetic pole end 12Bd being the negative pole (S pole). The second magnetic member 7 moves according to the direction of the magnetic flux.

The second magnetic member 7 performs the rotational motion with respect to the first magnetic member 4 by repeating the states, shown in FIGS. 3B and 3C, to switch the direction of the magnetic flux.

The magnetic separation of the magnetic path made by the gap 14 reduces an unnecessary leakage flux between the magnetic paths and between the magnetic pole ends and therefore increases the utilization of the magnetic flux.

Figure 4:
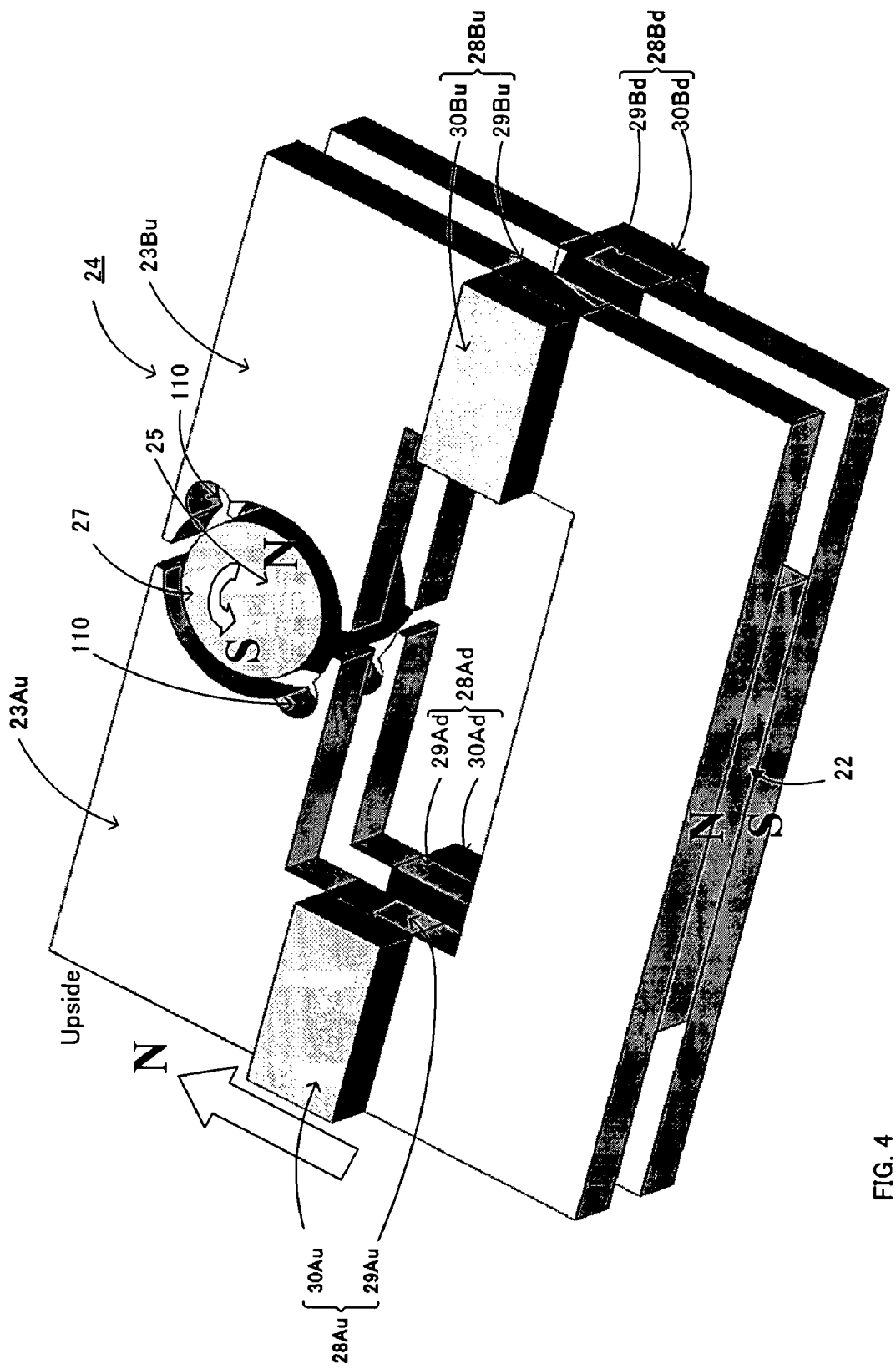
FIG. 4 is a diagram showing a first configuration example of a magnetic drive apparatus in the first embodiment of the present invention.
Figure 5:
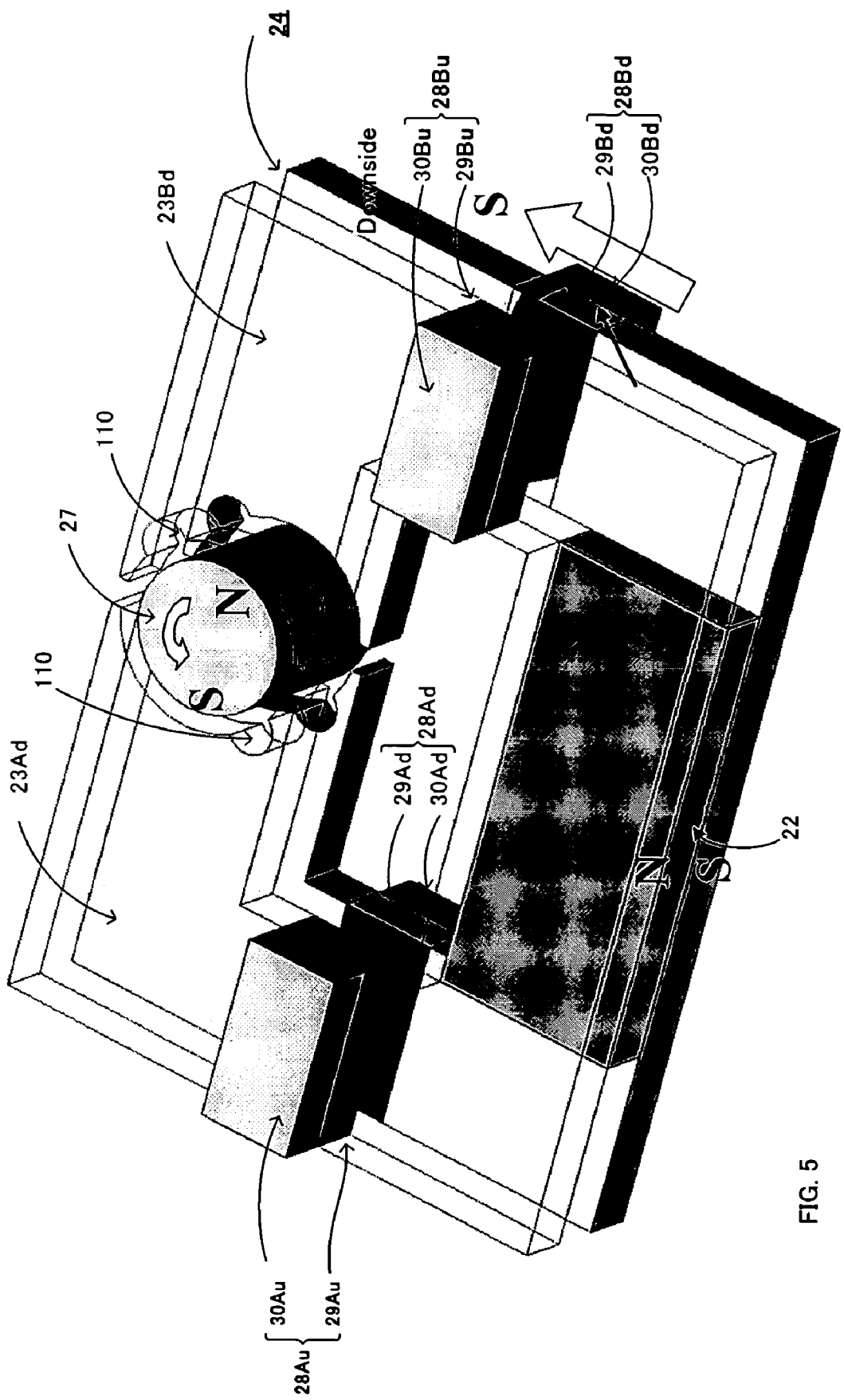
FIG. 5 is a diagram showing a first configuration example of a magnetic drive apparatus in the first embodiment of the present invention.

FIGS. 4 and 5 are diagrams showing a first configuration example of the magnetic drive apparatus in the first embodiment. The first configuration example is based on the configuration with a gap shown in FIG. 3.

In the first configuration example, the first magnetic member is a stator 24 and the second magnetic member is a rotor 27. The stator magnetic paths are vertically layered with a stator magnetic flux generator 22 between the upside and downside layers. FIG. 4 shows the upside part of a magnetic drive apparatus 21, and FIG. 5 shows the downside of the magnetic drive apparatus 21. Although the layers are configured vertically in the description below for convenience of description, the physical configuration need not always be in a vertical configuration.

It should be noted that the magnetic circuit in the bridge configuration shown above in FIG. 3 cannot continuously rotate the second magnetic member 7 even if the magnetic pole ends are arranged in the same plane in the configuration exactly as shown in the figure. Therefore, as shown in FIG. 4 and FIG. 5, the stator magnetic paths and the magnetic pole ends with the same polarity are formed in the same plane, with different-polarity planes laminated, to build a magnetic circuit in the bridge configuration to allow the second magnetic member 7 to be rotated continuously.

The magnetic drive apparatus 21 comprises the rotor 27 having a rotor magnetic flux generator 25, the stator 24 having the stator magnetic flux generator 22 and a stator magnetic path 23, and magnetic flux control means 28 provided in the intermediate positions of the stator magnetic path 23 for controlling the magnetic flux flowing through the stator magnetic path 23. The stator magnetic path 23 divides the magnetic flux from each pole of the stator magnetic flux generator 22 into multiple branches with the magnetic pole ends as the branch ends, and the sets of magnetic pole ends, each composed of different polarities (upside and downside magnetic pole ends), are arranged corresponding to different rotational angle positions of the rotor 27.

Referring to FIG. 4, the upside of the stator 24 on the N pole side of the stator magnetic flux generator 22 is divided into two branches, that is, an upside stator magnetic path 23Au and an upside stator magnetic path 23Bu, and the rotor 27 is arranged between the magnetic pole ends of those branches. Magnetic flux control means 28Au is provided on the upside stator magnetic path 23Au, and magnetic flux control means 28Bu is provided on the upside stator magnetic path 23Bu.

Referring to FIG. 5, the downside of the stator 24 on the S pole side of the stator magnetic flux generator 22 is divided into two branches, that is, a downside stator magnetic path 23Ad and a downside stator magnetic path 23Bd, and the rotor 27 is arranged between the magnetic pole ends of those branches. Magnetic flux control means 28Ad is provided on the downside stator magnetic path 23Ad, and magnetic flux control means 28Bd is provided on the downside stator magnetic path 23Bd.

The magnetic flux control means 28Au, which is means for controlling the magnetic flux flowing through the upside stator magnetic path 23Au, comprises a variable magnetic characteristics member 29Au and magnetic characteristic control means 30Au. The magnetic flux control means 28Ad, which is means for controlling the magnetic flux flowing through the downside stator magnetic path 23Ad, comprises a variable magnetic characteristics member 29Ad and magnetic characteristic control means 30Ad. The magnetic flux control means 28Bu and 28Bd are also configured in the same manner.

A variable magnetic characteristics member is made of a material whose magnetic characteristics, such as the magnetic resistance, vary according to a stress, a temperature, or a magnetic field. The variable magnetic characteristics member can be formed by an anisotropic magnetic material, a magnetostrictive material, a magnetic material mixed with magnetic powder using resin as the binder, a compound material produced by mixing magnetic powder and piezoelectric powder using resin as the binder, or a thermal magnetic material.

Magnetic flux control means is means for changing the magnetic characteristics of a variable magnetic characteristics member. For example, the magnetic flux control means may be a stress application element that controls the magnetic characteristics of a variable magnetic characteristics member by applying stress to the variable magnetic characteristics member, a temperature application element that controls the magnetic characteristics of a variable magnetic characteristics member by changing the temperature of the variable magnetic characteristics member that is a thermal magnetic material, or a magnetic field application element that controls the magnetic characteristics of a variable magnetic characteristics member by changing a magnetic field applied to the variable magnetic characteristics member. The stress application element is, for example, a laminated piezoelectric element. The magnetic flux control means can be installed by placing next to, embedded in, or mixed with, the variable magnetic characteristics member.

With reference to FIGS. 6 and 7, the following describes how the magnetic drive apparatus with the configuration shown in FIGS. 4 and 5 controls the flow of the magnetic flux and the amount of the magnetic flux. With reference to with FIG. 8, the following describes how the driving operation is executed by increasing or decreasing the amount of the magnetic flux.

Figure 6A:
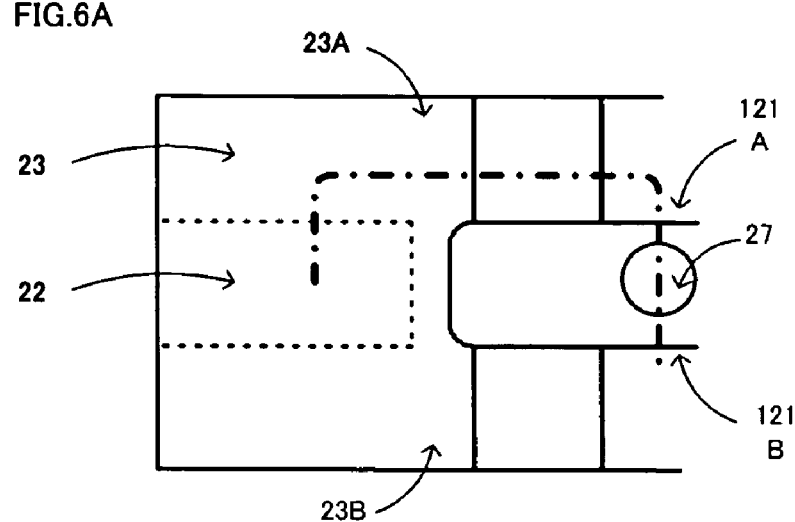
FIG. 6 is a diagram showing the flow and the switching of a magnetic flux in the magnetic drive apparatus in the first embodiment of the present invention.
Figure 6B:
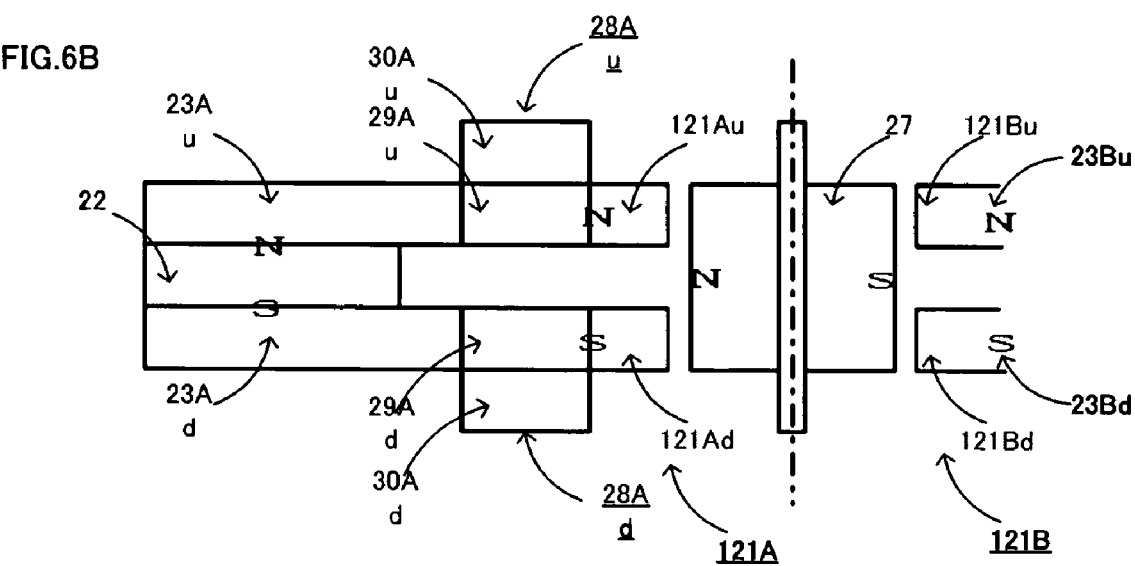

FIG. 6A is a top view of the general configuration of the magnetic drive apparatus shown in FIG. 3, and FIG. 6B shows the general configuration of the cross section of the magnetic drive apparatus. The cross section shown in FIG. 6B shows the cross section taken on the chain line in FIG. 6A.

FIG. 6A shows one side (for example, the upside described above) of the stator 24. The magnetic flux from the stator magnetic flux generator 22 is divided into two branches: stator magnetic path 23A and stator magnetic path 23B. The branches are formed also on the other side of the stator 24 (for example, downside described above that is not shown in FIG. 6A because it is on the back side).

Referring to the cross section in FIG. 6B, the upside stator magnetic path 23Au and the downside stator magnetic path 23Ad are layered (layered vertically in the figure) with the stator magnetic flux generator 22 between them. In FIG. 6B that shows the cross section taken on the chain line in FIG. 6A, the upside stator magnetic path 23Bu and the downside stator magnetic path 23Bd are not shown.

The magnetic flux control means 28Au and 28Ad are provided in the intermediate positions of the upside stator magnetic path 23Au and the downside stator magnetic path 23Ad. The magnetic flux control means 28Au and 28Ad control the amount of the magnetic fluxes that flow from the stator magnetic flux generator 22 to magnetic pole ends 121Au and 121Ad via the stator magnetic paths 23Au and 23Ad. As described above, the magnetic flux control means 28Au and 28Ad comprise variable magnetic characteristics members 29Au and 29Ad and the magnetic characteristic control means 30Au and 30Ad. The magnetic characteristic control means 30Au and 30Ad change the magnetic characteristic, such as the magnetic resistance, of the variable magnetic characteristics members 29Au and 29Ad to control the amount of the magnetic flux flowing through the stator magnetic paths 23Au and 23Ad.

The set of magnetic pole ends 121B (magnetic pole ends 121Bu and 121Bd) of the stator magnetic path 23B are opposed to the set of the magnetic pole ends 121A (magnetic pole ends 121Au and 121Ad) described above. The rotor 27 is provided between the sets each composed of the magnetic pole ends 121A and 121B.

In the configuration described above, the magnetic characteristic control means 30Au and 30Ad, as well as magnetic characteristic control means 30Bu and 30Bd not shown, control the amount of magnetic flux flowing through the stator magnetic path to switch the balance between positive and negative magnetic forces at the magnetic pole ends 121A and 121B. The rotor 27 rotates according to the flow of the magnetic flux that is switched according to the balance of magnetic pole forces between the magnetic pole ends 121A and 121B.

Referring to FIG. 7, the variable magnetic characteristics member 29 is rather anisotropic with respect to the magnetic field from the stator magnetic flux generator 22. The magnetizing direction of the variable magnetic characteristics member 29 is tilted by driving the magnetic characteristic control means 30 that is provided next to it. The ease of flow of the magnetic flux depends on the degree of the magnetization tilt. Because the amount of magnetic flux generated by the stator magnetic flux generator 22 is almost constant, a decrease in the amount of magnetic flux in one stator magnetic path results in an increase in the amount of magnetic flux in the other stator magnetic path means that is connected. This increases the force of the magnetic pole on the side of the stator magnetic path, in which the amount of magnetic flux is increased, and attracts the pairing magnetic pole on the rotor side. Switching the magnetic characteristic control means 30 to be driven and repeating the above operation causes the rotor to rotate.

FIG. 7A shows the state in which the magnetic characteristic control means 30Au and 30Ad control the variable magnetic characteristics members in such a way that the magnetic resistance of the variable magnetic characteristics member 29Au is increased and the magnetic resistance of the variable magnetic characteristics member 29Ad is decreased. In this case, the magnetic flux flows through the downside stator magnetic path 23Ad to make the magnetic pole end 121Ad the negative pole (S pole). On the other hand, the amount of magnetic flux passing through the upside stator magnetic path 23Au is decreased to make the magnetic force at the magnetic pole end 121Au lower. Therefore, the magnetic pole ends 121A become more negative (S pole).

On the other hand, an increase in the magnetic resistance of a variable magnetic characteristics member 29Bd and a decrease in the magnetic resistance of a variable magnetic characteristics member 29Bu under control of the magnetic characteristic control means 30Bu and 30Bd, though not shown, flow the magnetic flux through the upside stator magnetic path 23Bu to make the magnetic pole end 121Bu the positive pole (N pole). On the other hand, the amount of magnetic flux passing through the downside stator magnetic path 23Bd is decreased to make the magnetic force at the magnetic pole end 121Bd lower. Therefore, the magnetic pole ends 121B becomes more positive (N pole).

The flow of the magnetic flux from the magnetic pole ends 121B to the magnetic pole ends 121A is formed in the magnetic pole states described above.

On the other hand, FIG. 7B shows the state in which the opposite flow of the magnetic flux is formed. In the state shown in FIG. 7B, the magnetic characteristic control means 30Au and 30Ad are controlled in such a way that the magnetic resistance of the variable magnetic characteristics member 29Ad is increased and the magnetic resistance of the variable magnetic characteristics member 29Au is decreased. This causes the magnetic flux to flow through the upside stator magnetic path 23Au to make the magnetic pole end 121Au the positive pole (N pole). On the other hand, the amount of magnetic flux passing through the downside stator magnetic path 23Ad is decreased to make the magnetic force at the magnetic pole end 121Ad lower. Therefore, the magnetic pole ends 121A become more positive (N pole).

On the other hand, the magnetic characteristic control means 30Bu and 30Bd (though not shown) are controlled in the same manner in such a way that the magnetic resistance of the variable magnetic characteristics member 29Bu is increased and the magnetic resistance of the variable magnetic characteristics member 29Bd is decreased. This causes the magnetic flux to flow through the downside stator magnetic path 23Bd to make the magnetic pole ends 121Bd the negative pole (N pole). On the other hand, the amount of magnetic flux passing through the upside stator magnetic path 23Bu is decreased to make the magnetic force at the magnetic pole end 121Bu lower. Therefore, the magnetic pole ends 121B becomes more negative (N pole).

The flow of the magnetic flux from the magnetic pole ends 121A to the magnetic pole ends 121B is formed in the magnetic pole states described above.

Switching the balance between positive and negative magnetic forces appearing at the magnetic poles described above switches the direction of the magnetic flux between the magnetic pole ends. Switching the direction of the magnetic flux in this way switches the direction the effective magnetic flux for the second magnetic member and rotates the rotor 27 arranged between the magnetic poles.

As shown in FIGS. 6 and 7, the first magnetic member and the second magnetic member in the first embodiment described above configure a set of layered magnetic pole ends (vertical direction in the figure). They are arranged so that the direction of the magnetic flux between the magnetic pole ends is orthogonal to the direction of the magnetic flux between the magnetic pole pair of the rotor.

In this layout configuration, intersecting components are generated between the magnetic flux flowing between the magnetic pole ends (from one (right or left) magnetic pole end in the figure to the other (left or right) magnetic pole end) of the first magnetic member and the magnetic flux between the magnetic pole pair of the rotor. The intersecting components of the magnetic flux generate driving force to rotate the rotor.

Note that, in the configuration described above, the magnetic flux flowing between the magnetic pole ends (from one (right or left) magnetic pole end in the figure to the other (left or right) magnetic pole end) of the first magnetic member is tilted for the thickness between the magnetic pole ends of the first magnetic member. The tilted magnetic flux becomes a vertical component that does not contribute to the rotation. This vertical magnetic flux component generates an action force into the direction that tilts the rotational axis of the rotor. This action force can be reduced by reducing the thickness of the permanent magnet constituting the stator magnetic flux generator.

Therefore, between the magnetic pole ends in the configuration described above, the magnetic flux flows from the one upside magnetic pole end to the other downside magnetic pole end or, conversely, from one downside magnetic pole end to the other upside magnetic pole end. This magnetic flux generates driving force for rotating the rotor 27.

FIG. 8 is a diagram showing the steps for rotating the rotor 27. The steps shown in FIG. 8 show the flow of the magnetic flux on the upside and the downside of the rotor and the flow of the magnetic flux viewed from the cross section.

First, in step 1 shown in FIG. 8A, the magnetic flux control means 28Bu is driven on the upside to limit the flow of magnetic flux through the magnetic path in the right side in the figure and the magnetic flux control means 28Ad is driven on the downside to limit the flow of magnetic flux through the magnetic path in the left side in the figure. This makes the upside magnetic pole end 121Au the N pole, and the downside magnetic pole end 121Bd the S pole, to form the magnetic flux flowing from the upper-left magnetic pole end to the lower-right magnetic pole end in the cross section. The interaction of this magnetic flux and the magnetic flux generated by the rotor 27 generates the driving force of the rotor 27.

Next, in step 2 shown in FIG. 8B, the magnetic flux control means 28Au, 28Bu, 28Ad, and 28Bd are not driven and, therefore, the flow of the magnetic flux through the upside and downside magnetic paths is not limited. This makes the upside magnetic pole ends 121Au and 121Bu the N pole, and makes the downside magnetic pole ends 121Ad and 121Bd the S pole, to form the magnetic flux flowing between the left magnetic pole pair, and between the right magnetic pole pair, in the cross section. The balance between this magnetic flux and the magnetic flux generated by the rotor 27 does not generate rotational driving force of the rotor 27.

Next, in step 3 shown in FIG. 8C, the magnetic flux control means 28Au is driven on the upside to limit the flow of magnetic flux through the magnetic path in the left side in the figure, and the magnetic flux control means 28Bd is driven on the downside to limit the flow of magnetic flux through the magnetic path in the right side in the figure. This makes the upside magnetic pole end 121Bu the N pole, and the downside magnetic pole end 121Ad the S pole, to form the magnetic flux flowing from the upper-right magnetic pole end to the lower-left magnetic pole end in the cross section. The interaction of this magnetic flux and the magnetic flux generated by the rotor 27 generates the driving force of the rotor 27.

In addition, in step 4 shown in FIG. 8D, the magnetic flux control means 28Au, 28Bu, 28Ad, and 28Bd are not driven and, therefore, the flow of the magnetic flux through the upside and downside magnetic paths is not limited. This makes the upside magnetic pole ends 121Au and 121Bu the N pole, and makes the downside magnetic pole ends 121Ad and 121Bd the S pole, to form the magnetic flux flowing between the left magnetic pole pair and between the right magnetic pole pair in the cross section. The balance between this magnetic flux and the magnetic flux generated by the rotor 27 does not generate rotational driving force of the rotor 27.

Step 1 to step 4 described above rotate the rotor 27 in a complete circle, and repeating the steps causes the rotor to continuously rotate.

In step 1 to step 4, the rotor 27 may also be rotated by repeating step 1 and step 3 with steps 2 and 4 skipped.

Figure 9:
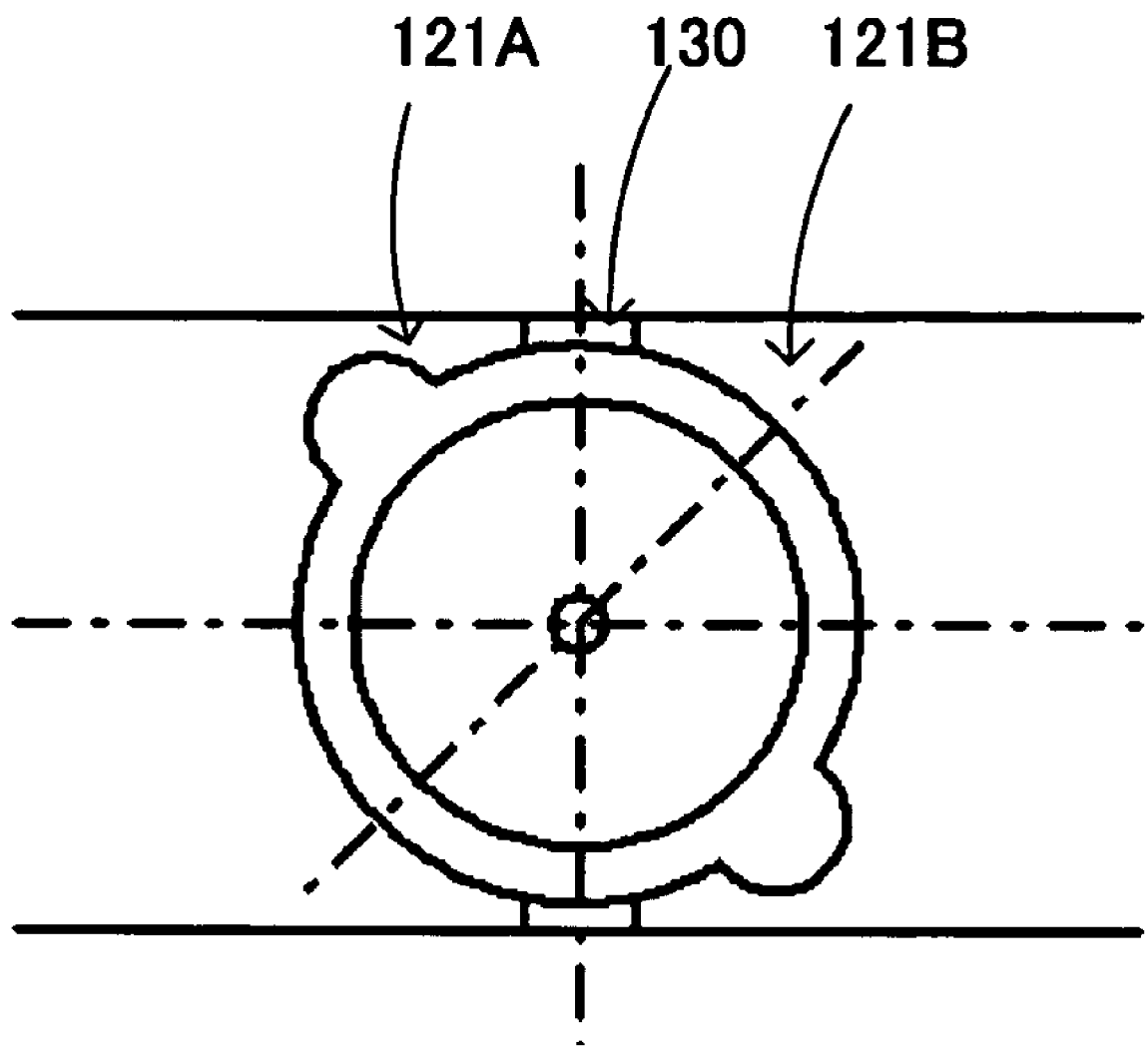
FIG. 9 is a diagram showing a configuration example in which the magnetic pole ends are connected in the magnetic drive apparatus of the present invention.

Although the magnetic pole ends of the first magnetic member in the above configuration are separated, the magnetic pole ends may also be connected to build an integrated configuration. FIG. 9 is a diagram showing a configuration example in which the magnetic pole ends are connected.

FIG. 9 is a diagram showing an example of connected magnetic pole ends. A gap is provided between the magnetic pole end 121A and the magnetic pole end 121B, and the pole ends are connected by a non-magnetic material 130 across this gap. For example, a material made of brass may be used as the non-magnetic material 130 for the connection. Resin may also be used for adhesion. In addition, instead of the non-magnetic material 130, a low-permeability material, such as nickel chrome, may also be used wherein the magnetic pole ends are connected through the welding of this low-permeability material.

Next, the following describes movement direction regulation means for determining the driving direction (rotational direction). The rotational direction must be predetermined before the stopped rotor is rotated or reversed.

In the first mode of the movement direction regulation means, the asymmetric magnetic characteristics are generated around the second magnetic member to determine the movement direction of the second magnetic member. An example of this configuration is a notch 110 that is cut in the magnetic pole end as shown in FIGS. 4 and 5. The notch 110 makes the magnetic characteristics asymmetric in the stator magnetic path that is the second magnetic member, especially, at the magnetic pole ends, to bias the magnetic flux operating on the operation of the rotor 27 for determining the rotational direction.

The position and the size of the notch 110 depend on the shape of the magnetic pole end. The configuration for generating asymmetric magnetic characteristics is not limited to a notch but any configuration in which the magnetic flux operating on the operation of the rotor 27 is biased may be used. Therefore, a non-magnetic material or a material having different magnetic characteristics may be embedded in a part of the magnetic pole end or may be mixed in the magnetic member. A configuration in which a non-magnetic material is applied to the end face of the magnetic pole end may also be used.

In the second mode of the movement direction regulation means, variable magnetic characteristics materials provided around the second magnetic member and magnetic characteristics control means for controlling the magnetic characteristics of the variable magnetic characteristic materials are provided. The movement direction regulation means is arranged near the magnetic pole ends to bias the flow of magnetic flux near the magnetic pole ends. The magnetic characteristics control means selectively changes the magnetic characteristics of the variable magnetic characteristic materials and makes the magnetic characteristics with respect to the second magnetic member asymmetric to determine the movement direction of the second magnetic member.

Figure 10:
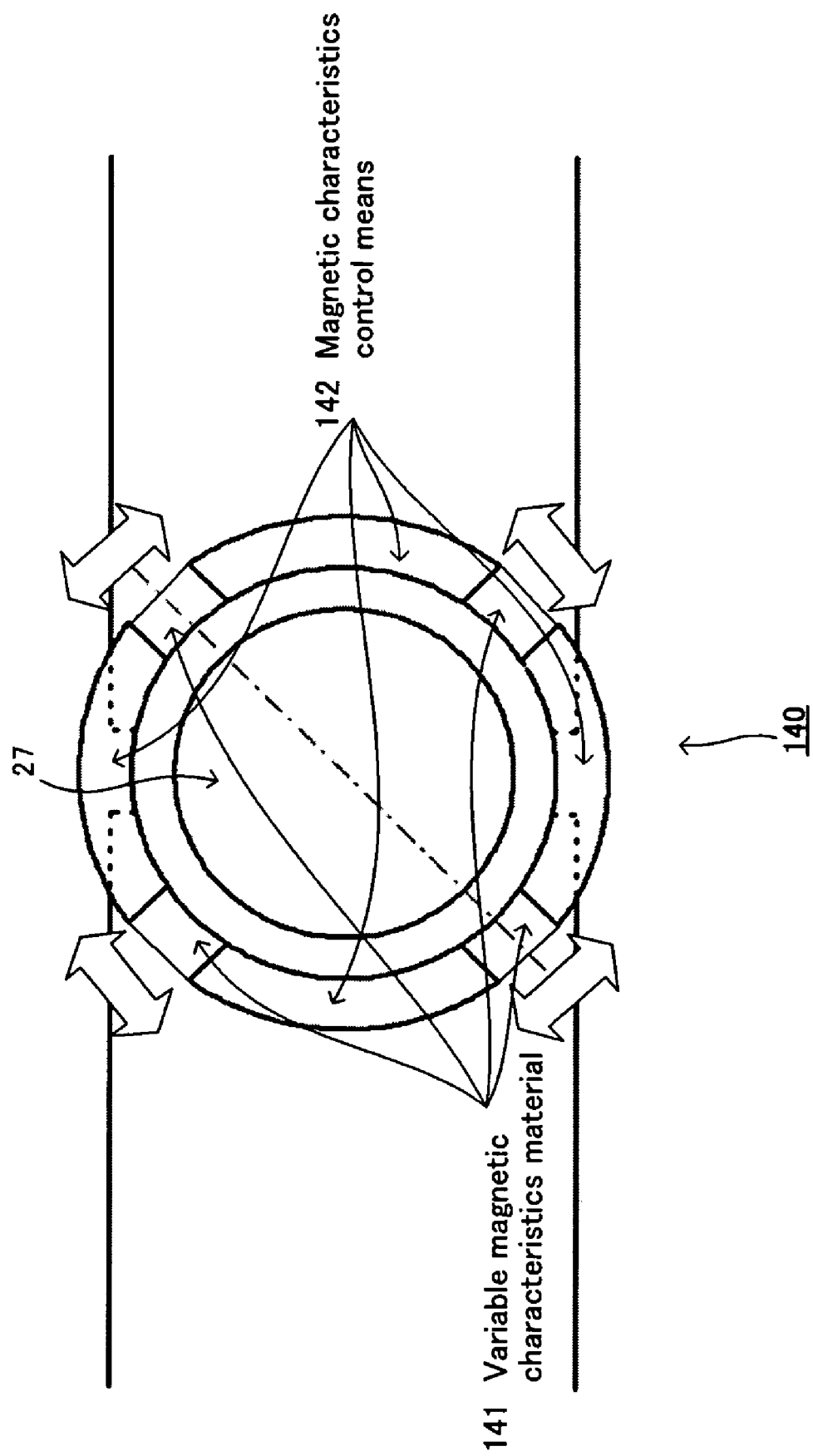
FIG. 10 is a diagram showing an example of the configuration of a second mode of movement direction regulation means of the magnetic drive apparatus of the present invention.

FIG. 10 is a diagram showing an example of the configuration of the second mode of the movement direction regulation means. In the configuration example shown in FIG. 10, movement direction regulation means 140 is provided around the magnetic pole ends. The movement direction regulation means 140 comprises a combination of the variable magnetic characteristics material 141 and magnetic characteristics control means 142. Referring to FIG. 10, the variable magnetic characteristics material 141 are positioned symmetrically on each magnetic pole end and opposed each other with respect to the rotor 27. The magnetic characteristics control means 142 are arranged in the positions where the magnetic characteristics of the variable magnetic characteristics material 141 can be individually changed.

Referring to FIG. 10, the plurality of variable magnetic characteristics material 141 arranged symmetrically on each magnetic pole end are connected. This connection configures a ring composed of the plurality of magnetic characteristics control means 142.

For example, when the magnetic characteristics control means 142 comprises a stress application element such as a piezoelectric element, compression stress is applied to one set of variable magnetic characteristics material 141 opposed across the rotor 27 and no stress or tensile stress to the other set of opposed set of variable magnetic characteristics material 141. The compression stress and the tensile stress affect the permeability. The change in the permeability generates asymmetric magnetic characteristics around the magnetic pole ends (around stator holes) to determine the rotational direction. For the two sets of variable magnetic characteristics material 141 opposed with respect to the rotor 27, it is also possible to apply tensile stress to one set of opposed variable magnetic characteristics material 141 and to apply no stress or compression stress to the other set of variable magnetic characteristics material 141.

In the second mode of the movement direction regulation means, the rotation direction can be selected, or the rotational direction can be reversed, by changing the positions at which the magnetic characteristics control means 142 is driven.

Next, with reference to FIGS. 11-15, the following describes a second configuration example in the first embodiment in which the flow of magnetic flux is controlled by switching the magnetic circuits in the bridge configuration.

The two opposed magnetic pole ends are provided in the bridge configuration in the first configuration example as shown in FIG. 2, while three magnetic pole ends are provided in the bridge configuration in the second configuration example with the three magnetic pole ends arranged at an interval of a predetermined angle.

Figure 11A:
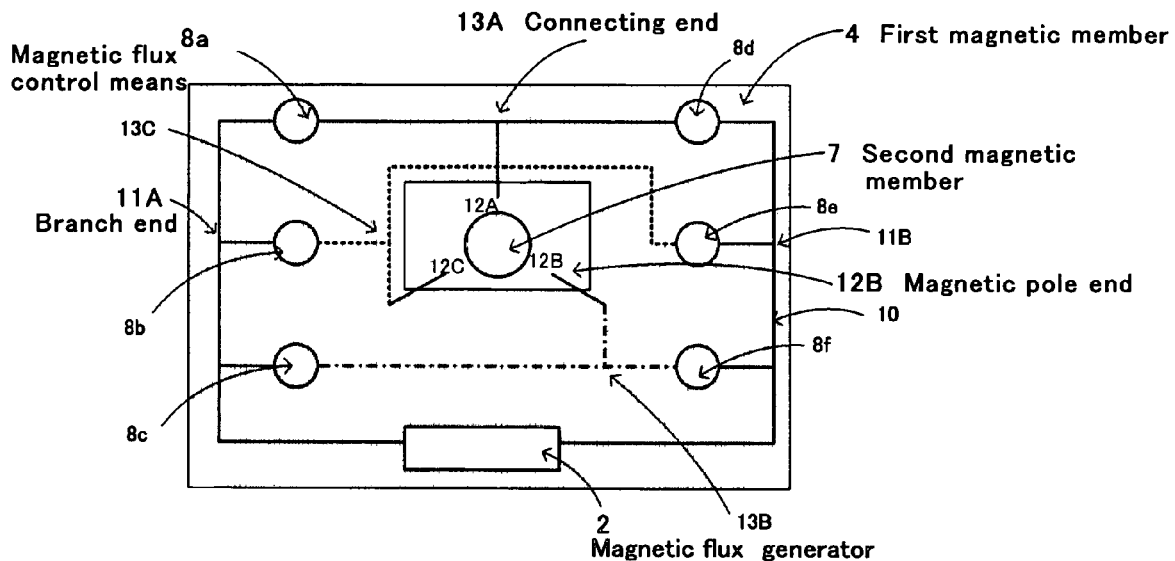
FIG. 11 is a general diagram showing a second configuration example of the magnetic drive apparatus in the first embodiment of the present invention.
Figure 11B:
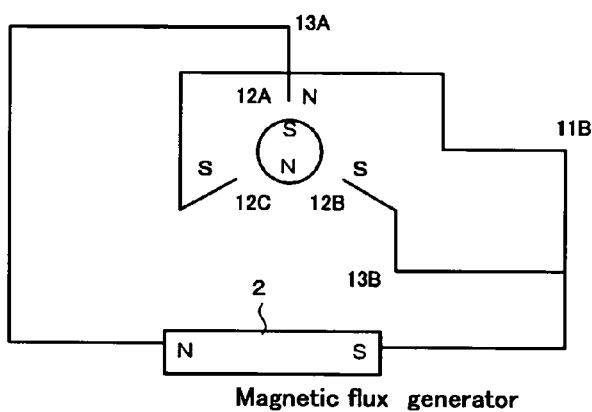
Figure 11C:
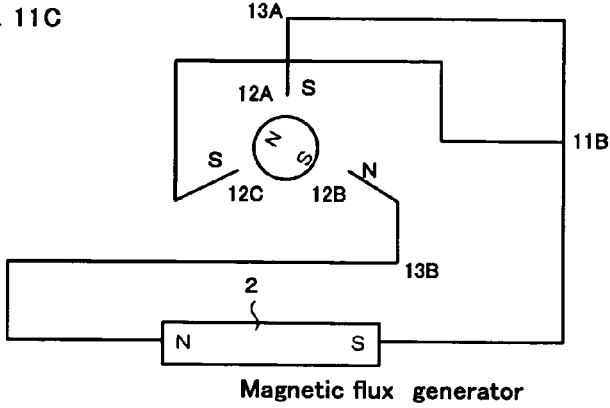

FIG. 11 is a general diagram showing the second configuration example.

Referring to FIG. 11A, the magnetic drive apparatus 1 comprises the first magnetic member 4 and the second magnetic member 7, as in the first configuration example shown in FIG. 2, wherein the two magnetic members are moved with respect to one another.

The first magnetic member 4 forms a magnetic circuit 10 composed of the magnetic paths connecting both magnetic poles of the stator magnetic flux generator 2 of the first magnetic member 4. In this magnetic circuit 10, a bridge is formed by branch ends 11A and 11B, each provided on one of the magnetic pole sides of the magnetic flux generator 2 and each branched into three, and connecting ends 13A, 13B, and 13C connecting two of the three branches. The magnetic flux control means 8 (8a-8f) are provided on this bridge to control the flow of the magnetic flux flowing through the magnetic circuit 10.

Referring to FIG. 11A, magnetic flux control means 8a is provided on the magnetic circuit connecting the branch end 11A and the connecting end 13A, magnetic flux control means 8b is provided on the magnetic circuit connecting the branch end 11A and the connecting end 13C, magnetic flux control means 8c is provided on the magnetic circuit connecting the branch end 11A and the connecting end 13B, magnetic flux control means 8d is provided on the magnetic circuit connecting the branch end 11B and the connecting end 13A, magnetic flux control means 8e is provided on the magnetic circuit connecting the branch end 11B and the connecting end 13C, and magnetic flux control means 8f is provided on the magnetic circuit connecting the branch end 11B and the connecting end 13B.

The second magnetic member 7 is provided in the position surrounded by the magnetic pole ends 12A, 12B, and 12C formed in the intermediate position on the magnetic circuits connecting the connecting ends 13A, 13B, and 13C. The magnetic flux control means 8 (8a-8f) control the magnetic characteristics of the magnetic path to control the flow of the magnetic flux to the magnetic pole ends 12A, 12B, and 12C for switching the balance of the positive and negative magnetic forces at the magnetic pole ends 12A, 12B, and 12C.

In the bridge configuration shown in FIG. 11, sequentially switching the magnetic flux control means 8a—magnetic flux control means 8f switches the balance of the positive and negative magnetic forces at the magnetic pole ends 12A, 12B, and 12C.

Referring to FIG. 11B, controlling the magnetic flux control means 8b, 8c, and 8d (or magnetic flux control means 8a, 8e, and 8f) decreases the amount of the magnetic flux flowing through the magnetic circuit between the branch end 11A and the connecting end 13A, the magnetic circuit between the branch end 11B and the connecting end 13A, and the magnetic circuit between the branch end 11A and the connecting end 13B and, at the same time, increases the amount of the magnetic flux flowing through the magnetic circuit beginning at the N pole of the magnetic flux generator 2 and ending at the S pole of the magnetic flux generator 2 via the branch end 11A, connecting end 13A, magnetic pole end 12A, magnetic pole end 12B, connecting end 13B, and branch end 11B and the magnetic circuit beginning at the N pole of the magnetic flux generator 2 and ending at the S pole of the magnetic flux generator 2 via the branch end 11A, connecting end 13A, magnetic pole end 12A, magnetic pole end 12C, connecting end 13C, and branch end 11B.

This control of the increase/decrease in the amount of the magnetic flux makes the magnetic pole end 12A the positive pole (N pole), and the magnetic pole ends 12B and 12C the negative pole (S pole). The flow of magnetic flux flowing from the magnetic pole end 12A to the magnetic pole ends 12B and 12C is formed between the magnetic pole ends, and the second magnetic member 7 moves according to the direction of this magnetic flux.

Referring to FIG. 1C, controlling the magnetic flux control means 8a, 8b, and 8f (or magnetic flux control means 8c, 8d, and 8e) decreases the amount of the magnetic flux flowing through the magnetic circuit between the branch end 11A and the connecting end 13A, the magnetic circuit between the branch end 11B and the connecting end 13B, and the magnetic circuit between the branch end 11A and the connecting end 13C and, at the same time, increases the amount of the magnetic flux flowing through the magnetic circuit beginning at the N pole of the magnetic flux generator 2 and ending at the S pole of the magnetic flux generator 2 via the branch end 11A, connecting end 13B, magnetic pole end 12A, magnetic pole end 12C, connecting end 13C, and branch end 11B and the magnetic circuit beginning at the N pole of the magnetic flux generator 2 and ending at the S pole of the magnetic flux generator 2 via the branch end 11A, connecting end 13B, magnetic pole end 12B, magnetic pole end 12A, connecting end 13A, and branch end 11B.

This control of the increase/decrease in the amount of the magnetic flux makes the magnetic pole end 12B the positive pole (N pole), and the magnetic pole ends 12A and 12C the negative pole (S pole). The flow of magnetic flux flowing from the magnetic pole end 12B to the magnetic pole ends 12A and 12C is formed between the magnetic pole ends, and the second magnetic member 7 moves according to the direction of this magnetic flux.

Switching the direction of the magnetic flux repeatedly in the same manner as described above causes the second magnetic member 7 to perform the rotational motion with respect to the first magnetic member 4.

Although one of the three magnetic pole ends is used as the N pole with the other two magnetic pole ends as the S pole in the example described above, a configuration is also possible in which one of the three magnetic pole ends is used as the S pole with the other two magnetic pole ends as the N pole. In this case, a combination of the operations of the magnetic flux control means is changed according to the polarity of the magnetic poles at the magnetic pole ends.

FIG. 12 is a diagram showing one practical example of the second configuration example of the magnetic drive apparatus in the first embodiment.

In a magnetic drive apparatus 31 in the second configuration example, the first magnetic member is a stator 34 and the second magnetic member is a rotor 37. Stator magnetic paths 33u and 33d are layered vertically with a stator magnetic flux generator 32 between the layers. FIG. 12A shows the upside of the magnetic drive apparatus 31 (stator magnetic path 33u), and FIG. 12B shows the cross section taken along A-A in FIG. 12A. The downside of the magnetic drive apparatus 31 (stator magnetic path 33u) is not shown in FIG. 12A.

The magnetic drive apparatus 31 comprises the rotor 37 having a rotor magnetic flux generator 35, the stator 34 having the stator magnetic flux generators 32 and the stator magnetic paths 33, and magnetic flux control means 38 provided in an intermediate positions on the stator magnetic paths 33 for controlling the magnetic flux flowing through the stator magnetic paths 33. The stator magnetic path 33 divides the magnetic flux from each pole of the stator magnetic flux generator 32 into a plurality of branches with the branch ends as the magnetic pole ends. The two magnetic pole ends, one of which is the N pole and the other is the S pole (upside and downside magnetic pole ends in this case), are combined into one set, and those sets are arranged in different rotational angle positions of the rotor 37.

One practical example of the second configuration example is a configuration in which there are three magnetic pole ends. In FIG. 12, the stator 34 comprises an upside stator magnetic path 33u on the N pole side of the stator magnetic flux generator 32 and a downside stator magnetic path 33d on the S pole side. Each stator magnetic path surface is divided into three magnetic circuit branches, magnetic pole ends are formed, one at the end of each branch, and the magnetic pole ends are arranged circularly. The rotor 37 is arranged within this circle. Although the three stator magnetic flux generators 32 are arranged at an interval of an equal angle in FIG. 12, any number of stator magnetic flux generators 32, even one stator magnetic flux generator 32, may be used.

A plurality of magnetic flux control means 38A-38C are provided on each of the upside stator magnetic path 33u and the downside stator magnetic path 33d.

The magnetic flux control means 38A-38C are each provided between the stator magnetic path 33 and the magnetic pole ends 121A-121C. Referring to FIG. 12, the magnetic flux control means 38A controls the magnetic flux flowing to the magnetic pole end 121A, the magnetic flux control means 38B controls the magnetic flux flowing to the magnetic pole end 121B, and the magnetic flux control means 38C controls the magnetic flux flowing to the magnetic pole end 121C.

When the direction of the magnetic poles of the stator magnetic flux generator 32 is such that the upside stator magnetic path 33u side is the N pole and the downside stator magnetic path 33d side is the S pole as shown in FIG. 12B, the magnetic pole of the magnetic pole end on the upside stator magnetic path 33u side is always the N pole and the magnetic pole of the magnetic pole end of the downside stator magnetic path 33d side is always the S pole.

Therefore, for the plurality of magnetic pole ends in the above configuration, at which magnetic pole end the magnetic poles should be generated can be determined by the selection of the magnetic flux control means 38A-38C to be driven.

Each of the magnetic flux control means 38A-38C comprises a variable magnetic characteristics member 39 and magnetic characteristics control means 40. The variable magnetic characteristics member 39 is made of a material whose magnetic characteristics, such as the magnetic resistance, vary according to a stress, a temperature, or a magnetic field, as in the example described above. For example, the variable magnetic characteristics member can be formed by an anisotropic magnetic material, a magnetostrictive material, a magnetic material mixed with magnetic powder using resin as the binder, or a compound material produced by mixing magnetic powder and piezoelectric powder using resin as the binder.

In addition, as in the example described above, the magnetic flux control means 38A-38C are means for changing the magnetic characteristics of the variable magnetic characteristics member 39; for example, the magnetic flux control means may be a stress application element, a temperature application element, or a magnetic field application element. The magnetic flux control means can be installed by placing next to, embedded in, or mixed with, the variable magnetic characteristics member.

The configuration example shown in FIG. 12 is almost similar to the above-described configuration example in which there are two magnetic pole ends. Switching between the flow of the magnetic flux from the magnetic pole end of the upside stator magnetic path 33u side to the magnetic pole end of the downside stator magnetic path 33d side and the flow of the magnetic flux from the magnetic pole end of the downside stator magnetic path 33d side to the magnetic pole end of the upside stator magnetic path 33u side sequentially switches the polarities of the magnetic poles of the magnetic pole ends, arranged around the rotor 37, and drives the rotor 37.

Therefore, in the configuration example shown in FIG. 12, the rotational direction can be switched by a combination of the magnetic characteristics control means 40 that are driven, and the rotational speed can be changed by changing the switching speed of the magnetic characteristics control means 40 that are driven.

Next, with reference to FIG. 13 to FIG. 15, the following describes an operation example of the magnetic drive apparatus shown in FIG. 12.

In step 1 shown in FIG. 13A, the upside magnetic flux control means 38Bu and 38Cu are driven to limit the flow of the magnetic flux flowing to the magnetic pole ends 121Bu and 121Cu, and the downside magnetic flux control means 38Ad is driven to limit the flow of the magnetic flux flowing to the magnetic pole end 121Ad. This makes the upside magnetic pole end 121Au the N pole and makes the downside magnetic pole ends 121Bd and 121Cd the S pole to form the magnetic flux flowing from the upside magnetic pole end 121Au to the downside magnetic pole ends 121Bd and 121Cd.

In step 2 shown in FIG. 13B, the upside magnetic flux control means 38Cu is driven to limit the flow of the magnetic flux flowing to the magnetic pole end 121Cu, and the downside magnetic flux control means 38Ad and 38Bd are driven to limit the flow of the magnetic flux flowing to the magnetic pole ends 121Ad and 121Bd. This makes the upside magnetic pole ends 121Au and 121Bu the N pole and makes the downside magnetic pole end 121Cd the S pole to form the magnetic flux flowing from the upside magnetic pole ends 121Au and 121Bu to the downside magnetic pole end 121Cd.

In step 3 shown in FIG. 14A, the upside magnetic flux control means 38Au and 38Cu are driven to limit the flow of the magnetic flux flowing to the magnetic pole ends 121Au and 121Cu, and the downside magnetic flux control means 38Bd is driven to limit the flow of the magnetic flux flowing to the magnetic pole end 121Bd. This makes the upside magnetic pole end 121Bu the N pole and makes the downside magnetic pole ends 121Ad and 121Cd the S pole to form the magnetic flux flowing from the upside magnetic pole end 121Bu to the downside magnetic pole ends 121Ad and 121Cd.

In step 4 shown in FIG. 14B, the upside magnetic flux control means 38Au is driven to limit the flow of the magnetic flux flowing to the magnetic pole end 121Au, and the downside magnetic flux control means 38Bd and 38Cd are driven to limit the flow of the magnetic flux flowing to the magnetic pole ends 121Bd and 121Cd. This makes the upside magnetic pole ends 121Bu and 121Cu the N pole and makes the downside magnetic pole end 121Ad the S pole to form the magnetic flux flowing from the upside magnetic pole ends 121Bu and 121Cu to the downside magnetic pole end 121Ad.

In step 5 shown in FIG. 15A, the upside magnetic flux control means 38Au and 38Bu are driven to limit the flow of the magnetic flux flowing to the magnetic pole ends 121Au and 121Bu, and the downside magnetic flux control means 38Cd is driven to limit the flow of the magnetic flux flowing to the magnetic pole end 121Cd. This makes the upside magnetic pole end 121Cu the N pole and makes the downside magnetic pole ends 121Ad and 121Bd the S pole to form the magnetic flux flowing from the upside magnetic pole end 121Cu to the downside magnetic pole ends 121Ad and 121Bd.

In step 6 shown in FIG. 15B, the upside magnetic flux control means 38Bu is driven to limit the flow of the magnetic flux flowing to the magnetic pole end 121Bu, and the downside magnetic flux control means 38Ad and 38Cd are driven to limit the flow of the magnetic flux flowing to the magnetic pole ends 121Ad and 121Cd. This makes the upside magnetic pole ends 121Au and 121Cu the N pole and makes the downside magnetic pole end 121Bd the S pole to form the magnetic flux flowing from the upside magnetic pole ends 121Au and 121Cu to the downside magnetic pole end 121Bd.

Therefore, executing step 1 to step 6 causes the N pole to rotate 60 degrees in each step on the upside, and the S pole to rotate every 60 degrees in each step on the downside. The interaction between the change in the magnetic flux described above and the magnetic flux generated by the rotor 37 rotates the rotor 37.

Repeating step 1, step 3, and step 5, or repeating step 2, step 4, and step 6, of step 1 to step 6 described above also drives and rotates the rotor. In this case, the magnetic poles on the upside and the downside rotate 120 degrees in every step and this rotational magnetic flux drives the rotor.

Figure 18:
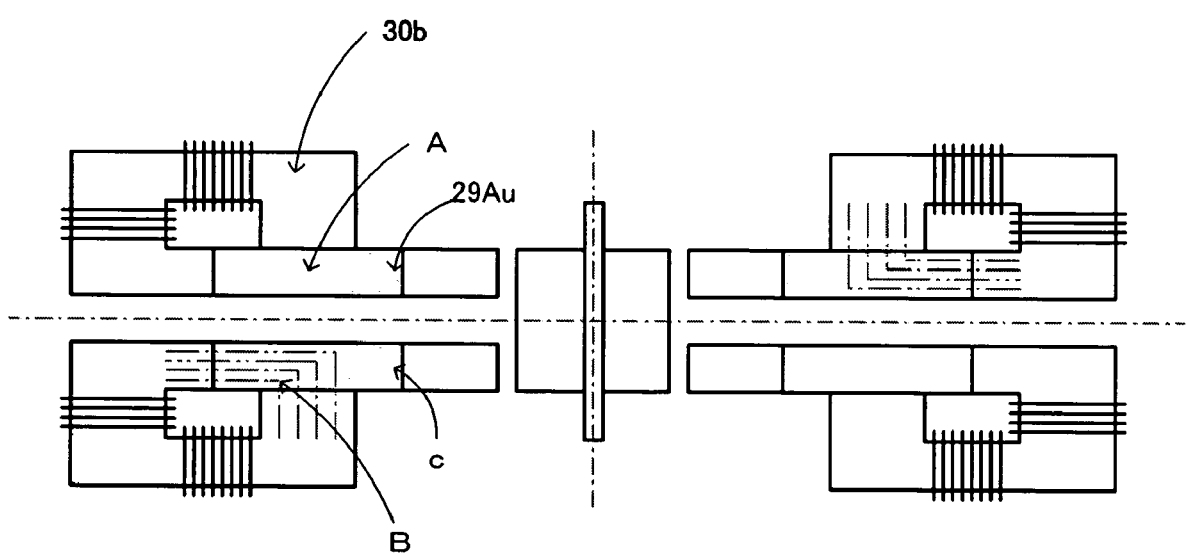
FIG. 18 is a diagram showing a configuration example in which the area of the magnetic path is controlled in the magnetic drive apparatus in the first embodiment of the present invention.

Next, the following describes various variations in the first embodiment with reference to FIG. 16 to FIG. 18.

FIG. 16 shows an example of the configuration in which magnetic characteristic control means 30, which is common to an upside stator magnetic path 23u and a downside stator magnetic path 23d, is provided to allow one magnetic characteristic control means 30 to control the flow of magnetic flux in the upside stator magnetic path 23u and the downside stator magnetic path 23d.

In FIG. 16A, the magnetic characteristic control means 30 is installed between the upside stator magnetic path 23u and the downside stator magnetic path 23d, and the stress by the compressive force and the stress by the tensile force are applied in which direction are opposite respectively, to the upside stator magnetic path 23u and the downside stator magnetic path 23d. This gives an opposite-direction magnetic flux change to the upside stator magnetic path 23u and the downside stator magnetic path 23d.

This configuration prevents the magnetic characteristic control means 30 from protruding from the stator magnetic paths 23, making the magnetic drive apparatus low profile.

FIGS. 16B and 16C show a configuration example in which one magnetic pole end of a magnetic pole pair is extended along the axial direction of the rotor towards the other magnetic pole end of the magnetic pole pair. FIG. 16C is a diagram viewed from the direction A in FIG. 16B. In FIG. 16B, the magnetic pole end 122u of the N pole on the upside stator magnetic path 23u side described above is extended towards the magnetic pole end direction of the downside stator magnetic path 23d constituting the magnetic pole pair. Also, the magnetic pole end 122d of the S pole on the downside stator magnetic path 23d side is extended towards the magnetic pole end direction of the upside stator magnetic path 23u constituting the magnetic pole pair. As shown in FIG. 16C, the extended, comb-shaped magnetic pole ends 122u and 122d are arranged alternately.

In this configuration, the magnetic pole ends can be provided along the axial direction of the rotor. Therefore, the configuration eliminates the biased operation force caused the magnetic pole ends arranged on one side of the rotor in the axial direction and reduces the effect of the momentum in the direction in which the axis of the rotor is tilted.

As in the configuration example described above, FIGS. 16D and 16E show a configuration example in which one magnetic pole end of a magnetic pole pair is extended along the axial direction of the rotor towards the other magnetic pole end of the magnetic pole pair. The magnetic pole ends are extended into the axial direction of the rotor by providing magnetic materials 123u and 123d between the magnetic pole end (N pole) of the upside stator magnetic path 23u side and the magnetic pole end (S pole) of the downside stator magnetic path 23d side that constitute the magnetic pole end pair. One magnetic pole end is opposed to the other with a nonmagnetic material 132 between them. As shown in FIG. 16E, the comb-shaped magnetic materials 123*u* and 123*d* are arranged alternately.

In this configuration, the magnetic pole ends can be provided along the axial direction of the rotor as in the configuration described above. Therefore, the configuration eliminates the biased operation force caused the magnetic pole ends arranged on one side of the rotor in the axial direction and reduces the effect of the momentum in the direction in which the axis of the rotor is tilted.

FIG. 16F shows a configuration in which the magnetizing direction of the rotor magnetic flux generator 25 is the rotational axial direction. No rotational driving force is generated when the magnetizing direction of the rotor is the rotational axial direction. Therefore, in this configuration example, rotor magnetic paths 133 are provided on the peripheral part of the rotor magnetic flux generator 25 to make the direction of a magnetic flux, which appears external to the rotor, orthogonal to the rotational axial direction and to set up an angle relation to allow the magnetic flux and the magnetic flux generated by the stator to work together for generating rotational driving force.

In this configuration where the magnetizing direction of the rotor magnetic flux generator 25 is the same as that of the stator magnetic flux generator 22, the rotor and the stator can be magnetized at the same time after assembling the rotor and the stator on the production line, the assembly process is simplified and therefore the assembly cost can be reduced.

FIG. 16G shows a configuration in which the radial direction length of the magnetic drive apparatus is reduced. To form this configuration, the magnetic pole ends of the stator side are bent into the rotational axial direction.

FIG. 16H shows the configuration in which the magnetizing direction of the stator magnetic flux generator 22 and the magnetizing direction of the rotor magnetic flux generator 25 are the same. In the configuration shown in the figure, the stator magnetic flux generator 22 is provided on the upside or downside stator magnetic path 23, and the stator magnetic flux generator 22 is magnetized into the same direction as that of the rotor magnetic flux generator 25 of the rotor 27.

In this configuration where the magnetizing direction of the rotor magnetic flux generator 25 is the same as that of the stator magnetic flux generator 22, the rotor and the stator can be magnetized at the same time after assembling the rotor and the stator on the production line, the assembly process is simplified and therefore the assembly cost can be reduced. In addition, this configuration reduces the effect of stress and gives greater tolerance.

In the configuration example shown in FIG. 6 described above, the slope of magnetization is changed to control the permeability μ for controlling the amount of magnetic flux. In general, the amount of magnetic flux can be changed by controlling the permeability μ, length L, and area S of the magnetic path.

The following describes a configuration example in which the amount of magnetic flux is changed by controlling the length L of the magnetic path with reference to FIG. 17 and a configuration example in which the amount of magnetic flux is changed by controlling the area S of the magnetic path with reference to FIG. 18.

The configuration example shown in FIG. 17 is a configuration in which the permeability μ of the magnetic path and/or the length L of the magnetic path is controlled in the configuration example shown in FIG. 7 described above. To accomplish this control, the variable magnetic characteristics member is fixed in different modes. In this configuration example, the change in the amount of magnetic flux is increased to decrease the power consumption.

In the configuration examples shown in FIG. 17A, FIG. 17B, FIG. 17C, and FIG. 17D, the variable magnetic characteristics member 29Au provided on the upside stator magnetic path 23Au and the variable magnetic characteristics member 29Ad provided on the downside stator magnetic path 23Ad are each held via stress transmission buffering means 135. This stress transmission buffering means 135 provides a gap between the stator magnetic path 23 and the variable magnetic characteristics member 29 to generate a large change in the amount of magnetic flux and thereby reduces the power consumption.

The variable magnetic characteristics member 29 is fixed in the length direction of the stator magnetic path with respect to the stator magnetic path 23 in the configuration shown in FIG. 7 described above, while the variable magnetic characteristics member 29 is fixed in the side width direction of the stator magnetic path in the configuration shown in FIG. 17.

The stress transmission buffering means 135 fixes the variable magnetic characteristics member 29. When the variable magnetic characteristics member 29 is reduced, the stress transmission buffering means 135 forms a gap between itself and the stator magnetic path 23. This increases the amount of magnetic leakage flux and increases the magnetic resistance and, therefore, makes the difference, which occurs between the amount of magnetic flux in the stator magnetic path through which the magnetic flux is to be passed and the amount of magnetic flux in the stator magnetic path through which the magnetic flux is not to be passed, larger than that in the configuration shown in FIG. 7.

FIG. 17A and FIG. 17B show a configuration example in which the stress transmission buffering means 135, made of silicon or urethan, fixes the variable magnetic characteristics member 29 only in a non-magnetic member 134 provided between the upside stator magnetic path 23Au and the downside stator magnetic path 23Ad. FIG. 17C and FIG. 17D show a configuration example in which the stress transmission buffering means 135 fixes only the central part of the variable magnetic characteristics members 29Au and 29Ad on the projection on the non-magnetic member 134 provided between the upside stator magnetic path 23Au and the downside stator magnetic path 23Ad.

FIG. 17A and FIG. 17C show the state in which the variable magnetic characteristics member 29Ad on the downside stator magnetic path 23Ad side is extended and the variable magnetic characteristics member 29Au on the upside stator magnetic path 23Au side is reduced. At this time, the stress transmission buffering means 135 forms a gap between the reduced variable magnetic characteristics member 29Au and the upside stator magnetic path 23Au. This gap can increase the difference between the reduced amount of magnetic flux on the upside stator magnetic path 23Au and the increased amount of magnetic flux on the downside stator magnetic path 23Ad side.

FIG. 17B and FIG. 17D show the state in which the variable magnetic characteristics member 29Ad on the downside stator magnetic path 23Ad side is reduced and the variable magnetic characteristics member 29Au on the upside stator magnetic path 23Au side is extended. At this time, the stress transmission buffering means 135 forms a gap between the reduced variable magnetic characteristics member 29Ad and the downside stator magnetic path 23Ad. This gap can increase the difference between the increased amount of magnetic flux on the upside stator magnetic path 23Au and the reduced amount of magnetic flux on the downside stator magnetic path 23Ad side.

In the configuration example shown in FIG. 18, the area S of the magnetic path, instead of the permeability µ of the magnetic path, is controlled in the configuration example shown in FIG. 7 described above. A configuration in which the area S of the magnetic path is controlled can be built by providing magnetic characteristics control means 30b in a part of the magnetic path for causing magnetic saturation. FIG. 18 shows an example in which a coil structure is provided as the magnetic characteristics control means 30b. The coil structure of the magnetic characteristics control means 30b causes magnetic saturation in a part of the variable magnetic characteristics member 29 on the magnetic path.

When the coil structure is not driven, the variable magnetic characteristics member 29 is not magnetically saturated and the magnetic flux from the stator magnetic flux generator 22 flows through area A. On the other hand, when the coil structure is driven, the variable magnetic characteristics member 29 is magnetically saturated (part B in the figure) and the area of the part where the magnetic flux from the stator magnetic flux generator 22 flows becomes C. In this way, the area S of the magnetic path is controlled. Therefore, the amount of magnetic flux flowing the magnetic path can be controlled.

In the configuration example shown in FIG. 18, the variable magnetic characteristics member, which can be configured as an integrated part using the same material (such as Permalloy) as that used for the stator magnetic path, can be formed easily at a low cost.

Next, a second embodiment of a magnetic drive apparatus according to the present invention will be described. In the second embodiment, the flow of magnetic flux is controlled by selecting and switching a plurality of magnetic circuits. FIG. 19 is a general diagram showing the second embodiment.

Figure 19A:
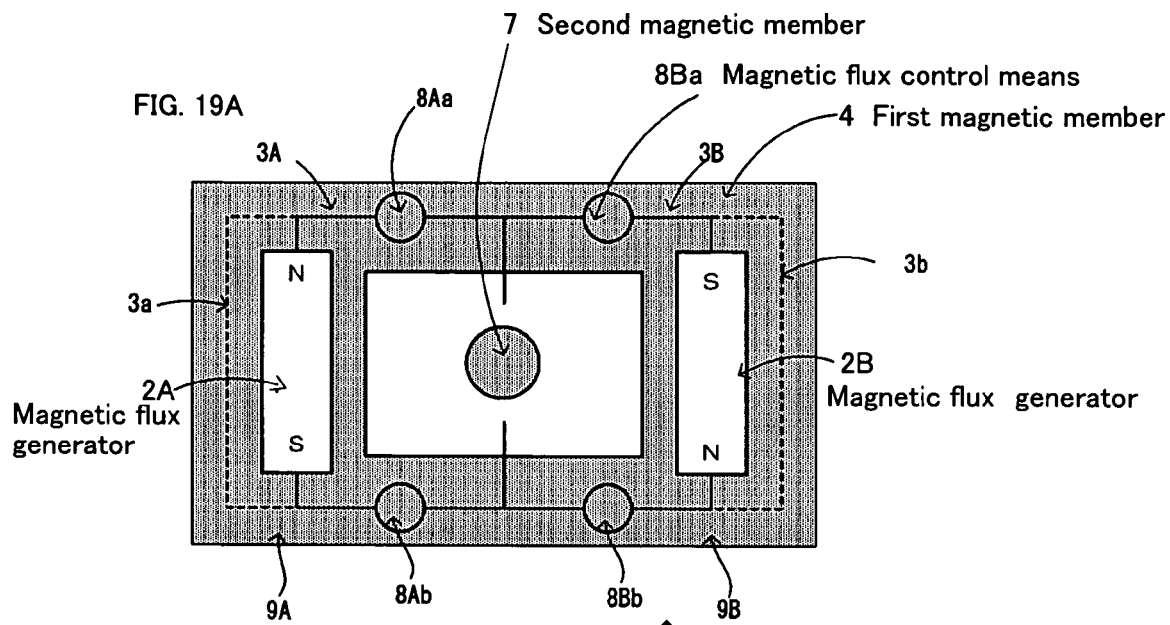
FIG. 19 is a diagram showing the overview of a second embodiment of the present invention.

Referring to FIG. 19A, a magnetic drive apparatus 1 comprises a first magnetic member 4 and a second magnetic member 7 wherein both magnetic members move relative to one another.

The first magnetic member 4 comprises a plurality of magnetic circuits 9 (9A, 9B) formed by connecting both magnetic poles of each of magnetic flux generators 2 of the first magnetic member 4. In this example, the first magnetic member 4 has two magnetic circuits 9A and 9B.

Each magnetic circuit 9 comprises two magnetic paths each connecting the magnetic poles of the magnetic flux generator 2. One of the magnetic paths has a pair of magnetic pole ends, between which the second magnetic member 7 is provided, and has magnetic flux control means 8 for controlling the flow of magnetic flux flowing through the magnetic path. The other magnetic path receives a magnetic flux separately from the magnetic flux generator 2 to reduce the effect of the leakage flux on the other part.

One of the magnetic circuits 9A comprises the two magnetic paths 3A and 3a connecting the magnetic poles of a magnetic flux generator 2A. One of the magnetic paths 3A has, at its intermediate position, a pair of magnetic pole ends between which the second magnetic member 7 is provided and has magnetic flux control means 8Aa and 8Ab. The other magnetic path 3a (indicated by a broken line in the figure) connects the magnetic poles of magnetic flux generator 2A.

The magnetic flux control means 8Aa and 8Ab control the formation of a magnetic circuit through the second magnetic member 7. The means forms a magnetic circuit to flow a magnetic flux through the second magnetic member 7 and increases the magnetic resistance in the magnetic circuit to reduce the amount of magnetic flux passing through the second magnetic member 7.

Similarly, the other magnetic circuit 9B comprises the two magnetic paths 3B and 3b connecting the magnetic poles of a magnetic flux generator 2B. One of the magnetic paths 3B has, at its intermediate position, a pair of magnetic pole ends between which the second magnetic member is provided and has magnetic flux control means 8Ba and 8Bb. The other magnetic path 3b (indicated by a broken line in the figure) connects the magnetic poles of magnetic flux generator 2B. The magnetic flux generators 2A and 2B are set up so that the magnetic pole direction is opposite between them.

The magnetic flux control means 8Ba and 8Bb control the formation of a magnetic circuit through the second magnetic member 7. The means forms a magnetic circuit to flow a magnetic flux through the second magnetic member 7 and increases the magnetic resistance in the magnetic circuit to reduce the amount of magnetic flux passing through the second magnetic member 7.

In the configuration described above, the second magnetic member 7 is shared by the two magnetic circuits: magnetic circuit 9A and magnetic circuit 9B. The magnetic flux control means 8 (8Aa-8Bd) switch the magnetic circuits from one to another to switch the magnetic flux operating on the second magnetic member 7. In this case, the direction of the magnetic poles (positive pole and negative pole) operating on the second magnetic member 7 can be switched by switching different-direction magnetic fluxes.

Figure 19B:
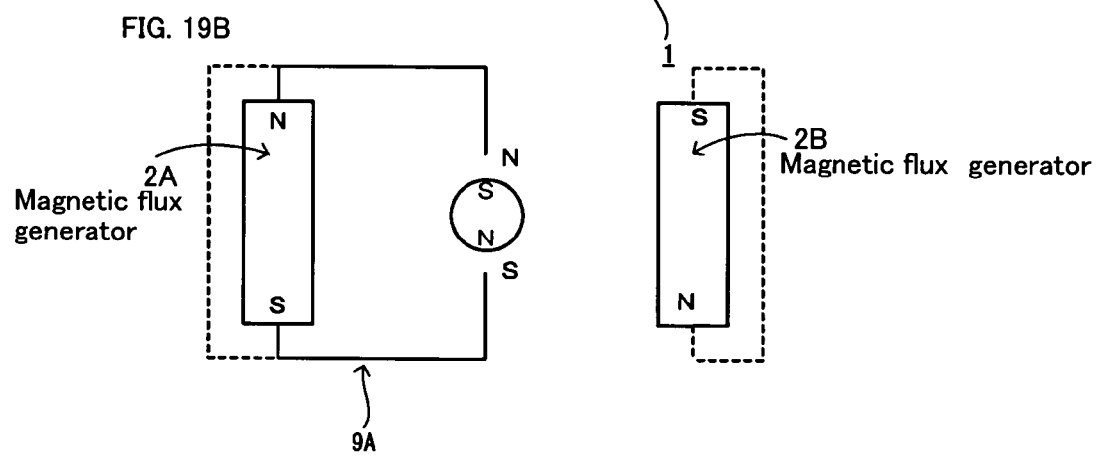
Figure 19C:
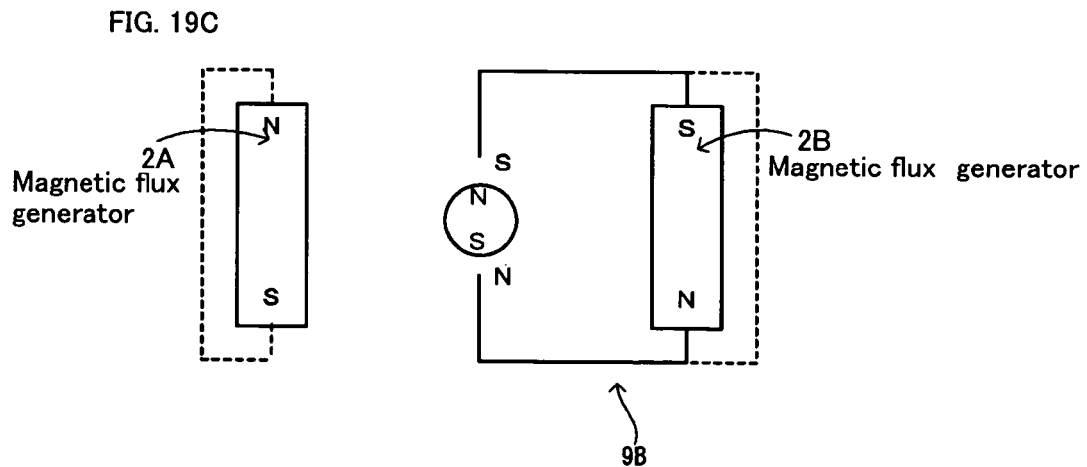

FIG. 19B shows an example of switching for flowing the magnetic flux of the magnetic circuit 9A to the second magnetic member 7, and FIG. 19C shows an example of switching for flowing the magnetic flux of the magnetic circuit 9B to the second magnetic member 7.

In FIG. 19B, the magnetic flux control means 8Ba and 8Bb on the magnetic circuit 9B side limits the flow of magnetic flux flowing through the magnetic path 3B and, at the same time, the magnetic flux control means 8Aa and 8Ab on the magnetic circuit 9A side allow a magnetic flux to flow through the magnetic path 3A to form the magnetic poles (the top magnetic pole end is the N pole and the bottom magnetic pole end is the S pole) in the direction shown in the figure at the magnetic pole ends based on the magnetic flux from the magnetic flux generator 2A.

At this time, in the magnetic circuit 9B, the magnetic flux from the magnetic flux generator 2B flows to the magnetic circuit through the magnetic path 3b (indicated by the broken line) to prevent the magnetic leakage flux from operating on the second magnetic member 7.

In FIG. 19C, the magnetic flux control means 8Aa and 8Ab on the magnetic circuit 9A side limits the flow of magnetic flux flowing through the magnetic path 3A and, at the same time, the magnetic flux control means 8Ba and 8Bb on the magnetic circuit 9B side allow a magnetic flux to flow through the magnetic path 3B to form the magnetic poles (the top magnetic pole end is the S pole and the bottom magnetic pole end is the N pole) in the direction shown in the figure at the magnetic pole ends based on the magnetic flux from the magnetic flux generator 2B.

At this time, in the magnetic circuit 9A, the magnetic flux from the magnetic flux generator 2A flows to the magnetic circuit through the magnetic path 3a (indicated by the broken line), as in FIG. 19B, to prevent the leakage magnetic flux from operating on the second magnetic member 7.

In this case, because the magnetic pole direction of the magnetic flux generator 2A is opposite to that of the magnetic flux generator 2B, the direction of the magnetic flux flowing through the second magnetic member 7 is switched each time the magnetic circuit is switched between the magnetic circuit 9A and the magnetic circuit 9B. The repeated switching of the magnetic flux direction between the configurations shown in FIG. 19B and FIG. 19C causes the second magnetic member 7 to perform the rotational motion with respect to the first magnetic member 4.

FIG. 20 shows a practical example of the second embodiment. A magnetic drive apparatus 41 comprises a stator magnetic path 43A and a stator magnetic path 43B, and those paths share a pair of magnetic pole ends between which a rotor 47 is provided.

The stator magnetic path 43A has a stator magnetic flux generator 42A and has magnetic flux control means 48Aa and magnetic flux control means 48Ab between the stator magnetic flux generator 42A and a pair of magnetic pole ends. The magnetic flux control means 48Aa and the magnetic flux control means 48Ab are controlled to control the flow of magnetic flux. The stator magnetic path 43B has a stator magnetic flux generator 42B and has magnetic flux control means 48Ba and magnetic flux control means 48Bb between the stator magnetic flux generator 42B and the pair of magnetic pole-ends. The magnetic flux control means 48Ba and the magnetic flux control means 48Bb are controlled to control the flow of magnetic flux.

In the above configuration, by arranging the magnetic pole direction of the stator magnetic flux generator 42A opposite to that of the stator magnetic flux generator 42B, the magnetic pole direction at the magnetic pole ends can be switched by controlling the flow of the magnetic flux.

Referring to FIG. 20A, the magnetic flux control means 48Aa and 48Ab limit the magnetic flux flowing through the stator magnetic path 43A between the stator magnetic flux generator 42A and the magnetic pole ends and, on the other hand, the magnetic flux control means 48Ba and 48Bb allow the magnetic flux to flow through the stator magnetic path 43B between the stator magnetic flux generator 42B and the magnetic pole ends (arrow in FIG. 20A). This makes the upper magnetic pole end the N pole and makes the lower magnetic pole end the S pole with respect to the rotor 47.

FIG. 20B shows the cross section taken on line A-A in FIG. 20A. The magnetic flux control means 48A comprises a variable magnetic characteristics member 49A and magnetic characteristic control means 50A for controlling the magnetic characteristics of the variable magnetic characteristics member 49A. The magnetic flux control means 48B comprises a variable magnetic characteristics member 49B and magnetic characteristic control means 50B for controlling the magnetic characteristics of the variable magnetic characteristics member 49B.

Figure 21A:
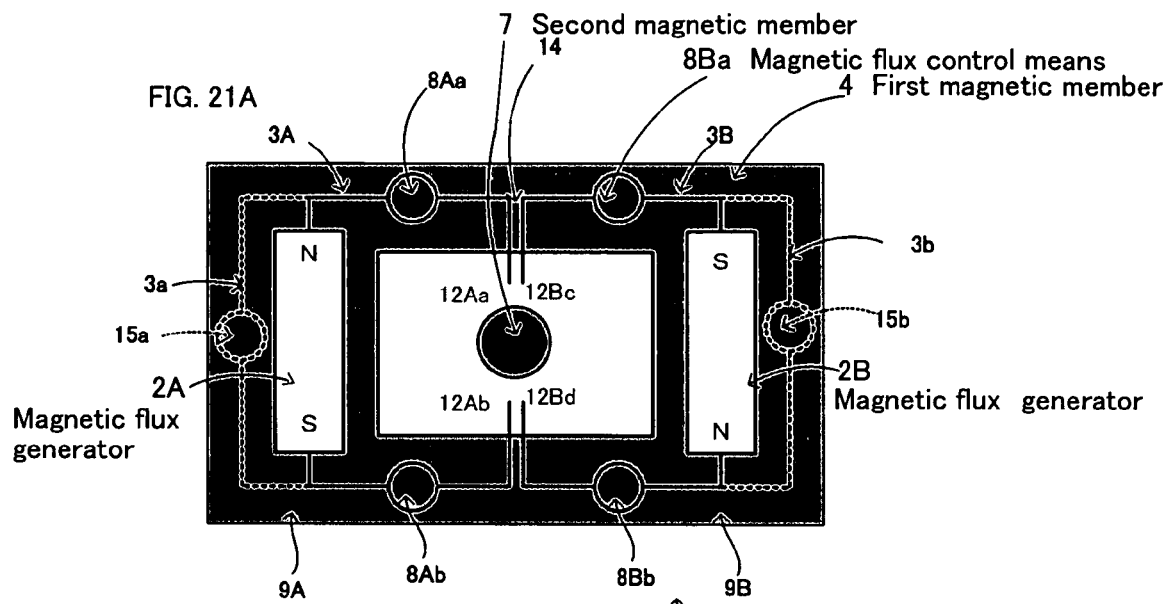
FIG. 21 is a general diagram showing a configuration example in which a gap is provided in the magnetic drive apparatus in the second embodiment of the present invention.

FIG. 21 is a general diagram showing a configuration example in which a gap is provided in the mode in which the magnetic flux flow is controlled by selecting from and switching between a plurality of magnetic circuits. FIG. 22 is a diagram showing a practical example of the configuration in which a gap is provided.

The configurations shown in FIG. 21 and FIG. 22 are almost similar to those shown in FIG. 19 and FIG. 20 except the connecting ends. The following describes only the differing part of the configuration but omits the common configuration.

In this configuration, the magnetic circuits are magnetically separated by a gap provided at the connecting ends and by the arrangement of the magnetic pole ends. This magnetic separation reduces an unnecessary magnetic flux leakage between the magnetic paths and between magnetic pole ends and increases the utilization of magnetic fluxes.

Referring to FIG. 21, the magnetic drive apparatus comprises a magnetic circuit 9A and a magnetic circuit 9B that are magnetically separated each other.

The magnetic circuit 9A comprises two branched paths: magnetic path 3A and magnetic path 3a. The magnetic circuit 9A forms magnetic pole ends 12Aa and 12Ab via magnetic flux control means 8Aa and 8Ab. The magnetic path 3a has a magnetoresistor 15a.

Similarly, the magnetic circuit 9B comprises two branched paths: magnetic path 3B and magnetic path 3b. The magnetic circuit 9B forms magnetic pole ends 12Bc and 12Bd via magnetic flux control means 8Ba and 8Bb. The magnetic path 3b has a magnetoresistor 15b. Also in the configuration shown in FIG. 19 described above, the magnetic paths 3a and 3b may have magnetoresistors 15a and 15b.

Figure 21B:
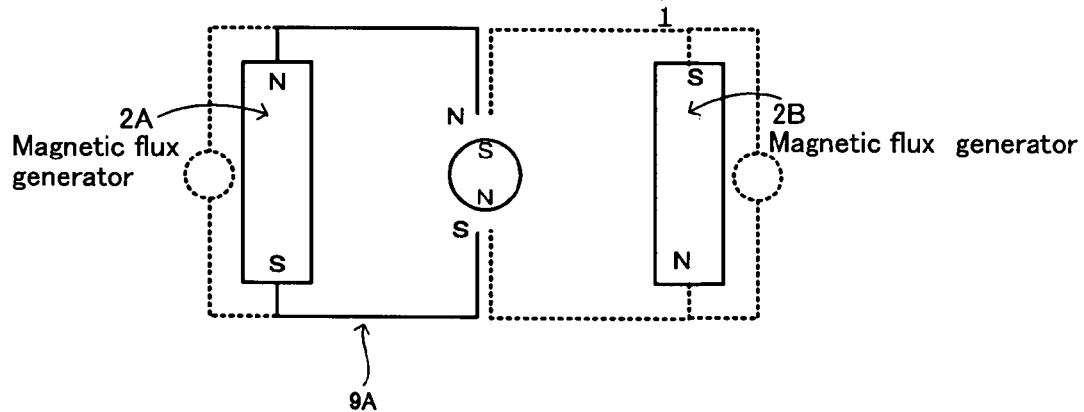
Figure 21C:
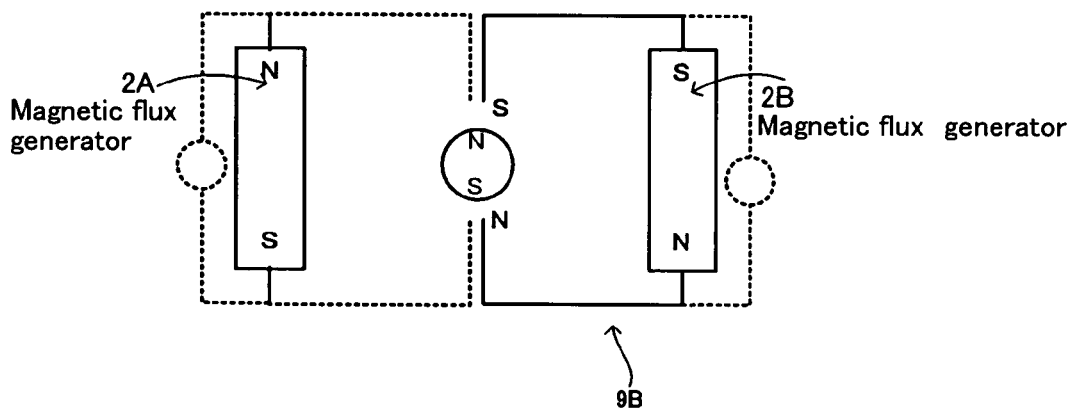
Figure 22A:
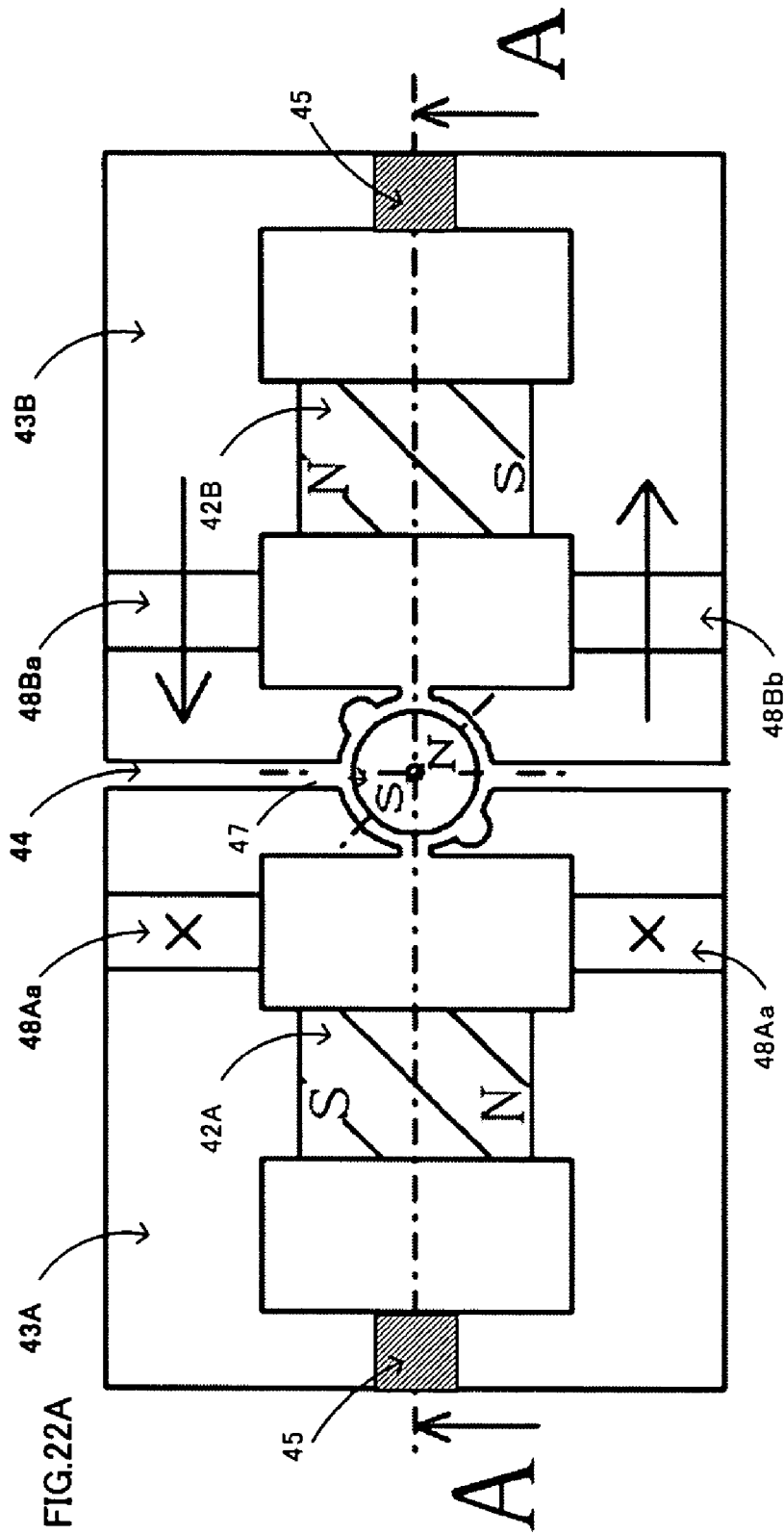
FIG. 22 is diagram showing the operation of a practical example of the magnetic drive apparatus that has a gap in the second embodiment of the present invention.
Figure 22B:
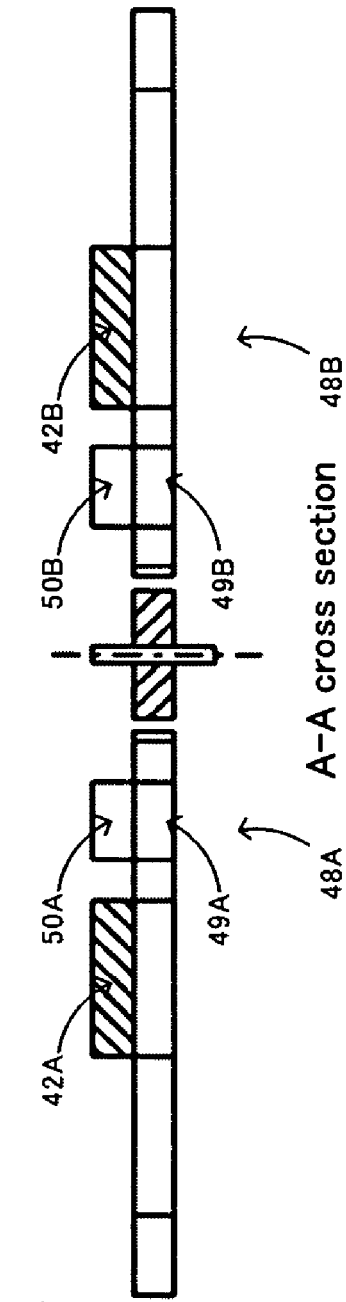

Magnetically separating the magnetic circuit 9A and the magnetic circuit 9B magnetically separates the magnetic pole ends, opposed to the second magnetic member 7, in the states shown in FIG. 21B and FIG. 21C and prevents a reduction in the driving force caused by magnetic flux leakage.

The configuration shown in FIG. 22 is almost similar to the configuration shown in FIG. 20 except that a gap 44 is provided in the magnetic paths leading to the magnetic pole ends. This configuration magnetically separates between the magnetic paths leading to the stator magnetic flux generators 42A and 42B and between the magnetic pole ends.

Magneto-resistors 45 are provided on the stator magnetic flux generators 42A and 42B. The magneto-resistors 45 adjust the amount of magnetic flux flowing through the rotor 47 when the magnetic flux control means 48A and 48B are driven.

Next, with reference to FIGS. 23 and 24, the following describes another configuration example of the second embodiment in which the flow of magnetic flux is controlled by selecting from and switching between a plurality of magnetic circuits.

The two magnetic circuits are provided in the first configuration example as shown in FIG. 19 to FIG. 22, while three magnetic circuits are provided in this configuration example. The three magnetic circuits are arranged with the three magnetic pole ends at a predetermined angle interval.

FIG. 23 is a general diagram showing the second configuration example.

Referring to FIG. 23A, a magnetic drive apparatus 1 comprises a first magnetic member 4 and a second magnetic member 7 as in the first configuration example shown in FIG. 17 and moves both magnetic members with respect to one another.

Three magnetic circuits, 9A, 9B, and 9C, are formed on the first magnetic member 4 by the magnetic paths each connecting both magnetic poles of magnetic flux generators, 2A, 2B, and 2C.

Each magnetic circuit 9 comprises two magnetic paths connecting the magnetic poles of the magnetic flux generator 2. One of the magnetic paths has a pair of magnetic pole ends between which the second magnetic member 7 is provided and has magnetic flux control means 8 for controlling the flow of magnetic flux flowing the magnetic path. The other magnetic path receives a magnetic flux from the magnetic flux generator 2 to reduce the effect of the leakage magnetic flux on the other part when the magnetic path described above is not used.

For example, the magnetic circuit 9A has two magnetic paths, 3A and 3a, connecting the magnetic poles of the magnetic flux generator 2A. One of the magnetic paths indicated by 3A has, in its intermediate position, a pair of magnetic pole ends between which the second magnetic member 7 is provided and has magnetic flux control means 8Aa and 8Ab. The other magnetic path 3a (indicated by the broken line) connects the magnetic poles of the magnetic flux generator 2.

The magnetic flux control means 8Aa and 8Ab control the formation of a magnetic circuit passing through the second magnetic member 7. The magnetic circuit flows a magnetic flux to the second magnetic member 7. As the magnetic resistance in the magnetic circuit increases, the amount of magnetic flux passing to the second magnetic member 7 is reduced. The same is true for the other magnetic circuits 9B and 9C.

In the configuration described above, the three magnetic circuits 9A, 9B, and 9C share the second magnetic member 7. The magnetic flux control means 8 (8Aa, 8Ab, 8Ba, 8Bb, 8Ca, 8Cb) switch the magnetic circuits to switch the magnetic flux operating on the second magnetic member 7. At this time, by changing the direction of magnetic flux to be switched, the direction of magnetic poles (positive pole and negative pole) operating on the second magnetic member 7 can be switched.

FIG. 23B shows an example of switching in which the magnetic flux of the magnetic circuit 9A flows to the second magnetic member 7, FIG. 23C shows an example of switching in which the magnetic flux of the magnetic circuit 9B flows to the second magnetic member 7. An example of switching in which the magnetic flux of the magnetic circuit 9C flows to the second magnetic member 7 is omitted.

In FIG. 23B, the magnetic flux control means 8Ba-8Bb on the magnetic circuit 9B side limit the flow of magnetic flux through the magnetic path 3B, and the magnetic flux control means 8Ca-8Cb on the magnetic circuit 9C side limit the flow of magnetic flux through the magnetic path 3C.

In addition, the magnetic flux control means 8Aa-8Ab on the magnetic circuit 9A side allow the magnetic flux to flow through the magnetic path 3A. The magnetic flux from the magnetic flux generator 2A forms the magnetic poles at the magnetic pole ends in the direction shown in the figure (upper magnetic pole end is the N pole, and lower magnetic pole end is the S pole).

In this case, the magnetic flux from the magnetic flux generator 2B in the magnetic circuit 9B flows through the magnetic circuit passing through the magnetic path 3*b* (indicated by the broken line), and the magnetic flux from the magnetic flux generator 2C in the magnetic circuit 9C flows through the magnetic circuit passing through the magnetic path 3*c* (indicated by the broken line), to prevent the leakage magnetic flux from operating on the second magnetic member 7.

In FIG. 23C, the magnetic flux control means 8Aa-8Ab on the magnetic circuit 9A side limit the flow of magnetic flux through the magnetic path 3A, and the magnetic flux control means 8Ca-8Cb on the magnetic circuit 9C side limit the flow of magnetic flux through the magnetic path 3C. In addition, the magnetic flux control means 8Ba-8Bb on the magnetic circuit 9B side allow the magnetic flux to flow through the magnetic path 3B. The magnetic flux from the magnetic flux generator 2B forms the magnetic poles at the magnetic pole ends in the direction shown in the figure (upper magnetic pole end is the S pole, and lower magnetic pole end is the N pole).

In this case, also in the magnetic circuits 9A and 9C, the magnetic flux from the magnetic flux generator 2A flows through the magnetic circuit passing through the magnetic path 3*a* (indicated by the broken line), and the magnetic flux from the magnetic flux generator 2C flows through the magnetic circuit passing through the magnetic path 3*b* (indicated by the broken line), as in FIG. 23B to prevent the leakage magnetic flux from operating on the second magnetic member 7.

In this case, the magnetic pole direction of the magnetic flux generators 2A, 2B, and 2C is set as the forward direction (for example, clockwise or counterclockwise). This allows the direction of magnetic flux flowing to the second magnetic member 7 to be switched each time the magnetic circuit is switched among magnetic circuits 9A, 9B, and 9C. Controlling the increase/decrease in the amount of magnetic flux by repeating this switching operation causes the second magnetic member 7 to perform rotational operation with respect to the first magnetic member 4.

FIG. 24 is a diagram showing a practical example of the second configuration in the second embodiment. A magnetic drive apparatus 51 comprises three stator magnetic paths 53A-53C, three stator magnetic flux generators 52A-52C, six magnetic flux control means 58A1, 58A2, 58B1, 58B2, 58C1, and 58C2 and, around a rotational body 57, three magnetic pole ends.

Controlling the magnetic flux control means 58A1-58C2 controls the flow of magnetic flux to switch the direction of magnetic poles generated at the magnetic pole ends.

FIG. 24B is a diagram showing one state of magnetic flux control. The magnetic flux control means 58B1, 58B2, 58C1, and 58C2 perform the control operation to limit the magnetic flux flowing through the stator magnetic paths 53A and 53B between the stator magnetic flux generator 52B and the magnetic pole ends, and the magnetic flux flowing through the stator magnetic paths 53B and 53C between the stator magnetic flux generator 52C and the magnetic pole ends, and the magnetic flux control means 58A1 and 58A2 perform the control operation to allow the magnetic flux to flow through the stator magnetic paths 53A and 53C between the stator magnetic flux generator 52A and the magnetic pole ends. This makes the upper magnetic pole end in the figure the N pole, and the left magnetic pole end in the figure the S pole against to the rotational bidy.

As in the FIG. 22, a gap may also be provided in the magnetic paths leading to the magnetic pole ends. This configuration magnetically separates between the magnetic paths leading to the stator magnetic flux generators 52A, 52B, and 52C and between the magnetic pole ends.

Magnetoresistors are provided on the stator magnetic flux generators 52A, 52B, and 52C. When the magnetic flux control means 58A1, 58A2, 58B1, 58B2, 58C1, and 58C2 are driven, those magnetoresistors adjust the amount of magnetic flux flowing to the rotational body 57.

Although the configuration example in which the magnetic member is rotated has been described above, the embodiment may also be applied to other operation modes.

The magnetic circuit in the bridge configuration in FIG. 3 described above cannot continuously rotate the second magnetic member 7 when the magnetic pole ends are arranged in the same plane in that configuration. Therefore, in the example described above, the stator magnetic paths and the magnetic pole ends with the same polarity are formed in the same plane as shown in FIGS. 4 and 5 and the planes with different polarities are laminated to implement a magnetic circuit in the bridge configuration.

With reference to FIG. 25 to FIG. 28, the following describes the configuration in which a bridge-configuration magnetic circuit is formed in the same plane.

Figure 25A:
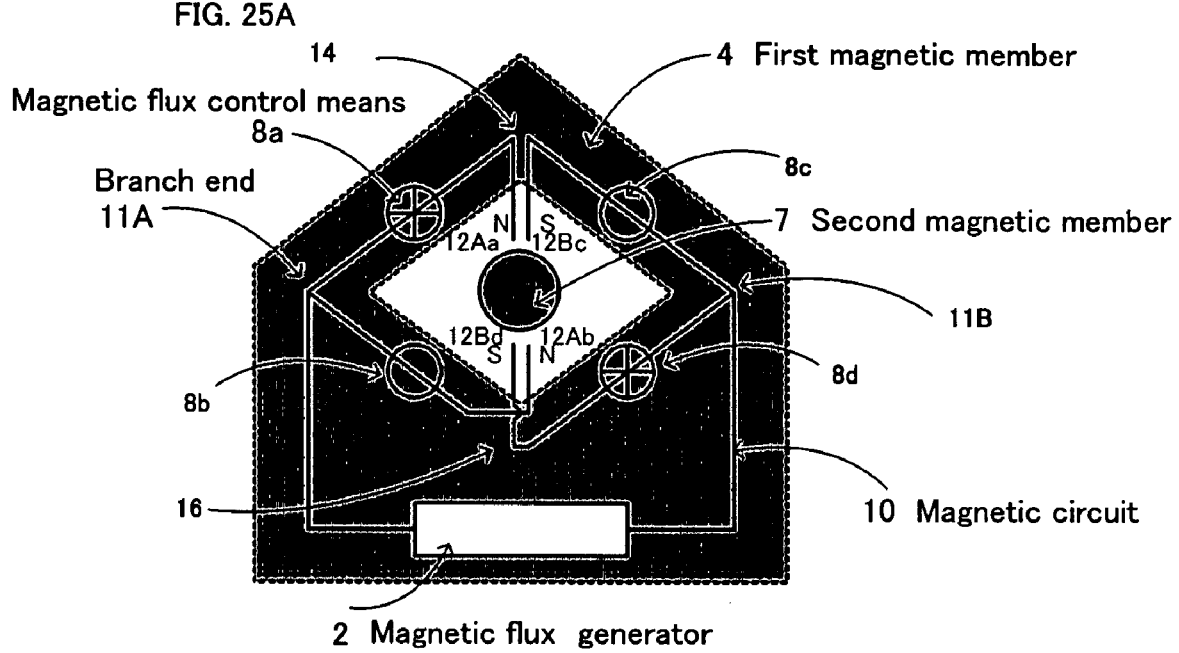
FIG. 25 is a general diagram showing a configuration example in which a bridge-configuration magnetic circuit is formed in the same plane.

FIG. 25 and FIG. 26 are general diagrams showing configuration examples in which a bridge-configuration magnetic circuit is formed in the same plane. FIG. 26 is a diagram showing an example in which the magnetic pole ends are arranged in the rotational direction of the rotor at an interval of 90 degrees. The figure shows the configuration having a gap.

The bridge configuration shown in FIG. 25 and FIG. 26 are almost similar to the bridge configuration shown in FIG. 3 except that the magnetic paths are crossed.

In the bridge configuration shown in FIG. 25 and FIG. 26, the switching control operation is performed, as in the example shown in FIG. 3, in such a way that the set of the magnetic flux control means 8a and the magnetic flux control means 8d and the set of the magnetic control means 8b and the magnetic flux control means 8c are alternately operated to switch the balance between positive and negative magnetic forces appearing at the magnetic pole ends 12A and 12B. In this bridge configuration, a part of the magnetic paths is crossed at a crossing section 16.

This crossing section 16 changes the order of the magnetic pole end 12Ab and the magnetic pole end 12Bd in FIG. 3 described above, and the magnetic pole ends are arranged around the second magnetic member 7 in order of 12Aa (N pole), 12Bd (S pole), 12Ab (N pole), and 12Bc (S pole). Because, in the example shown in FIG. 3, the magnetic pole ends are arranged around the second magnetic member 7 in order of magnetic pole ends 12Aa (N pole), 12Ab (N pole), 12Bc (S pole), and 12Bc (S pole), the plane in which the S-pole magnetic pole ends are arranged and the plane in which the N-pole magnetic pole ends are arranged are laminated. In this configuration example, a part of the magnetic paths are crossed at the crossing section 16 to allow all the magnetic poles to be arranged in the same plane.

Figure 25B:
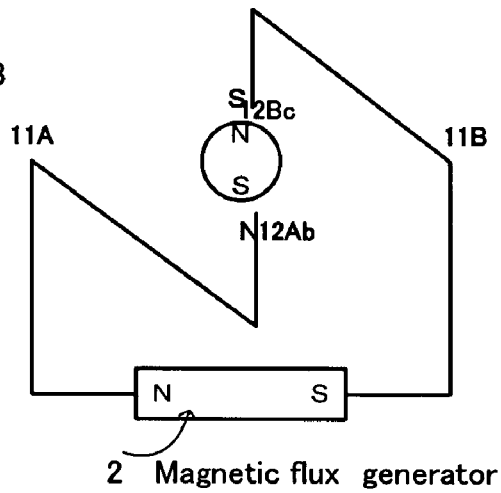

FIG. 25B is a diagram showing one magnetic circuit state in the bridge configuration. In this magnetic circuit state, controlling the magnetic flux control means 8a and 8d (or magnetic control means 8b and 8c) decreases the amount of magnetic flux flowing through the magnetic circuit between the branch end 11A and the magnetic pole end 12Aa and the magnetic circuit between the branch end 11B and the magnetic pole end 12Bd and forms a magnetic circuit beginning at the N pole of the magnetic flux generator 2 and ending at the S pole of the magnetic flux generator 2 via the branch end 11A, magnetic pole end 12Ab, magnetic pole end 12Bc, and branch end 11B.

Controlling the increase/decrease in the amount of magnetic flux makes the magnetic pole end 12Ab the positive pole (N pole), and the magnetic pole end 12Bc the negative pole (S pole), to form the flow of magnetic flux between the magnetic pole ends from the magnetic pole end 12Ab to the magnetic pole end 12Bc. The second magnetic member 7 moves according to the direction of magnetic flux.

Figure 25C:
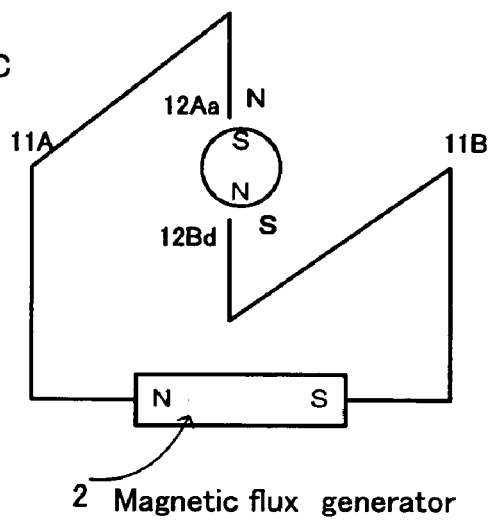

FIG. 25C is a diagram showing another magnetic circuit state in the bridge configuration. In this magnetic circuit state, controlling the magnetic flux control means 8b and 8c (or magnetic control means 8a and 8d) decreases the amount of magnetic flux flowing through the magnetic circuit between the branch end 11A and the magnetic pole end 12Ab and the magnetic circuit between the branch end 11B and the magnetic pole end 12Bc and forms a magnetic circuit beginning at the N pole of the magnetic flux generator 2 and ending at the S pole of the magnetic flux generator 2 via the branch end 11A, magnetic pole end 12Aa, magnetic pole end 12Bd, and branch end 11B.

Controlling the increase/decrease in the amount of magnetic flux makes the magnetic pole end 12Aa the positive pole (N pole), and the magnetic pole end 12Bd the negative pole (S pole), to form the flow of magnetic flux between the magnetic pole ends from the magnetic pole end 12Aa to the magnetic pole end 12Bd that is the opposite direction as that in FIG. 3B. The second magnetic member 7 moves according to the direction of magnetic flux.

Repeating the states shown in FIG. 3B and FIG. 3C to switch the magnetic flux direction causes the second magnetic member 7 to perform rotational operation with respect to the first magnetic member 4.

Figure 26A:
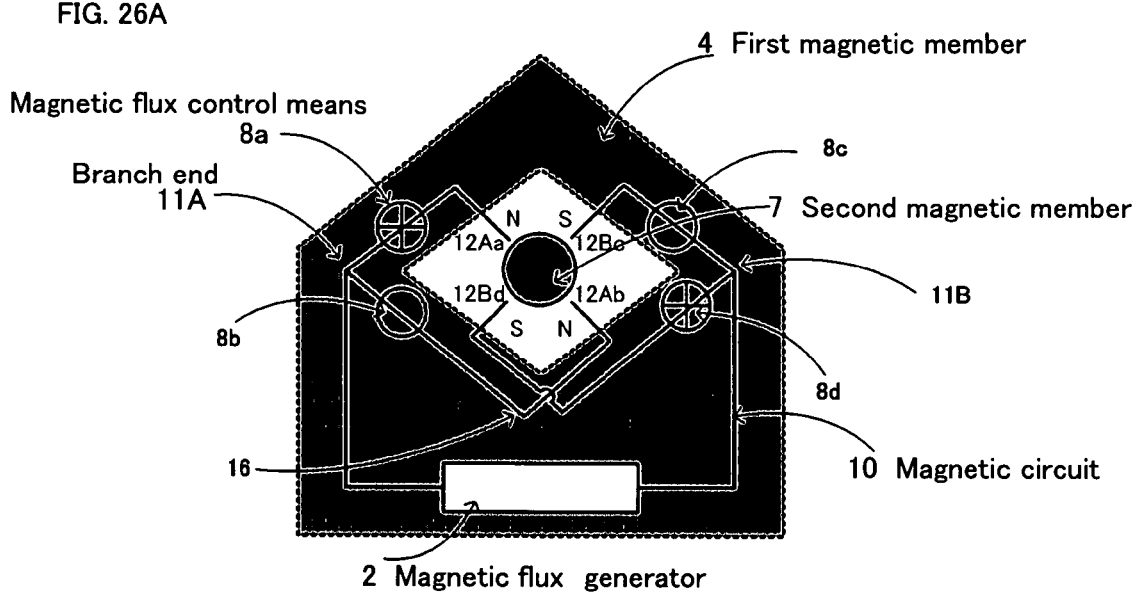
FIG. 26 is a general diagram showing a configuration example in which a bridge-configuration magnetic circuit is formed in the same plane.
Figure 26B:
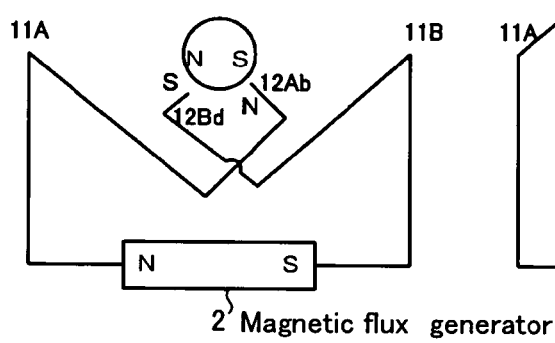

In the magnetic circuit state shown in FIG. 26B, controlling the magnetic flux control means 8a and 8c (or magnetic control means 8b and 8d) decreases the amount of magnetic flux flowing through the magnetic circuit between the branch end 11A and the magnetic pole end 12Aa and the magnetic circuit between the branch end 11B and the magnetic pole end 12Bc and forms a magnetic circuit beginning at the N pole of the magnetic flux generator 2 and ending at the S pole of the magnetic flux generator 2 via the branch end 11A, magnetic pole end 12Ab, magnetic pole end 12Bd, and branch end 11B.

Controlling the increase/decrease in the amount of magnetic flux makes the magnetic pole end 12Bd the negative pole (S pole), and the magnetic pole end 12Ab the positive pole (N pole), to form the flow of magnetic flux between the magnetic pole ends from the magnetic pole end 12Ab to the magnetic pole end 12Bd. The second magnetic member 7 moves according to the direction of magnetic flux.

Figure 26C:
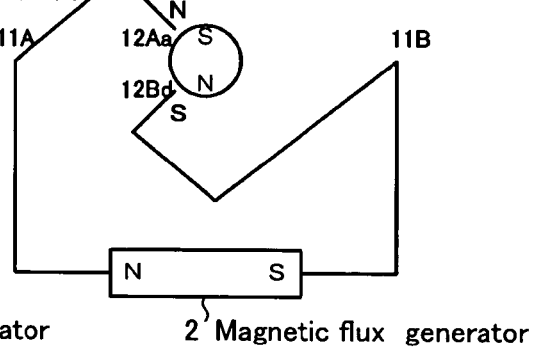

In the magnetic circuit state shown in FIG. 26C, controlling the magnetic flux control means 8b and 8c (or magnetic control means 8a and 8d) decreases the amount of magnetic flux flowing through the magnetic circuit between the branch end 11A and the magnetic pole end 12Ab and the magnetic circuit between the branch end 11B and the magnetic pole end 12Bc and forms a magnetic circuit beginning at the N pole of the magnetic flux generator 2 and ending at the S pole of the magnetic flux generator 2 via the branch end 11A, magnetic pole end 12Aa, magnetic pole end 12Bd, and branch end 11B.

Controlling the increase/decrease in the amount of magnetic flux makes the magnetic pole end 12Bd the negative pole (S pole), and the magnetic pole end 12Aa the positive pole (N pole), to form the flow of magnetic flux between the magnetic pole ends from the magnetic pole end 12Aa to the magnetic pole end 12Bd. The second magnetic member 7 moves according to the direction of magnetic flux.

Figure 26D:
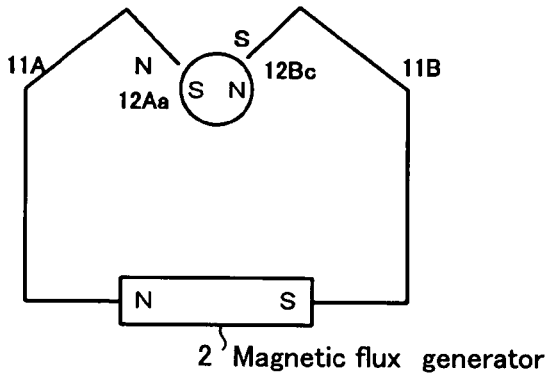

In the magnetic circuit state shown in FIG. 26D, controlling the magnetic flux control means 8b and 8d (or magnetic control means 8a and 8d) decreases the amount of magnetic flux flowing through the magnetic circuit between the branch end 11A and the magnetic pole end 12Ab and the magnetic circuit between the branch end 11B and the magnetic pole end 12Bd and forms a magnetic circuit beginning at the N pole of the magnetic flux generator 2 and ending at the S pole of the magnetic flux generator 2 via the branch end 11A, magnetic pole end 12Aa, magnetic pole end 12Bc, and branch end 11B.

Controlling the increase/decrease in the amount of magnetic flux makes the magnetic pole end 12Bc the negative pole (S pole), and the magnetic pole end 12Aa the positive pole (N pole), to form the flow of magnetic flux between the magnetic pole ends from the magnetic pole end 12Aa to the magnetic pole end 12Bc. The second magnetic member 7 moves according to the direction of magnetic flux. In the configuration shown in FIG. 26 where the magnetic pole ends are arranged around the second magnetic member 7 at an interval of 90 degrees, the second magnetic member 7 can be rotated smoothly.

FIG. 27 is diagram showing the flow of magnetic flux when the rotor is driven. In the figure, the flow of magnetic flux is compared with that of an ordinary PM (Pulse Modulation) type stepping motor. The circled N poles and S poles in FIG. 27 indicate the poles having intensity higher than that of those not circled. FIG. 27B to FIG. 27D show the magnetic flux of the magnetic drive apparatus according to the present invention, and FIG. 27E to FIG. 27H show the magnetic flux of a stepping motor in the corresponding rotational positions.

FIG. 27A shows the non-operation state. The magnetic pole state shown in FIG. 27B to FIG. 27D correspond respectively to that in FIG. 26B to FIG. 26D, indicating that the direction of magnetic flux from the N pole to the S pole is switched sequentially around the rotor. The rotor is rotated based on the change in the direction of the magnetic flux.

When the number of poles is even, the pairs of magnetic pole ends of the stator, each composed of the N pole and the S pole, are arranged alternately at an interval of an equal angle to increase the ratio of the effective magnetic flux amount from the stator to the ineffective magnetic flux amount. The ineffective magnetic flux amount is the amount of magnetic flux used for the leakage magnetic flux components or for non-rotational force operation components of the rotor, and the effective magnetic flux amount is the amount of magnetic flux used effectively for the rotation of the rotor.

Figure 28:
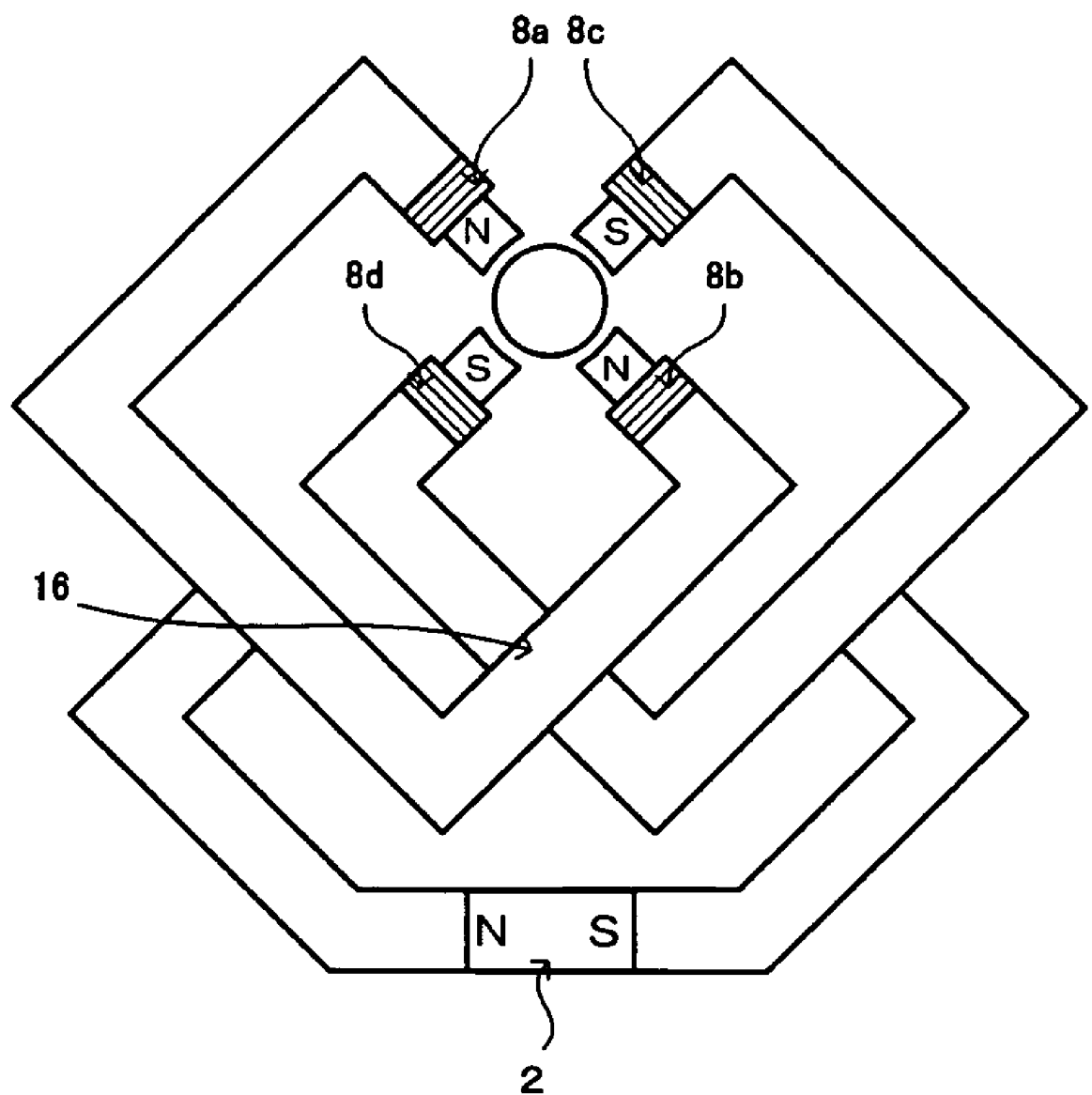
FIG. 28 is a diagram showing a practical configuration example in which a bridge-configuration magnetic circuit is formed in the same plane.

FIG. 28 shows a practical example of the configuration example shown in FIG. 26. The stator magnetic paths are extended from both poles of the stator magnetic flux generator 2. The stator magnetic path on the N pole side is branched into two; the end of one of the two becomes the magnetic pole end of one N pole via the magnetic flux control means 8a and the end of the other of the two becomes the magnetic pole end of the other opposed N pole via the magnetic control means 8b. Similarly, the stator magnetic path on the S pole side is branched into two; the end of one of the two becomes the magnetic pole end of one S pole via the magnetic flux control means 8c and the end of the other of the two becomes the magnetic pole end of the other opposed S pole via the magnetic control means 8d.

In the configuration described above, one of the stator magnetic paths leading to the magnetic pole end of the N pole and one of the stator magnetic paths leading to the magnetic pole end of the S pole cross at a crossing section 16 with one on top of the other. This crossing arrangement of the stator magnetic paths makes it possible to sequentially place the pairs of the N pole and the S pole around the rotor.

The magnetic drive apparatus according to the present invention may be constructed not only by arranging a plurality of rotors and stators linearly but also by arranging them two-dimensionally in a plane or three-dimensionally in space.

Figure 29:
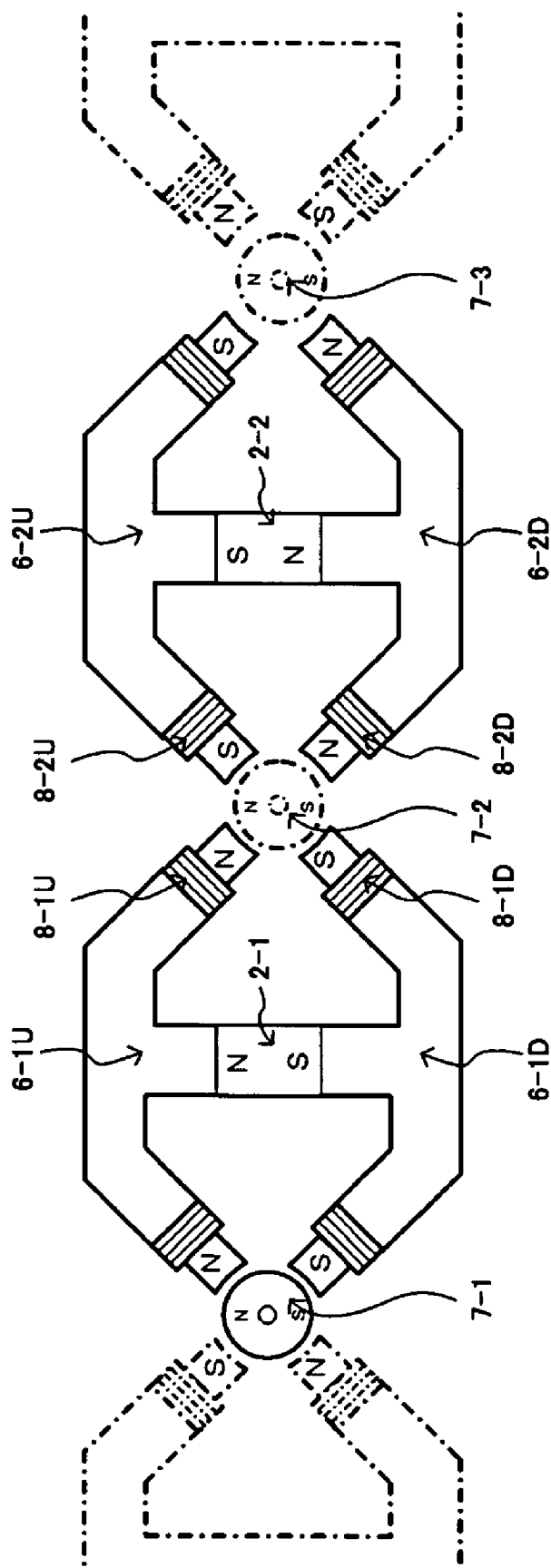
FIG. 29 is a diagram showing an example in which a plurality of rotors and stators are arranged linearly.

FIG. 29 is a diagram showing an example in which a plurality of rotors and stators are arranged linearly.

The magnetic drive apparatus comprises linearly-arranged rotors 7-1, 7-2, and so on, stator magnetic flux generators 2-1, 2-2, and so on, and stator magnetic paths 6-1U, 6-2U, . . . , 6-1D, 6-2D, and so on. Each of the rotors 7-1, 7-2, and so on has four magnetic pole ends around it. The two of the four magnetic pole ends receive a magnetic flux from the stator magnetic flux generators 2-1 and 2-2 neighboring on one side via the stator magnetic paths 6-1U, 6-2U, and so on and 6-1D, 6-2D, and so on, and the other two magnetic pole ends receive a magnetic flux from the stator magnetic flux generators 2-1 and 2-2 neighboring on the other side via the stator magnetic paths 6-1U, 6-2U, and so on, and 6-1D, 6-2D, and so on.

For example, the upper-right magnetic pole end (S pole) and the lower-right magnetic pole end (N pole) of the rotor 7-2 in the figure receive a magnetic flux from the stator magnetic flux generator 2-2 on the immediate right via the stator magnetic path 6-2U and 6-2D. Similarly, the upper-left magnetic pole end (N pole) and the lower-left magnetic pole end (S pole) of the rotor 7-2 in the figure receive a magnetic flux from the stator magnetic flux generator 2-1 on the immediate left via the stator magnetic path 6-1U and 6-1D.

Therefore, magnetic flux control means 8-1U, 8-2U, 8-1D, and 8-2D provided near the magnetic pole ends around the rotor 7-2 control the magnetic flux flowing through the stator magnetic paths 6-1U, 6-2U, 6-1D, and 6-2D. This configuration is the same also for the neighboring rotors. Therefore, the neighboring two rotors share the stator magnetic flux generator provided between them. The linear configuration, though configured as a straight line in FIG. 29, may also be configured as a curved line.

Figure 30:
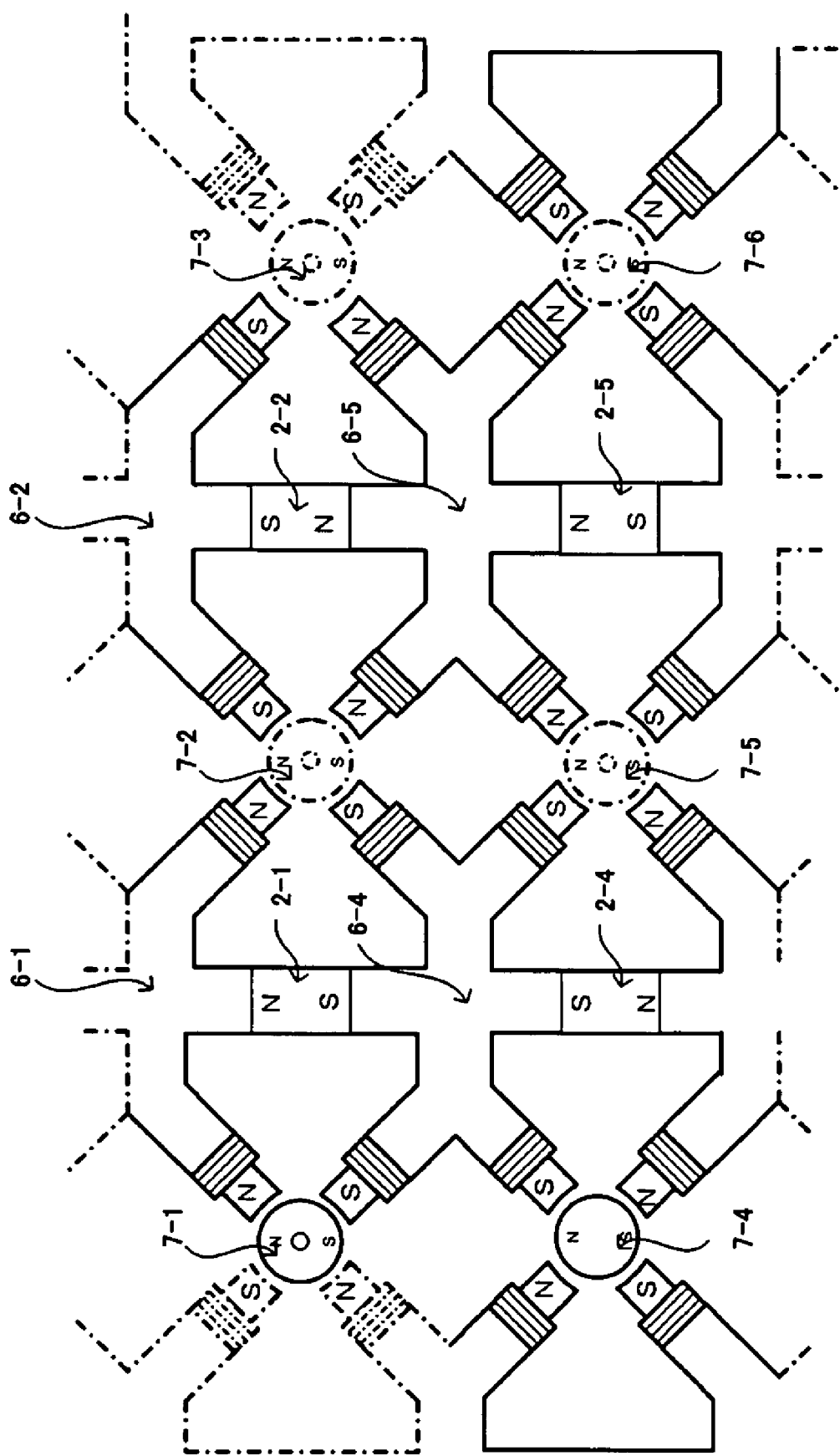
FIG. 30 is a diagram showing an example in which a plurality of rotors and stators are arranged two-dimensionally.

FIG. 30 is a diagram showing an example in which a plurality of rotors and stators are arranged two-dimensionally.

A magnetic drive apparatus comprises rotors 7-1, 7-2, and so on and stator magnetic flux generators 2-1, 2-2, and so on arranged two-dimensionally. The stator magnetic flux generators and magnetic pole ends are connected by stator magnetic paths 6-1, 6-2, and so on that are also arranged two-dimensionally. This two-dimensional array can be formed by arranging the linear arrangements in FIG. 29 in parallel.

In the configuration shown in FIG. 30, the stator magnetic flux generators are arranged so that their magnetic pole directions are opposite between each neighboring two. This configuration allows the S pole and the N pole to be arranged alternately around the rotor.

Figure 31:
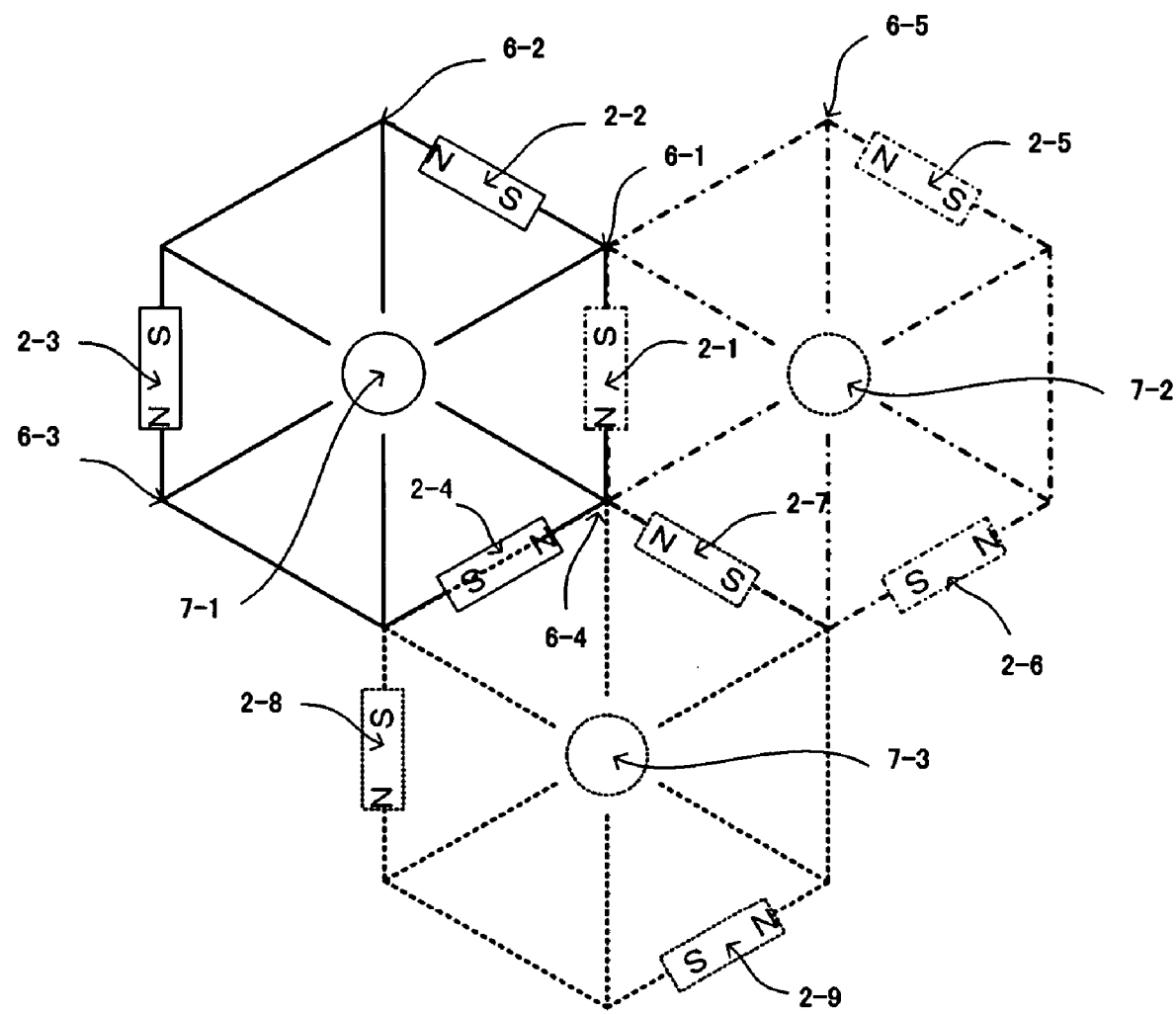
FIG. 31 is a diagram showing another example in which a plurality of rotors and stators are arranged two-dimensionally.

FIG. 31 is a diagram showing another example of the two-dimensional arrangement of a plurality of rotors and stators.

A magnetic drive apparatus comprises rotors 7-1, 7-2, and so on and stator magnetic flux generators 2-1, 2-2, and soon that are arranged two-dimensionally. The stator magnetic flux generators and magnetic pole ends are connected by stator magnetic paths 6-1, 6-2, and so on that are also arranged two-dimensionally. This two-dimensional arrangement can be formed by arranging the stator magnetic flux generators on the sides of a regular hexagon. This configuration allows the neighboring rotors to share the stator magnetic flux generator provided between the two rotors.

Figure 32:
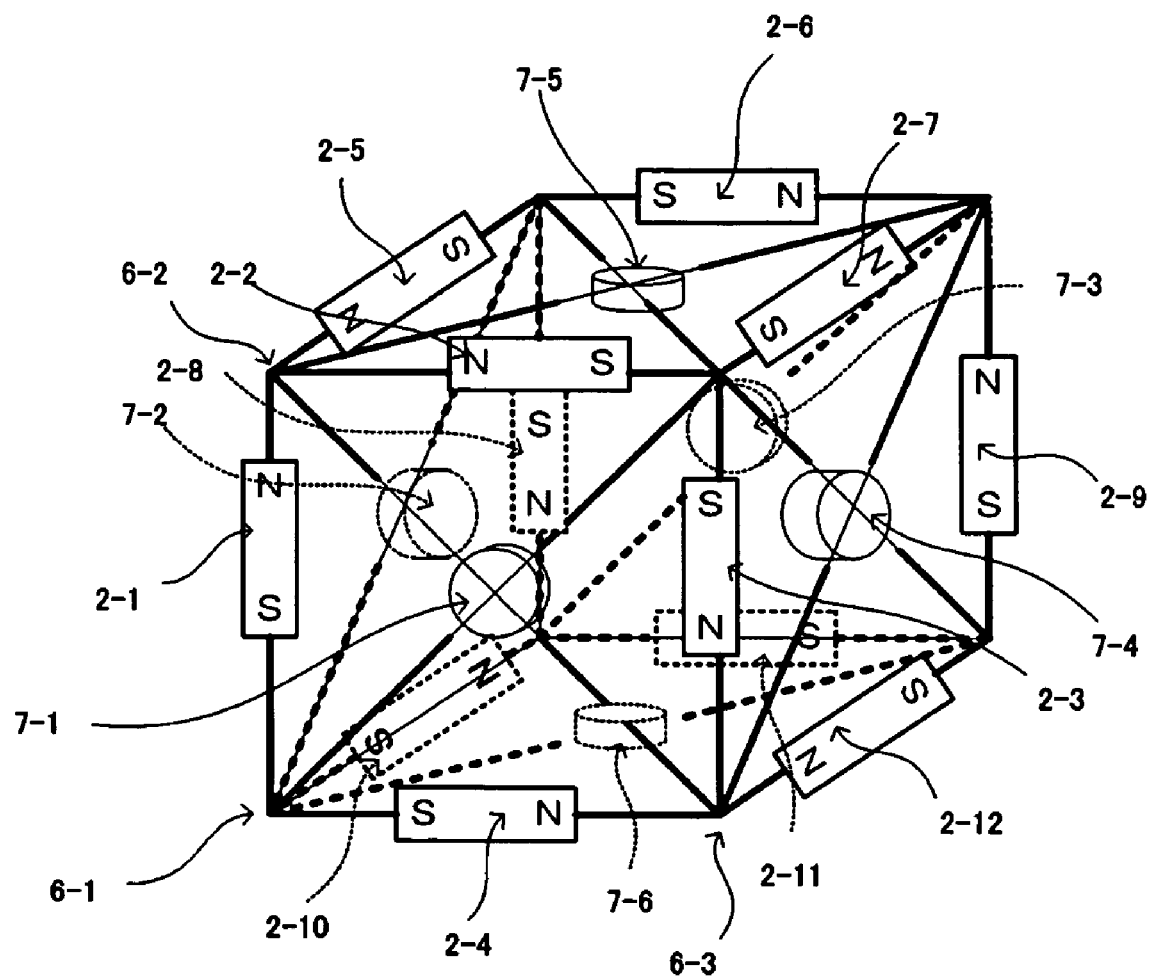
FIG. 32 is a diagram showing another example in which a plurality of rotors and stators are arranged three-dimensionally.

FIG. 32 is a diagram showing another example in which a plurality of rotors and stators are arranged three-dimensionally.

A magnetic drive apparatus comprises rotors 7-1, 7-2, and so on and stator magnetic flux generators 2-1, 2-2, and so on that are arranged three-dimensionally. The stator magnetic flux generators and the magnetic pole ends are connected by stator magnetic paths 6-1, 6-2, and so on that are also arranged three-dimensionally. The three-dimensional arrangement shown in FIG. 32 can be formed by arranging each rotor in the center of each surface of the cube and by arranging the stator magnetic flux generator in a predetermined position on each side.

The configuration shown in FIG. 32 is one of the elements of the three-dimensional arrangement. The units each having this configuration are constructed, one next to the other, to form a larger three-dimensional arrangement.

Figure 33A:
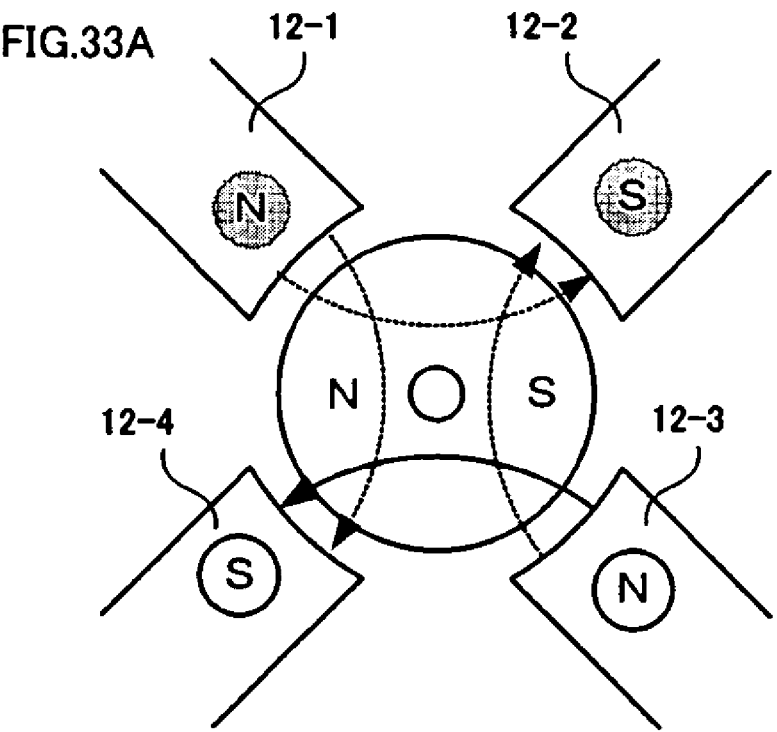
FIG. 33 is a diagram showing a configuration example of magnetic pole ends.

Next, the following describes a configuration example in which the magnetic leakage at the magnetic pole ends is reduced in the modes described above. FIG. 33A shows an example of magnetic pole ends arranged around a rotor. In this arrangement example, the magnetic flux moves between the neighboring magnetic pole ends in such a way that the magnetic flux that leaves the rotor-opposing surface of one magnetic pole end (for example, magnetic pole end 12-3) enters the rotor-opposing surface of the other magnetic pole end (for example, magnetic pole end 12-4) via the rotor.

In this case, the magnetic flux sometimes flows through one of the surfaces that are not opposed to the rotor. For example, between the neighboring magnetic pole ends, the magnetic flux sometimes flows between the surfaces opposed in the circular direction. The leakage magnetic flux in this case, which does not contribute to the driving of the rotor, is a factor that decreases the driving efficiency.

Figure 33B:
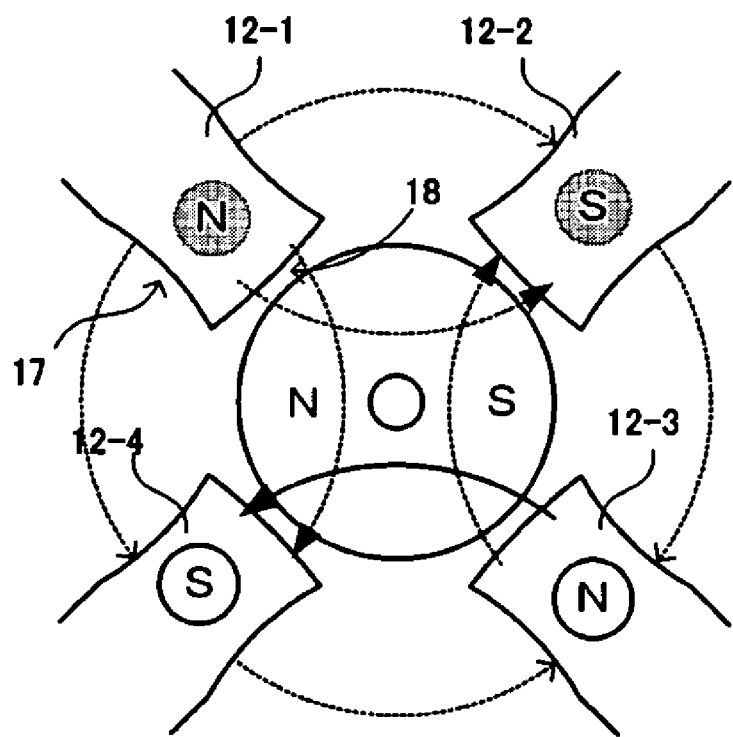

To solve this problem, the surface 17 of each of the magnetic pole ends 12-1 to 12-4, which is opposed with the neighboring magnetic pole in the circular direction, is shaped into a concave form as shown in FIG. 33B. This concave form lengthens the distance between the surfaces of the neighboring magnetic pole ends opposed in the circular direction. The lengthened distance between the magnetic pole ends increases the magnetic resistance and decreases the leakage magnetic flux. This configuration relatively increases the amount of magnetic flux passing between the surfaces opposed to the rotor and therefore increases the amount of magnetic flux used for driving the rotor.

The problem may also be solved by shaping the surface of each of the magnetic pole ends 12-1 to 12-4, which is opposed to the rotor, into a convex form. This convex form 18, which shortens the gap between the magnetic pole end and the rotor, decreases the magnetic resistance and at the same time decreases the leakage magnetic flux.

Next, with reference to FIG. 34 to FIG. 41, the following describes another operation mode in the first embodiment in which the magnetic circuits in the bridge configuration are switched to control the flow of magnetic flux. With reference to FIG. 42 and FIG. 43, the following describes another operation mode in the second embodiment in which selection is made from a plurality of magnetic circuits for switching and controlling the flow of magnetic flux.

First, the linear operation mode (FIG. 34 to FIG. 37), the switching operation mode (FIG. 38 and FIG. 39) and the twisting operation mode (FIG. 40 and FIG. 41) in the first embodiment will be described.

Figure 34:
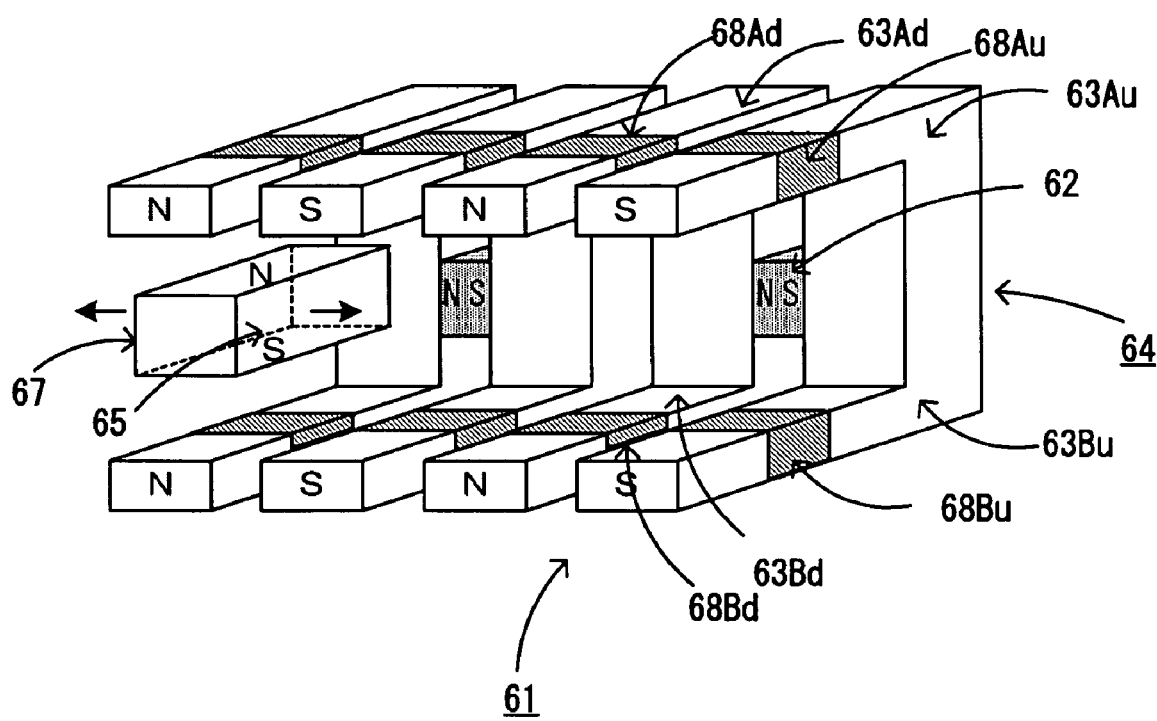
FIG. 34 is a diagram showing the linear operation in a first mode of the present invention.

In the linear operation mode shown in FIG. 34, a magnetic drive apparatus 61, which comprises first magnetic members 64 on the non-moving side and a second magnetic member 67 on the moving side, causes the second magnetic member 67 to be linearly driven with respect to the first magnetic member 64 on the non-moving side.

Each of the first magnetic members 64, which comprises stator magnetic flux generator 62 and stator magnetic paths 63Au, 63Ad, 63Bu, and 63Bd, controls magnetic flux control means 68Au, 68Ad, 68Bu, and 68Bd to generate magnetic poles in order of linearly arranged magnetic pole ends for driving the second magnetic member 67.

In this configuration, the magnetic flux control means 68 to be driven is selected to change the movement direction and to control the movement speed.

Figure 35:
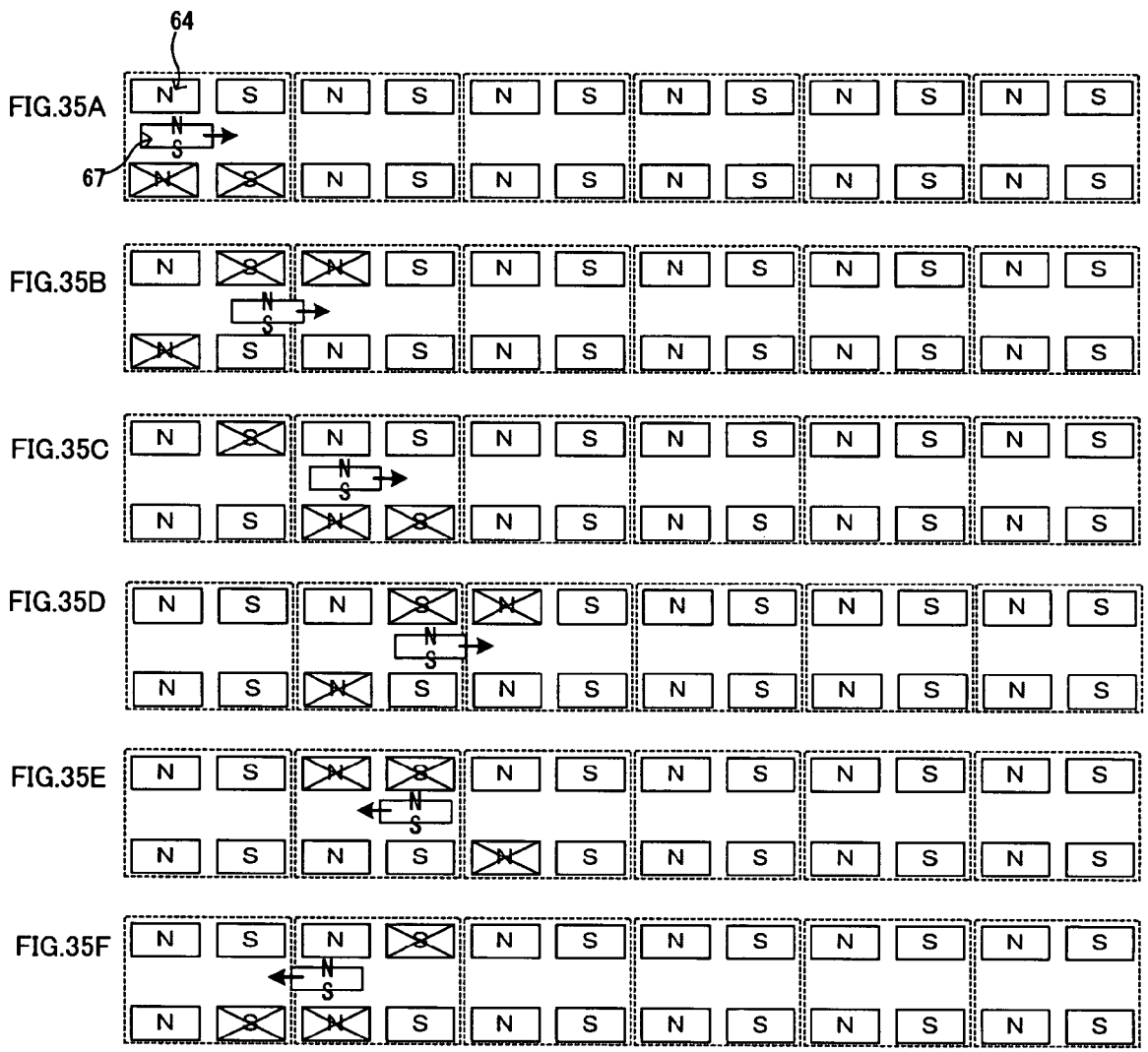
FIG. 35 is a diagram showing the linear operation in a first mode of the present invention.

FIG. 35 is a diagram showing a driving example of the magnetic drive apparatus 61 in FIG. 34 and an example of magnetic poles generated at the magnetic pole ends under control of the magnetic flux control means 68. For example, in FIG. 35A, when the magnetic pole is not generated at the bottom magnetic pole ends, the second magnetic member 67 is driven because the N pole of the top of the second magnetic member 67 is repelled by the N pole, and is attracted by the S pole, of the top magnetic pole ends. Next, in FIG. 35B, when the magnetic pole is not generated at the top magnetic pole ends in the movement direction, the second magnetic member 67 is driven because the S pole of the bottom of the second magnetic member 67 is repelled by the S pole, and is attracted by the N pole, of the bottom magnetic pole ends. Repeating the above operation causes the second magnetic member 67 to linearly move into one direction (in the right direction in the figure) as shown in FIG. 35A to FIG. 35D. FIG. 35E and FIG. 35F show the state in which the movement direction is reversed.

Figure 36:
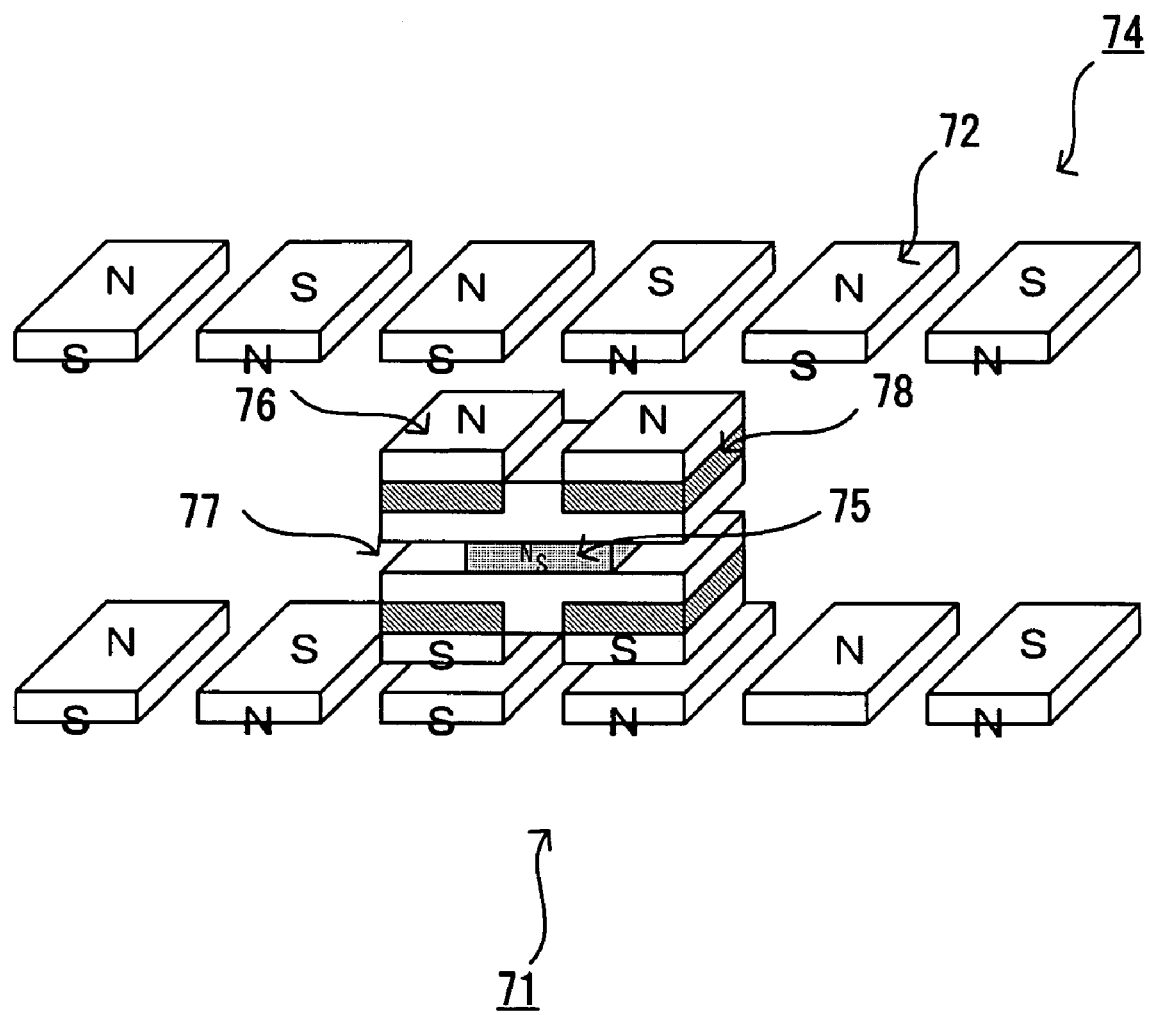
FIG. 36 is a diagram showing the linear operation in a first mode of the present invention.

In the linear operation mode shown in FIG. 36, a magnetic drive apparatus 71, which comprises first magnetic members 74 on the non-moving side and a second magnetic member 77 on the moving side, causes the second magnetic member 77 to be linearly driven with respect to the first magnetic member 74 on the non-moving side.

The first magnetic members 74 are formed by arranging stator magnetic flux generators 72 with the magnetic pole direction changed every other source, and the second magnetic member 77 forms magnetic pole ends by providing moving-part magnetic paths 76 with a moving-part magnetic flux generator 75 between them. The magnetic drive apparatus 71 controls magnetic flux control means 78, provided on the moving-part magnetic path 76, to sequentially generate magnetic poles on the magnetic pole ends arranged linearly for driving the second magnetic member 77.

In this configuration, the magnetic flux control means 78 to be driven is selected to change the moving direction and to control the moving speed.

FIG. 37 is a diagram showing a driving example of the magnetic drive apparatus 71 in FIG. 36, and an example of magnetic poles generated at the magnetic pole ends under control of the magnetic flux control means 78. For example, by setting up the magnetic pole ends of the second magnetic member 77 in such a way that the upper-left magnetic pole end in the figure is the N pole and the lower-right magnetic pole end is the S pole as shown in FIG. 37A, the second magnetic member 77 is repelled by the opposed stator magnetic flux generators 72 with the same polarity, and is attracted by the stator magnetic flux generators 72 with the opposite polarity, of the first magnetic member 74 and thus is driven. Next, as shown in FIG. 37B, by setting up the magnetic pole ends of the second magnetic member 77 in such a way that the upper-right magnetic pole end in the figure is the N pole and the lower-left magnetic pole end is the S pole, the second magnetic member 77 is moved in the right direction in the figure. Repeating the above operation causes the second magnetic member 77 to linearly move into one direction (in the right direction in the figure) as shown in FIG. 37A to FIG. 37D. FIG. 37E and FIG. 37F show the state in which the movement direction is reversed.

Figure 38:
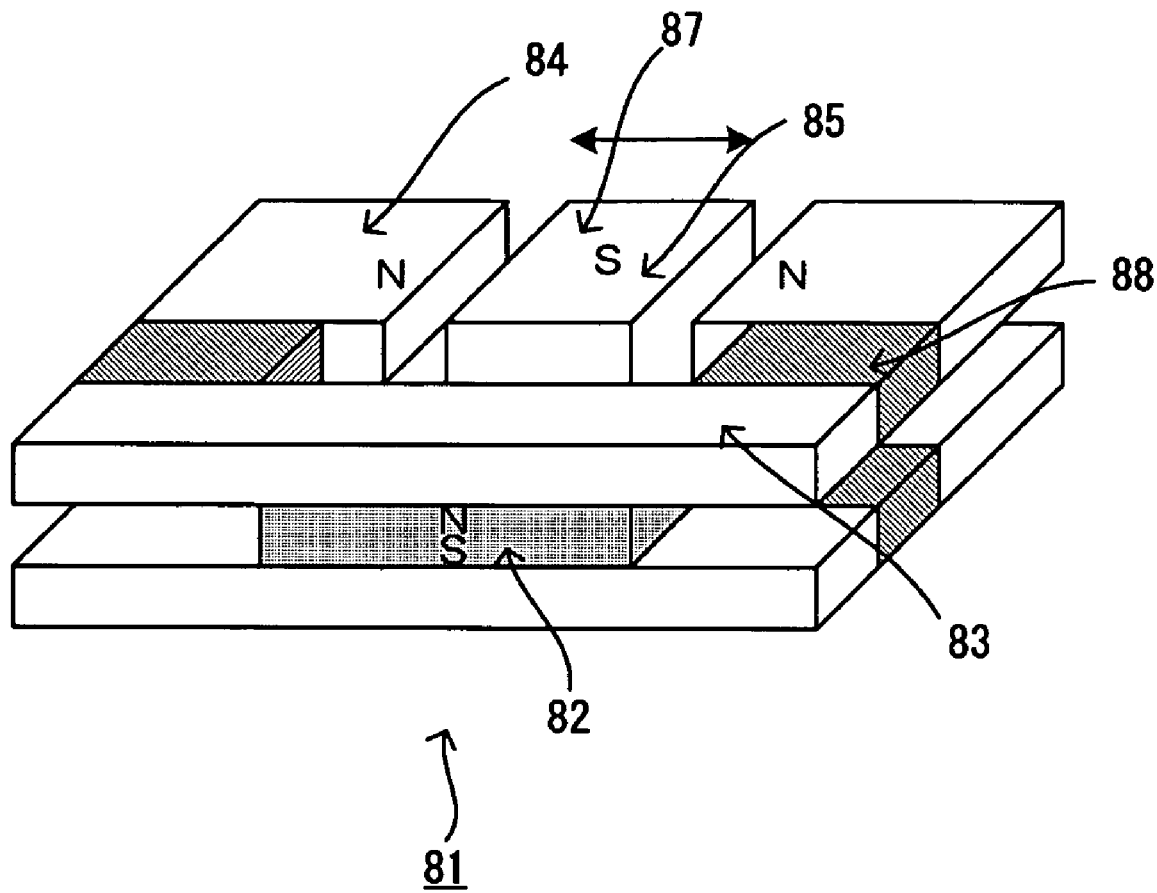
FIG. 38 is a diagram showing the switching operation in a first mode of the present invention.

In the switching operation mode shown in FIG. 38, a magnetic drive apparatus 81 comprises a first magnetic member 84 on the non-moving side and a second magnetic member 87 on the moving side in the same way as the magnetic drive apparatus 21 described above. The magnetic drive apparatus switches between two states by movably supporting the second magnetic member 87 in two directions with respect to the first magnetic member 74 on the non-moving side.

The first magnetic member 84 controls magnetic flux control means 88, provided on a stator magnetic path 83, to generate the magnetic pole on one of the opposed magnetic pole ends for driving the second magnetic member 87 into one of the sides.

This configuration makes it possible to change the state created by selecting one of two states through the selection of the magnetic flux control means 88 to be driven.

FIG. 39 is a diagram showing a driving example of the magnetic drive apparatus 81 shown in FIG. 38. FIG. 39A and FIG. 39B show the upside and downside of the stator magnetic path 83 with the second magnetic member 87 moved into one direction (left side in the figure). In the figure, the magnetic flux control means 88Bu and 88Bd limit the flow of magnetic flux through stator magnetic paths 83Bu and 83Bd, and the magnetic flux control means 88Au and 88Ad increase the amount of magnetic flux flowing through the stator magnetic paths 83Au and 83Ad, to attract the second magnetic member 87 toward the magnetic pole end on the stator magnetic path 83A side to move it to the left in the figure.

FIG. 39C and FIG. 39D show the upside and downside of the stator magnetic path 83 with the second magnetic member 87 moved into one direction (right side in the figure). In the figure, the magnetic flux control means 88Au and 88Ad limit the flow of magnetic flux through stator magnetic paths 83Au and 83Ad, and the magnetic flux control means 88Bu and 88Bd increase the amount of magnetic flux flowing through the stator magnetic paths 83Bu and 83Bd, to attract the second magnetic member 87 toward the magnetic pole end on the stator magnetic path 83B side to move it to the right in the figure.

Although a magnetic pole different from that of the second magnetic member 87 is generated at the magnetic pole ends to cause attraction for operation in the above operation example, it is also possible to generate the same magnetic pole as that of the second magnetic member 87 at the magnetic pole ends to cause repulsion for the operation.

In the twisting operation mode shown in FIG. 40, a magnetic drive apparatus 91 comprises a first magnetic member 94 on the non-moving side and a second magnetic member 97 on the moving side in the same way as the magnetic drive apparatus 61 (FIG. 34) described above. With one end of the second magnetic member 97 fixed on the first magnetic member 94 on the non-moving side, the magnetic drive apparatus 91 switches between two twisting operation states by deformably supporting the second magnetic member 97 between the magnetic pole ends.

The first magnetic member 94 controls magnetic flux control means 98, provided on a stator magnetic path 93, to alternately generate magnetic poles on the diagonally-opposed magnetic pole ends to drive the second magnetic member 97 into one of the sides.

This configuration makes it possible to change the state created by selecting one of two twisting states through the selection of the magnetic flux control means 98 to be driven.

Figure 40A:
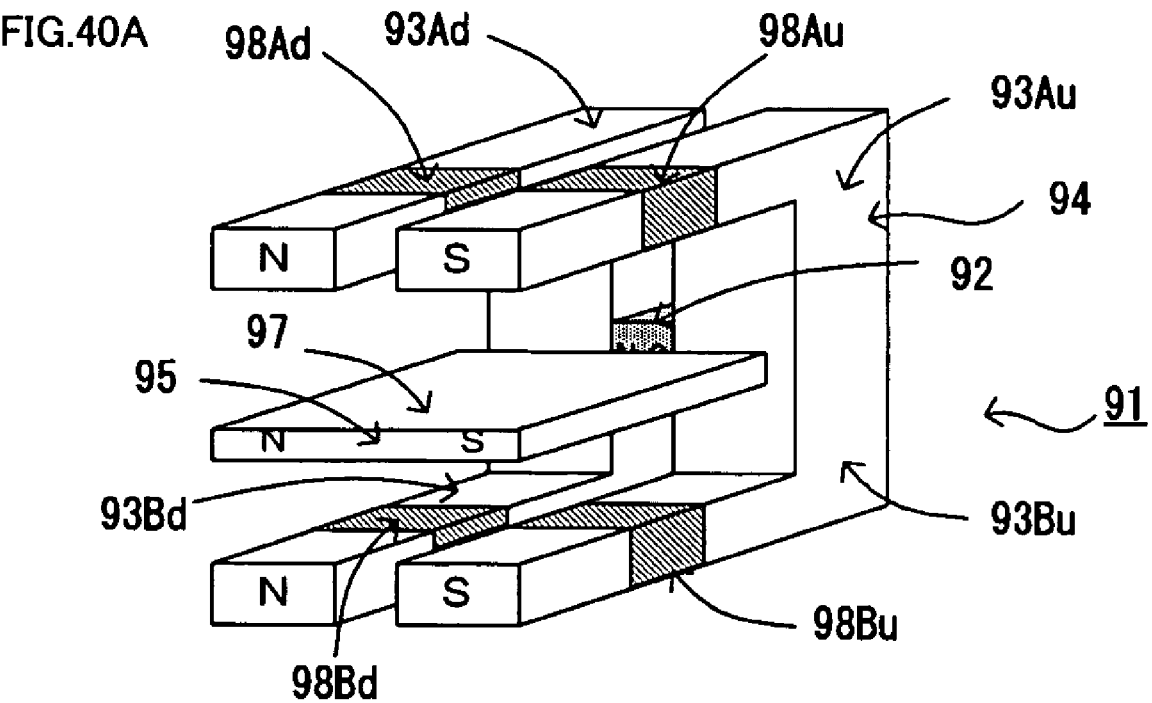
FIG. 40 is a diagram showing the twisting operation in a first mode of the present invention.
Figure 40B:
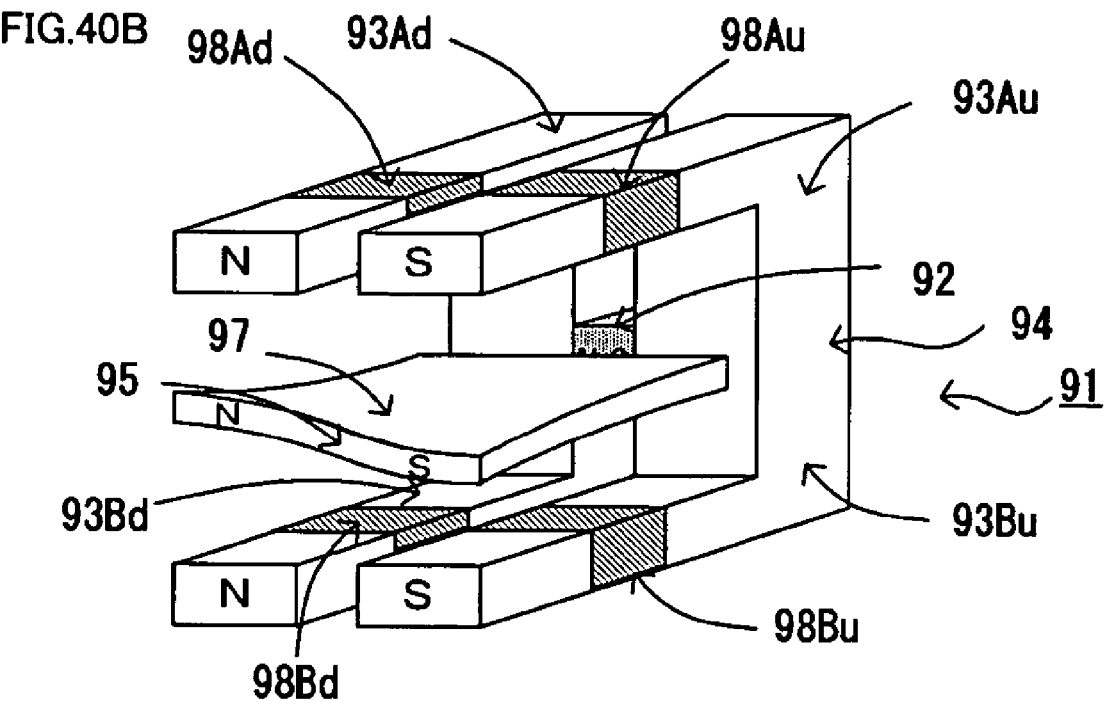

FIG. 40 is a diagram showing a driving example of the magnetic drive apparatus 91 shown in FIG. 39. FIG. 40A shows the state in which no magnetic pole is generated at the magnetic pole ends, while FIG. 40B shows the state in which magnetic poles are generated at the magnetic pole ends to twist one of the ends of the second magnetic member. In FIG. 40B, the lower-left magnetic pole end in the figure is made the N pole and the upper-right magnetic pole end is made the S pole to generate repulsion between the magnetic poles of those magnetic pole ends and the magnetic poles of a moving-part magnetic flux generator 95 of the second magnetic member 97 for twisting the second magnetic member 97.

FIG. 41 is a diagram showing a driving example of the magnetic drive apparatus 91 shown in FIG. 40. FIG. 41A to FIG. 41C show examples in which the second magnetic member 97 is twisted through the repulsion of the magnetic poles, and FIG. 41D to FIG. 41F show examples in which the second magnetic member 97 is twisted through the attraction of the magnetic poles.

Figure 41A:
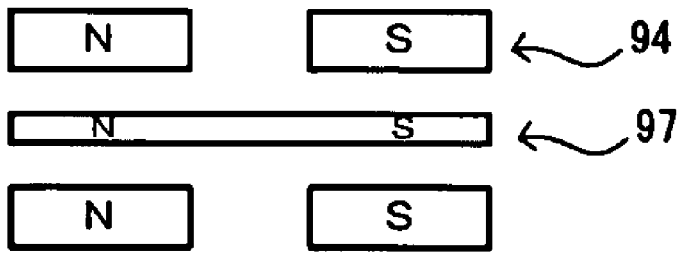
FIG. 41 is a diagram showing the twisting operation in a first mode of the present invention.
Figure 41B:
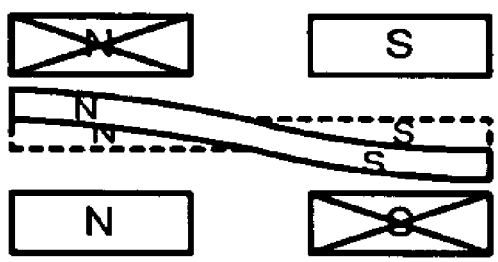
Figure 41C:
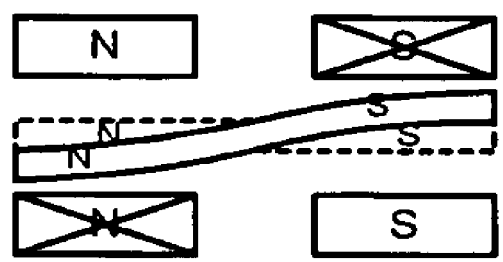
Figure 41D:
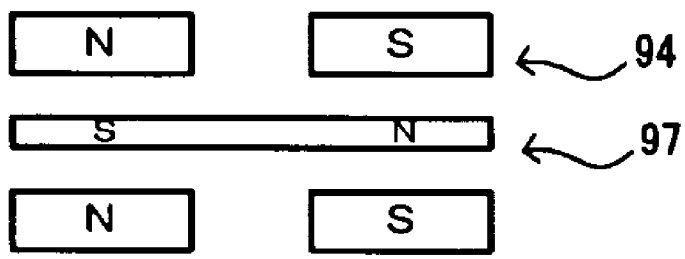

FIG. 41B shows the state in which the lower-left magnetic pole end in the figure is made the N pole and the upper-right magnetic pole end is made the S pole to generate repulsion between the magnetic poles of those magnetic pole ends and the magnetic poles of the moving-part magnetic flux generator 95 of the second magnetic member 97 to twist the second magnetic member 97. FIG. 41C shows the state in which the upper-left magnetic pole end in the figure is made the N pole and the lower-right magnetic pole end is made the S pole to generate repulsion between the magnetic poles of those magnetic pole ends and the magnetic poles of the moving-part magnetic flux generator 95 of the second magnetic member 97 to twist the second magnetic member 97.

Figure 41E:
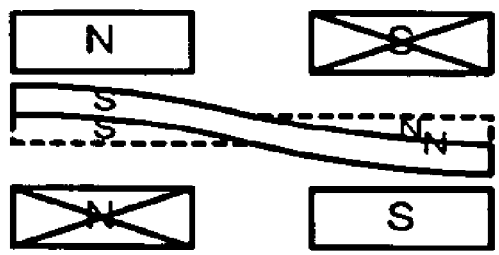
Figure 41F:
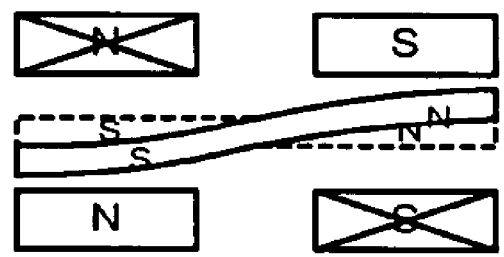

FIG. 41E shows the state in which the upper-left magnetic pole end in the figure is made the N pole and the lower-right magnetic pole end is made the S pole to generate attraction between the magnetic poles of those magnetic pole ends and the magnetic poles of the moving-part magnetic flux generator 95 of the second magnetic member 97 to twist the second magnetic member 97. FIG. 41F shows the state in which the lower-left magnetic pole end in the figure is made the N pole and the upper-right magnetic pole end is made the S pole to generate attraction between the magnetic poles of those magnetic pole ends and the magnetic poles of the moving-part magnetic flux generator 95 of the second magnetic member 97 to twist the second magnetic member 97.

Next, the following describes the linear operation mode (FIG. 42 and FIG. 43) of the second embodiment in which the flow of magnetic flux is controlled by selecting from, and switching between, a plurality of magnetic circuits.

In the linear operation mode shown in FIG. 42, a magnetic drive apparatus 101, which comprises a plurality of first magnetic members 104 on the non-moving side and a second magnetic member 107 on the moving side, linearly drives the second magnetic member 107 with respect to the first magnetic member 104 on the non-moving side. Note that the second magnetic member 107 has a moving-part magnetic flux generator 105.

Each of the first magnetic member 104 has a stator magnetic path 103$u$ and a stator magnetic path 103$d$ with a stator magnetic flux generator 102 between them. Magnetic flux control means 108$u$ and 108$d$ are provided on the stator magnetic paths 103$u$ and 103$d$, one for each. The magnetic flux control means 108$u$ and 108$d$ are controlled to control the generation of magnetic poles at the magnetic pole ends, and the second magnetic member 107 is driven by sequentially generating poles at the linearly-arranged magnetic pole ends.

In this configuration, the magnetic flux control means 108 to be driven is selected to change the moving direction and to control the moving speed.

Figure 42A:
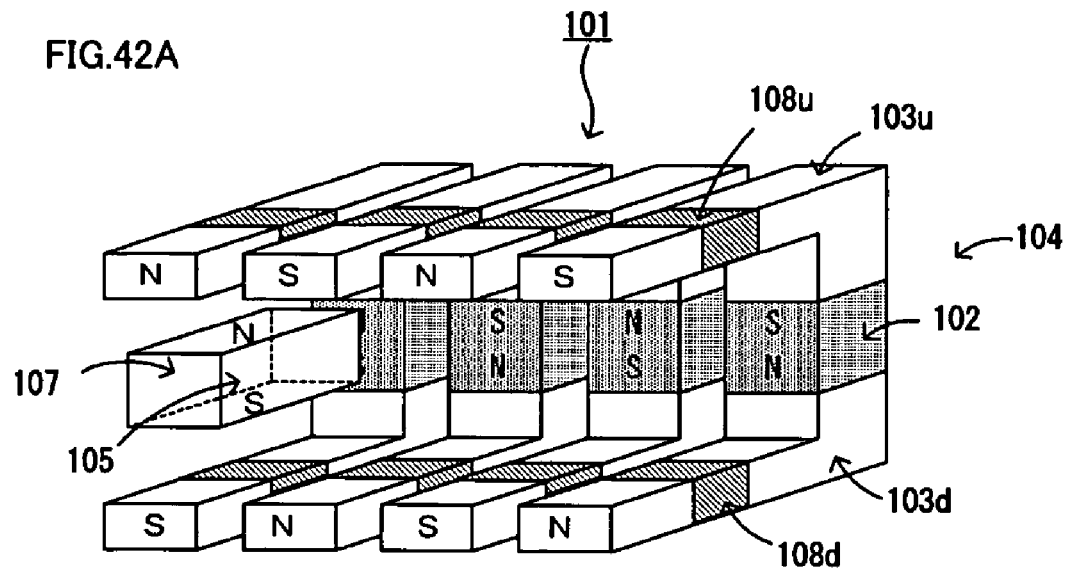
FIG. 42 is a diagram showing the linear operation in a second mode of the present invention.
Figure 42B:
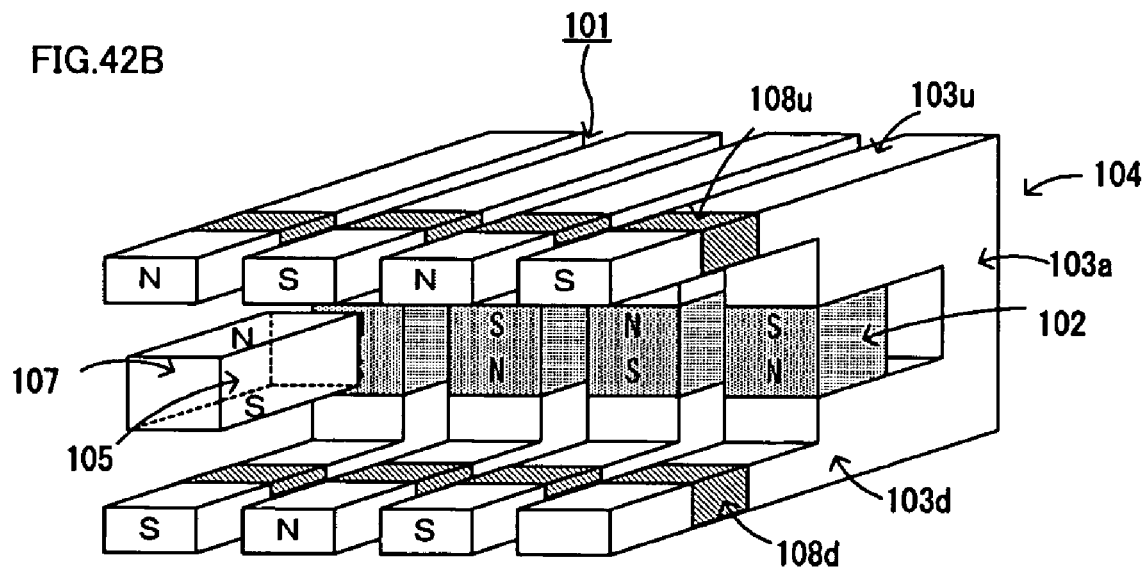

FIG. 42A shows a configuration example in which no magnetic path is provided for flowing the magnetic flux form the stator magnetic flux generator 102 when no magnetic pole is formed between the magnetic pole ends, and FIG. 42B shows a configuration example in which a magnetic path is provided for flowing the magnetic flux from the stator magnetic flux generator 102 when no magnetic pole is formed between the magnetic pole ends.

FIG. 43 is a diagram showing a driving example of the magnetic drive apparatus 101 shown in FIG. 42. In FIG. 43A, the second magnetic member 107 moves in the arrow direction through repulsion or attraction generated between the magnetic poles of the second magnetic member 107 and the magnetic poles on the first magnetic member 104 side. In FIG. 43B where no magnetic poles is formed between two pairs of magnetic pole ends, the second magnetic member 107 moves into the arrow direction through repulsion. In addition, in FIG. 43C where no magnetic pole is formed between one pair of magnetic pole ends, the second magnetic member 107 moves into the arrow direction through repulsion or attraction generated between the magnetic poles of the second magnetic member 107 and the magnetic poles on the first magnetic member 104 side.

Repeating the steps described above causes the second magnetic member 107 to move right in the figure as shown in FIG. 43A to FIG. 43D. In addition, the movement direction of the second magnetic member 107 can be reversed by changing the order in which the magnetic poles of the magnetic pole ends are changed (FIG. 43E and FIG. 43F).

The second embodiment can be applicable not only to the linear operation mode described above but also to the switching operation mode and the twisting operation mode.

Next, the following describes how to detect the intensity of magnetic flux flowing through a magnetic path, how to determine whether to flow the magnetic flux at the detected intensity of magnetic flux, and how to adjust the magnetic flux balance in a magnetic path at non-operation time.

Figure 44:
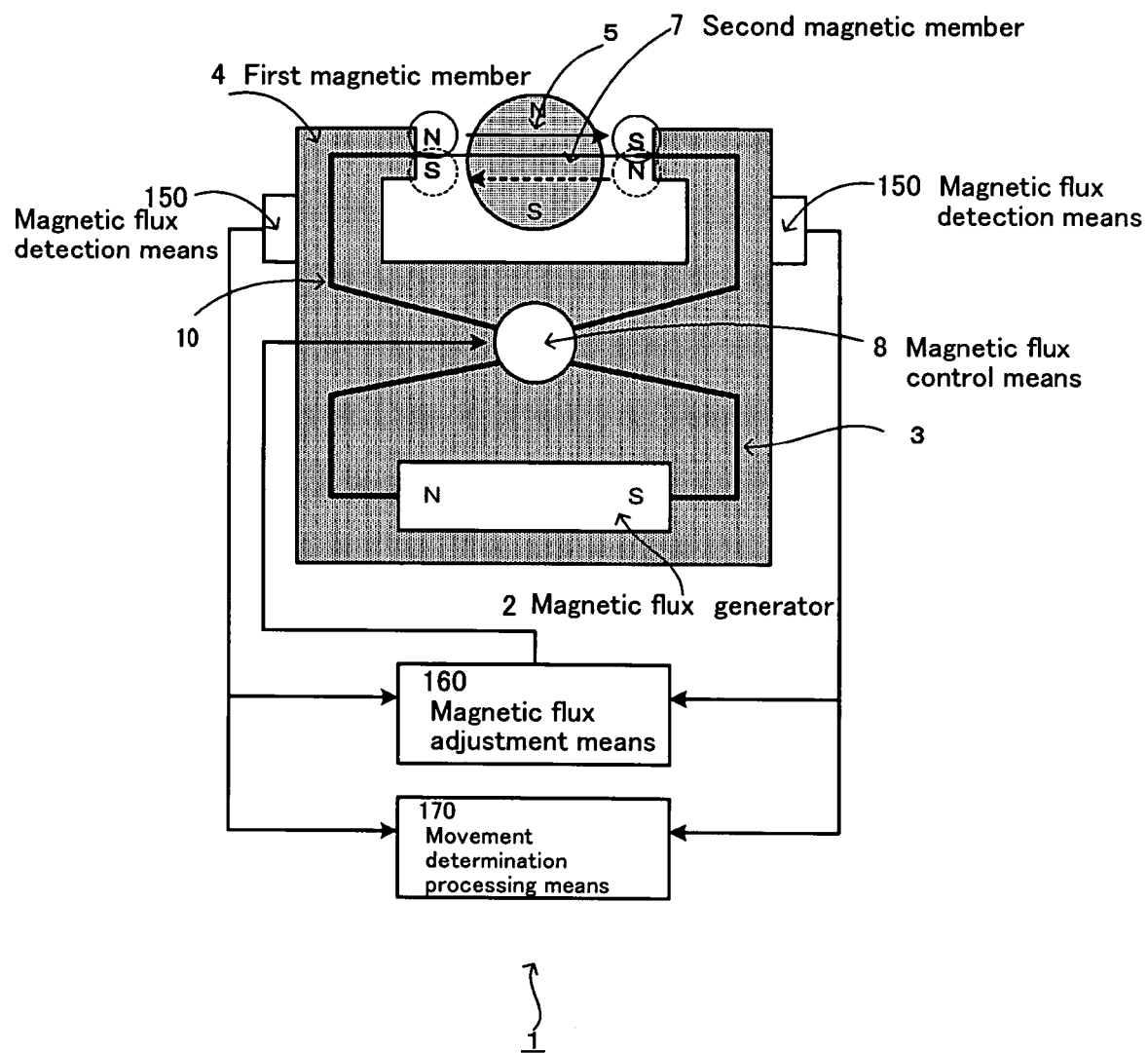
FIG. 44 is a diagram showing magnetic flux detection means, movement regulation processing means, and magnetic flux adjustment means of the present invention.

With reference to FIG. 44, the following describes a configuration example of a magnetic drive apparatus comprising magnetic flux detection means for detecting the intensity of magnetic flux flowing through a magnetic path, movement regulation processing means for determining whether to flow the magnetic flux, and magnetic flux adjustment means for adjusting the magnetic flux balance in a magnetic path.

FIG. 44 describes the magnetic drive apparatus using the general configuration shown in FIG. 1. The magnetic drive apparatus 1 comprises magnetic flux detection means 150 for detecting the intensity of magnetic flux flowing through the magnetic path 3 of the first magnetic member, magnetic flux adjustment means 160 that receives the intensity of magnetic flux detected by the magnetic flux detection means 150 for adjusting the magnetic flux balance in a magnetic path, and movement regulation processing means 170 that receives the intensity of magnetic flux detected by the magnetic flux detection means 150 for determining whether to flow the magnetic flux.

The magnetic flux detection means 150 may have a configuration in which the electromotive force of coils is detected, may use a magnetic sensor made of a hall element or an MR element, may be installed outside a magnetic path, or may be embedded in a magnetic path.

The magnetic flux adjustment means 160 receives the intensity of magnetic flux detected by the magnetic flux detection means 150, compares the amount of magnetic flux flowing through the magnetic paths at non-operation time with a predetermined amount, and adjusts the magnetic flux so that its amount equals the predetermined amount. The amount of magnetic flux can be adjusted by the magnetic flux control means provided on the magnetic paths. For example, the magnetic characteristics control means may be used to adjust the magnetic resistance of the variable magnetic characteristics member. The magnetic flux adjustment means may be provided separately from the magnetic characteristic control means used for moving the magnetic member or may be used both as the magnetic flux adjustment means and as the magnetic characteristic control means.

The movement regulation processing means 170 receives the intensity of magnetic flux detected by the magnetic flux detection means 150 and, based on the intensity of magnetic flux or on the balance of the amount of magnetic flux flowing through the magnetic paths, determines if the rotational operation or the linear operation can be performed or the rotation or movement into a predetermined direction is possible. The regulation result can be displayed on display means not shown or can be transmitted to a control unit not shown or to a device used on the magnetic drive apparatus.

Next, a third embodiment of a magnetic drive apparatus according to the present invention will be described. In the third embodiment, the flow of magnetic flux is controlled by a combination of the switching of a bridge-configuration magnetic circuit and the selection from and switching between a plurality of magnetic circuits.

Figure 45A:
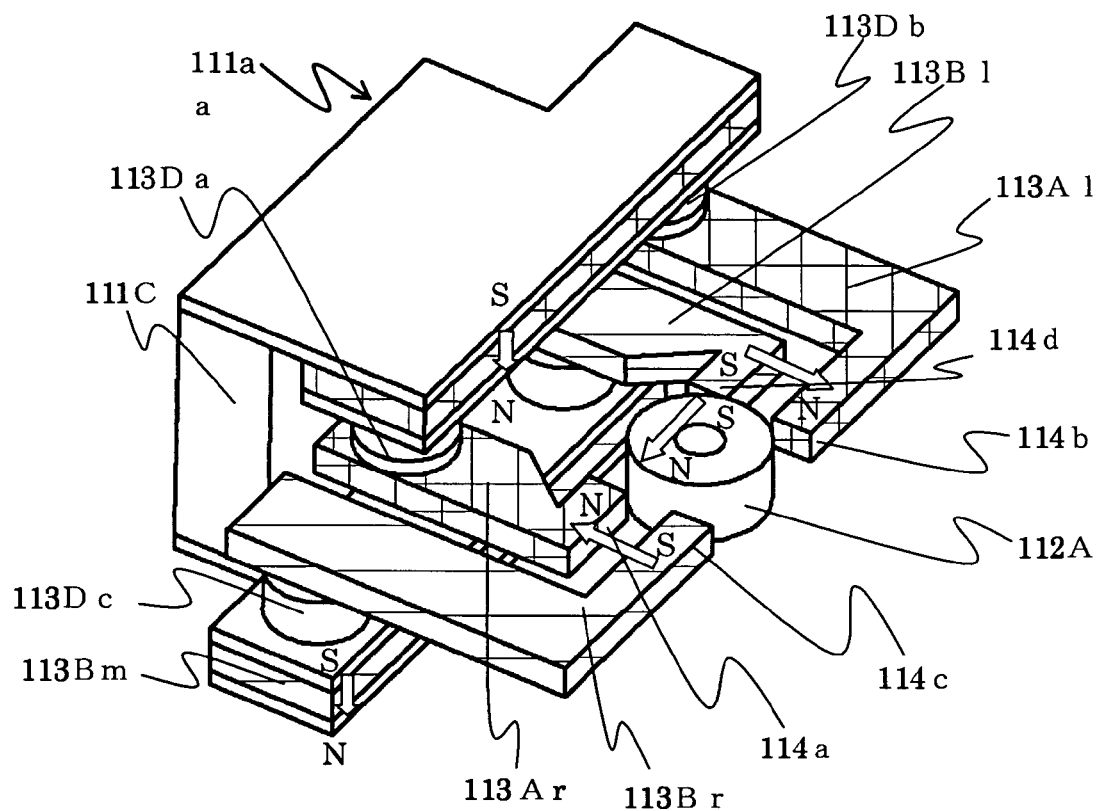
FIG. 45 is an assembly diagram and a development showing a configuration example of the magnetic drive apparatus of the present invention.
Figure 45B:
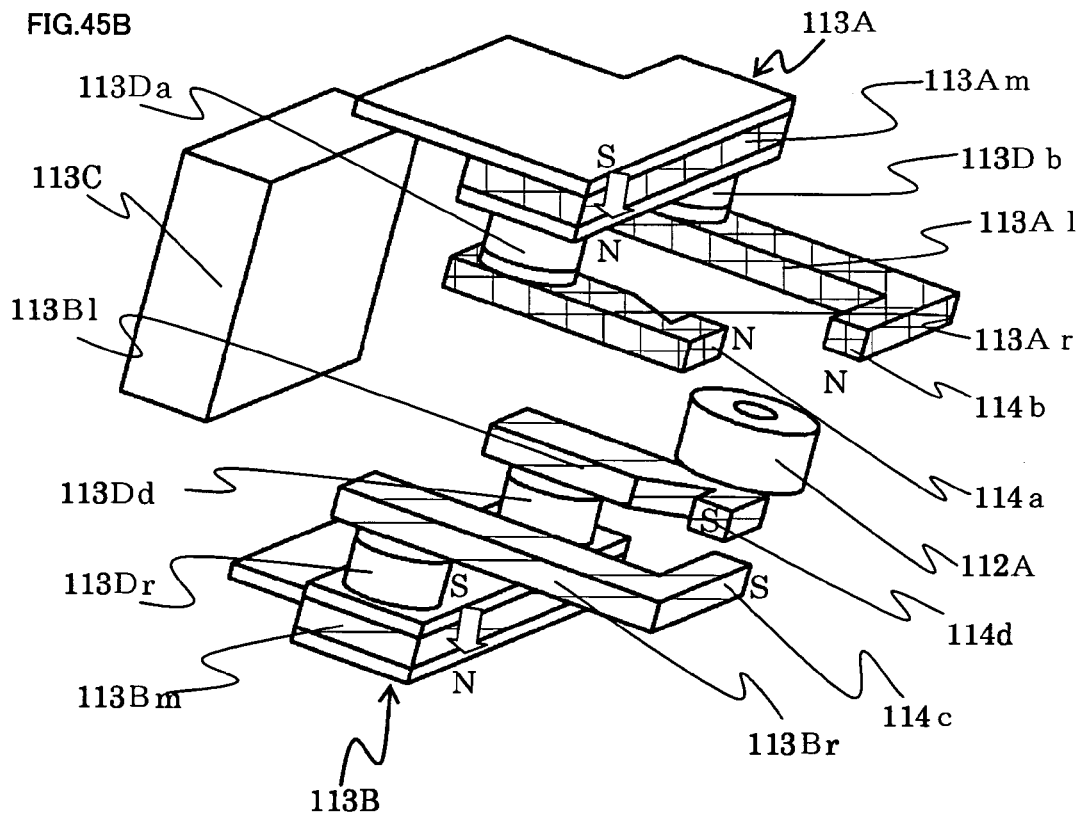

With reference to FIGS. 45A and 45B, the following describes the configuration examples and operation of the third embodiment of the magnetic drive apparatus according to the present invention. FIG. 45A and FIG. 45B are diagrams showing a third configuration example of the second mode of the magnetic drive apparatus according to the present invention. FIG. 45A is an assembly diagram of the magnetic drive apparatus, and FIG. 45B is a development of the magnetic drive apparatus.

A magnetic drive apparatus 111a according to the present invention comprises a rotor 112 and a stator 113 as shown in FIG. 45A and FIG. 45B. The rotor 112 comprises a rotor magnetic flux generator 112A. In the description below, the rotor 112 will be described as the rotor magnetic flux generator 112A. To this rotor magnetic flux generator 112A, any rotational direction based on the operation principle that will be described later and a rotational force of any magnitude within a range defined by the magnetic flux from stator magnetic flux generator and the rotor magnetic flux generator are applied. The rotation of this rotor is controlled by controlling this driving operation.

The stator 113 comprises a plurality of magnetic units 113A and 113B each comprising a set of a stator magnetic flux generator 113Am or 113Bm and stator magnetic paths 113Ar and 113Al or 113Br and 113Bl through which the magnetic flux from the stator magnetic flux generator 113Am or 113Bm is sent to the rotor magnetic flux generator 112A; a magnetic passage member 113C that connects the set of this plurality of magnetic units 113A and 113B to form a magnetic circuit; and a plurality of magnetic flux control means, 113Da to 113Dd, provided on intermediate positions on the stator magnetic paths 113Ar, 113Al, 113Br, and 113Bl for controlling the magnetic flux flowing through the stator magnetic paths 113Ar, 113Al, 113Br, and 113Bl.

As shown in the development in FIG. 45B, this stator 113 is arranged in such a way that the plurality of magnetic units 113A and 113B are laminated with the magnetic passage member 113C between them and that the magnetization directions of the magnetic poles of the stator magnetic flux generators 113Am and 113Bm are the same. In addition, the stator magnetic paths 113Al, 113Ar, 113Bl, and 113Br of the plurality of magnetic units 113A and 113B are arranged in the same plane.

The magnetization direction of the magnetic poles of the rotor 112 are set orthogonal to the axial direction of the rotor, and the magnetization direction of the magnetic poles of the stator magnetic flux generators 113Am and 113Bm is set in the same direction as the axial direction of the rotor 112.

The stator magnetic paths 113Ar, 113Al, 113Br, and 113Bl branch the poles of the stator magnetic flux generators 113Am and 113Bm into multiples, with each of the branch ends being a single magnetic pole that is magnetically separated. The magnetic pole ends of different polarity are combined into two sets of magnetic pole ends (a set of magnetic pole ends 114a and 114c and a set of magnetic pole ends 114b and 114d). Those sets are arranged in such a way that the magnetic flux direction vector between the magnetic pole ends 114a, 114c and magnetic pole ends 114b, 114d is in the same plane as the magnetic flux direction vector between the pair of magnetic poles of the rotor magnetic flux generator 112A.

In FIG. 45A and FIG. 45B, the magnetic pole ends 114a and 114b are the N pole and the magnetic pole ends 114c and 114d are the S pole, and a magnetic flux direction vector is formed between those magnetic pole ends. On the other hand, because the rotor 112 has the rotor axial direction as described above, the magnetic flux direction vectors can be orthogonal components each other in the rotation position except when the magnetic flux direction vectors are in parallel. The orthogonal components generated between the magnetic flux direction vectors apply rotational driving force to the rotor.

In addition, both magnetic flux vectors, if generated in the same plane, could prevent components perpendicular to the rotational axis, which does not contribute to the rotational driving, from being generated and thus reduce the loss in the rotational force.

In the magnetic drive apparatus 111a configured in this way, the magnetic flux control means 113Da to 113Dd are used to control the amount of magnetic flux flowing through the stator magnetic paths 113Ar, 113Al, 113Br, and 113Bl for switching the balance of the magnetic pole force between the sets of magnetic pole ends, that is, the set of magnetic pole ends 114a and 114c and the set of magnetic pole ends 114b and 114d. As a result, this configuration changes the distribution of magnetic flux flowing between the magnetic pole ends 114a-114d via the rotor magnetic flux generator 112A and generates the driving force for rotating the rotor magnetic flux generator 112A arranged between magnetic pole ends 114a-114d.

In this way, the magnetic drive apparatus 111a according to the present invention implements a driving apparatus that eliminates the need for excitation coils required by the configuration in the prior art. In addition, this apparatus eliminates the need for the excitation coils, reduces the energy consumption due to a copper loss such as that generated by the excitation coils, and reduces power consumption. Because the excitation coils are not required, the driving apparatus size does not depend on the coil diameter, making it possible to make the driving apparatus compact and low profile.

Next, the following describes a practical configuration example of the magnetic drive apparatus 111a according to the present invention more in detail.

As shown in FIGS. 45A and 45B, the poles of the stator magnetic flux generators 113Am and 113Bm in the magnetic drive apparatus 111a according to the present invention are branched into multiples, with the branch ends being magnetic pole ends 114a-114d. The magnetic pole ends of different polarity are combined into two sets (a set of magnetic pole ends 114a and 114c and a set of magnetic pole end 114b and 114d) and are arranged in such a way that the magnetic flux direction vector between the magnetic pole ends 114a, 114c and magnetic pole ends 114b, 114d of the sets is in the same plane as the magnetic flux direction vector between the pair of magnetic poles of the rotor magnetic flux generator 112A.

With reference to FIG. 46-FIG. 48, the following describes in detail the steps (step 1 to step 6) of the magnetic drive apparatus 111a for rotating the rotor magnetic flux generator 112A. The configuration described below corresponds to the third configuration example in the second embodiment of the present invention.

FIG. 46-FIG. 48 are diagrams showing the operation principle of the magnetic drive apparatus 111a according to the present invention and show the operation order of a plurality of magnetic flux control means 3Da-3Dd.

Figure 46A:
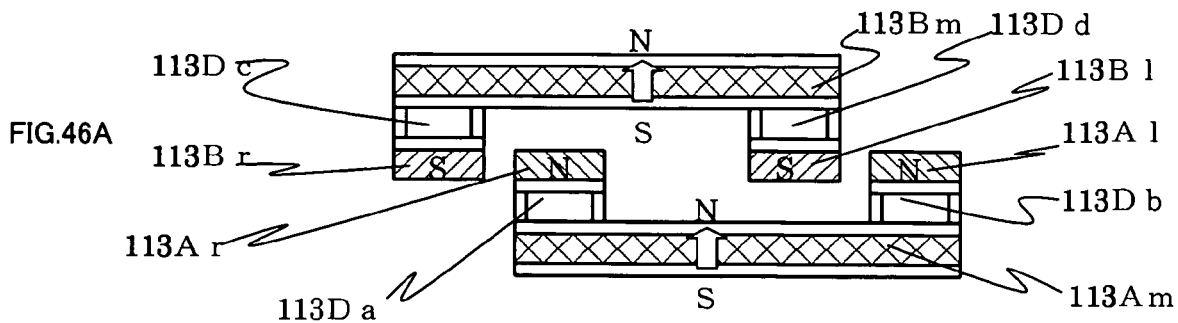
FIG. 46 is a diagram showing the principle of operation of the magnetic drive apparatus of the present invention.
Figure 46B:
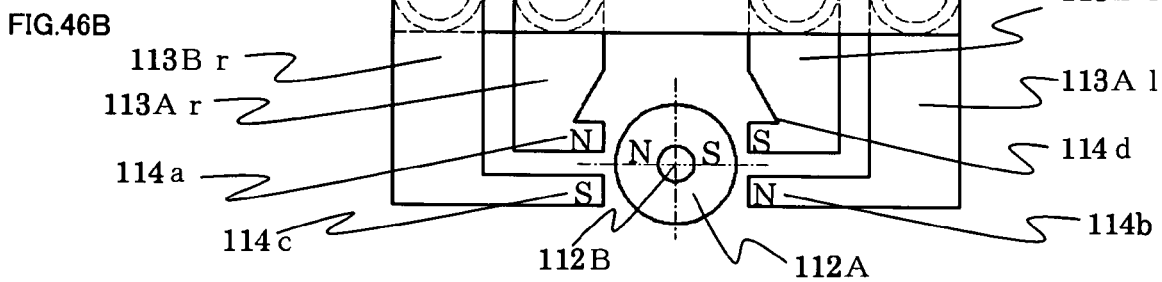
Figure 47A:
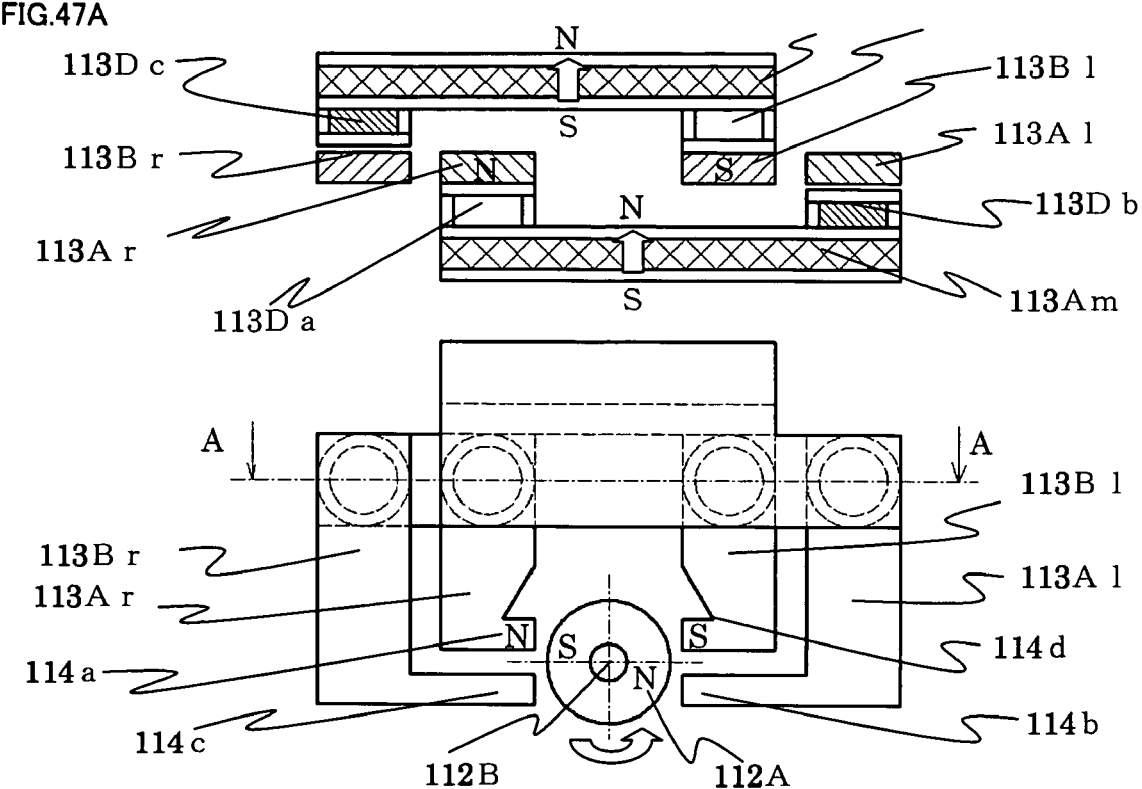
FIG. 47 is a diagram showing the principle of operation of the magnetic drive apparatus of the present invention.
Figure 47B:
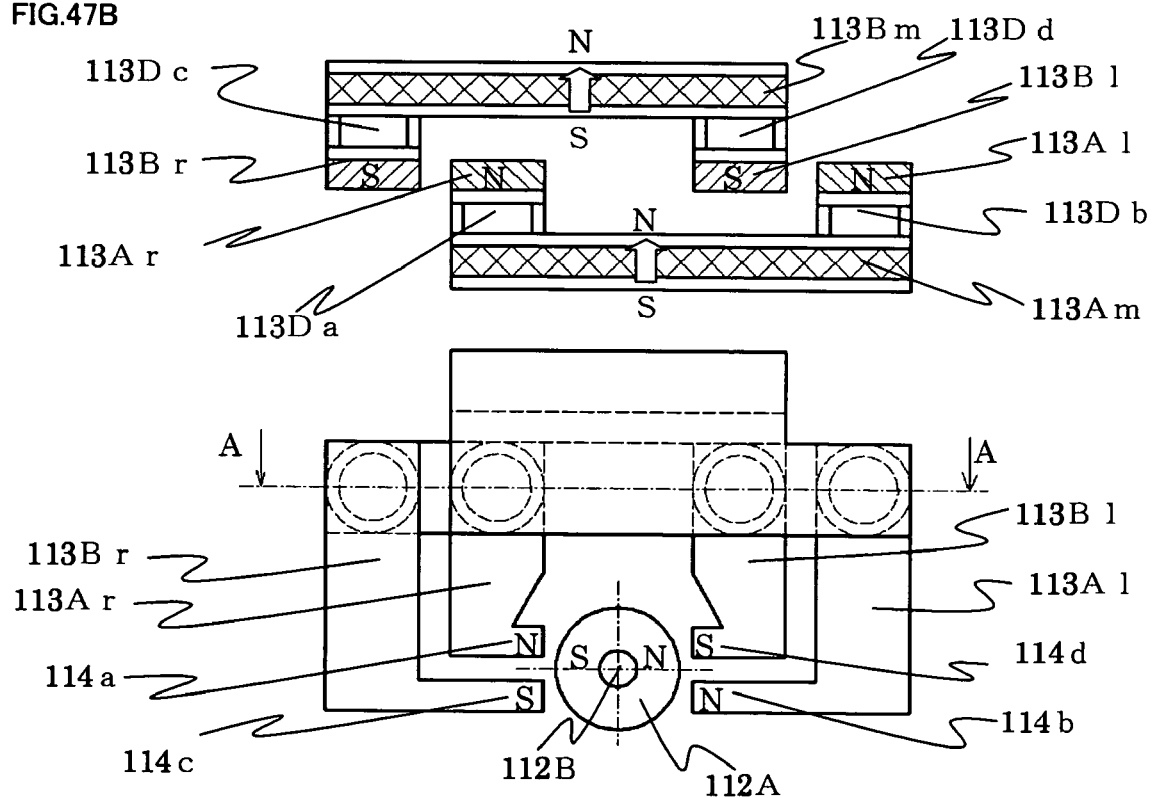
Figure 48A:
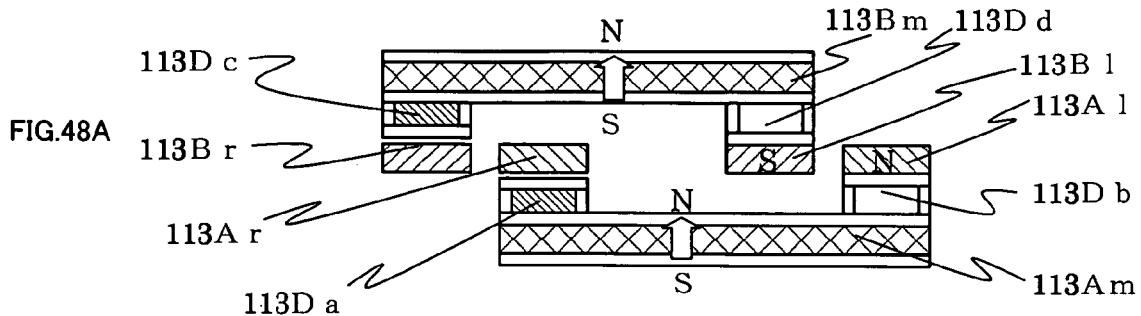
FIG. 48 is a diagram showing the principle of operation of the magnetic drive apparatus of the present invention.
Figure 48B:
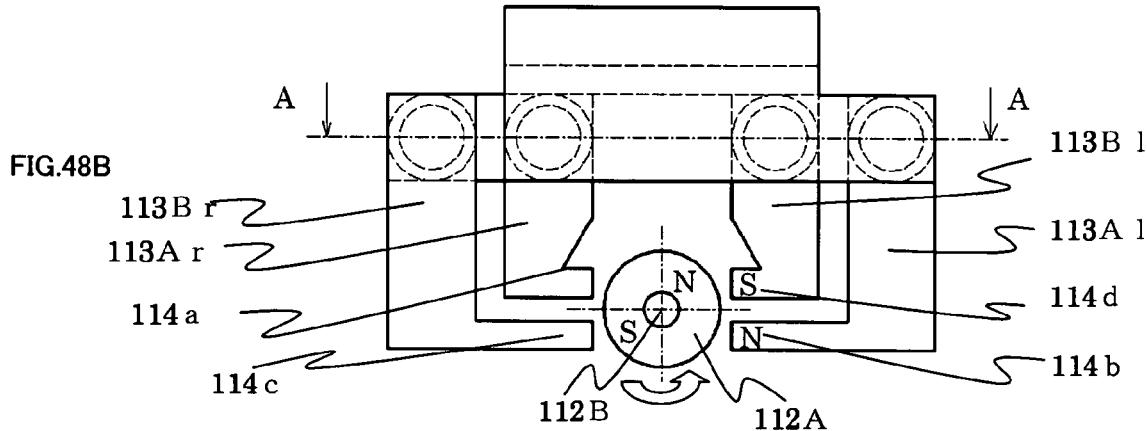

FIG. 46A, FIG. 47A, and FIG. 48A are cross sectional diagrams taken on line A-A in the front view, and FIG. 46B, FIG. 47B, and FIG. 48B are diagrams showing the front view of a magnetic drive apparatus 1a according to the present invention. Those figures show the relation between the magnetic poles that are strongly generated at the magnetic pole ends 114a-114d and the magnetic poles of the rotor magnetic flux generator 112A. Although not shown in the figures, the holding members are required to fix the magnetic units 113A and 113B constituting the stator.

FIG. 46A and FIG. 46B show step 1. Step 1 shows the non-operation, stable state in which the magnetic flux control means 113Da to 113Dd are not operated. In this state where no magnetic flux control means 113Da to 113Dd are operated, the amount of magnetic flux from the stator magnetic flux generators 113Am and 113Bm flows equally among the stator magnetic paths 113Ar, 113Al, 113Br, and 113Bl, with the result that an equal magnitude of the N pole appears at magnetic pole ends 114a and 114b and an equal magnitude of S pole on the magnetic pole ends 114c and 114d. This allows the rotor magnetic flux generator 112A to enter the balanced state at a position shown in FIG. 46B and to remain in the non-operation state. Then, after executing step 2 to step 6 that follow, the rotor magnetic flux generator 112A returns to step 1 again. Sequentially repeating the steps allows the magnetic flux generator 2A to be rotated continuously.

Figure 46C:
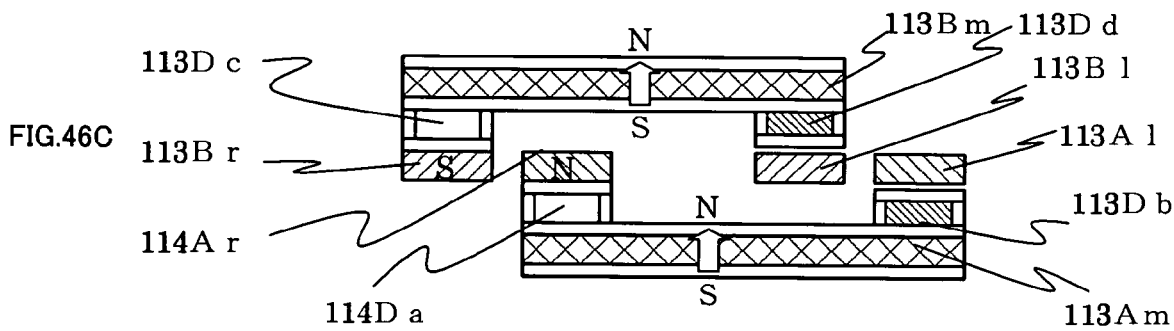
Figure 46D:
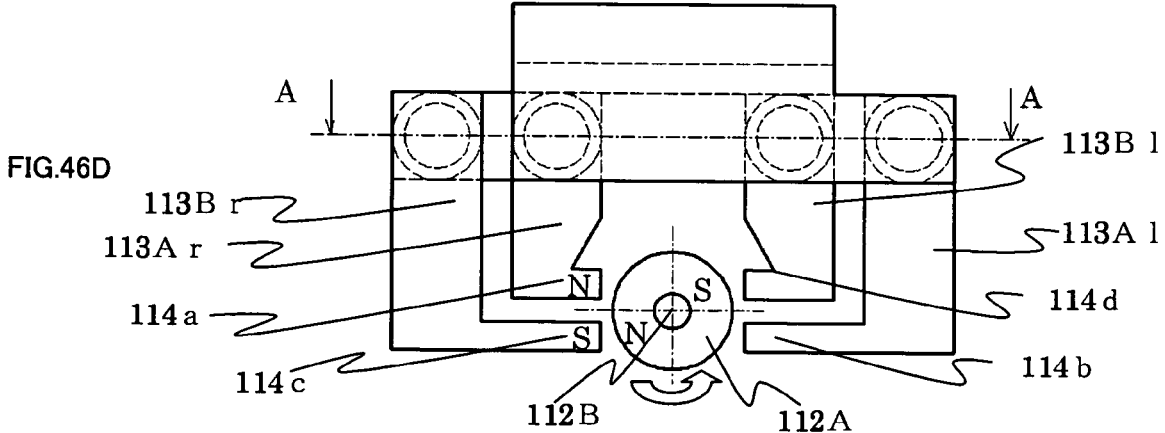

Next, FIG. 46C and FIG. 46D show step 2. In step 2, magnetic flux control means 113Db and 113Dd are operated to increase magnetic resistance of the magnetic circuit in the stator magnetic paths 113Al and 113Bl. Because the stator magnetic flux generators 113Am and 113Bm are a magnetic flux generator that generates a constant magnetic flux, the magnetic flux flows mainly through the stator magnetic paths 113Ar and 113Br. The magnetic flux that flows as described above makes the N pole at the magnetic pole end 114a stronger than that at the magnetic pole end 114b and makes the S pole at the magnetic pole end 114c stronger than that at the magnetic pole end 114d.

As a result, the magnetic flux appearing at the magnetic pole ends 114a and 114c mainly operates on the rotor magnetic flux generator 112A. This magnetic flux rotates (counterclockwise in FIG. 46D) the rotor magnetic flux generator 112A around a rotation center 112B until it enters the balanced state in step 2 in FIG. 46D.

Next, FIG. 47A and FIG. 46B show step 3. In step 3, magnetic flux control means 113Db and 113Dc are operated to increase magnetic resistance of the magnetic circuit in the stator magnetic paths 113Br and 113Al. Because the stator magnetic flux generators 113Am and 113Bm are a magnetic flux generator that generates a constant magnetic flux, the magnetic flux flows mainly through the stator magnetic paths 113Ar and 113Bl. The magnetic flux that flows as described above makes the N pole at the magnetic pole end 114a stronger than that at the magnetic pole end 114b and makes the S pole at the magnetic pole end 114d stronger than that at the magnetic pole end 114c.

As a result, the magnetic flux appearing at the magnetic pole ends 114a and 114d mainly operates on the rotor magnetic flux generator 112A. This magnetic flux rotates (counterclockwise in FIG. 47D) the rotor magnetic flux generator 112A around the rotation center 112B until it enters the balanced state in step 3 in FIG. 47B.

FIG. 47C and FIG. 47D show step 4. Step 4 shows the non-operation, stable state of the rotor magnetic flux generator 112A in which the magnetic flux control means 113Da to 113Dd are not operated. In this state where no magnetic flux control means 113Da to 113Dd are operated, the amount of magnetic flux from the stator magnetic flux generators 113Am and 113Bm flows equally among the stator magnetic paths 113Ar, 113Al, 113Br, and 113Bl, with the result that an equal magnitude of the N pole appears at magnetic pole ends 114a and 114b and an equal magnitude of S pole on the magnetic pole ends 114c and 114d. This allows the rotor magnetic flux generator 112A to enter the balanced state at a position shown in FIG. 47C and FIG. 47D and to remain in the non-operation state. This state is a state in which the rotor magnetic flux generator 112A has rotated 180 degrees around the rotation center 112B from step 1 shown in FIG. 46A and FIG. 46B.

Next, FIG. 48A and FIG. 48B show step 5. In step 5, magnetic flux control means 113Da and 113Dc are operated to increase magnetic resistance of the magnetic circuit in the stator magnetic paths 113Ar and 113Br. Because the stator magnetic flux generators 113Am and 113Bm are a magnetic flux generator that generates a constant magnetic flux, the magnetic flux flows mainly through the stator magnetic paths 113Al and 113Bl. The magnetic flux that flows as described above makes the N pole at the magnetic pole end 114*b* stronger than that at the magnetic pole end 114*a* and makes the S pole at the magnetic pole end 114*d* stronger than that at the magnetic pole end 114*c*.

As a result, the magnetic flux appearing at the magnetic pole ends 114*b* and 114*d* mainly operates on the rotor magnetic flux generator 112A. This magnetic flux rotates (counterclockwise in the figure) the rotor magnetic flux generator 112A around the rotation center 112B until it enters the balanced state in step 5 in FIG. 48A and FIG. 48B.

Figure 48C:
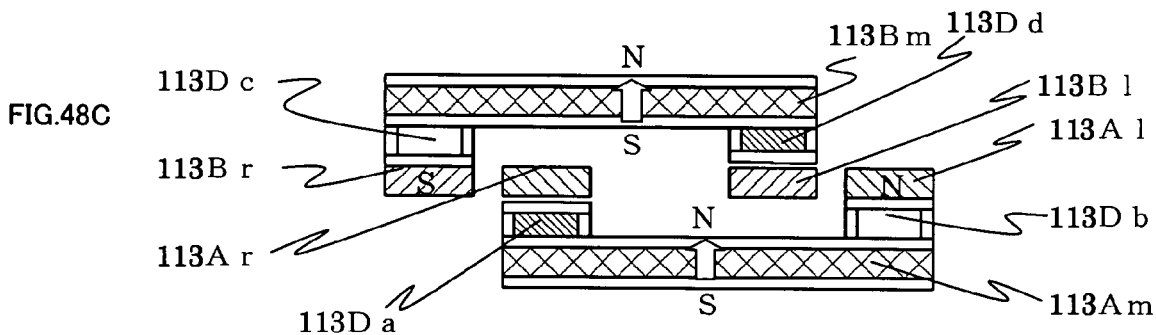
Figure 48D:
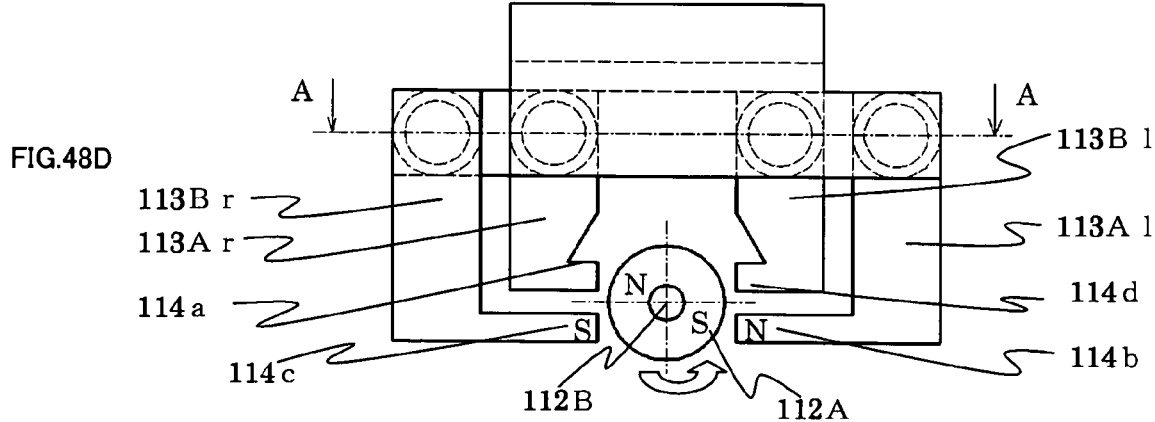

Next, FIG. 48C and FIG. 48D show step 6. In step 6, magnetic flux control means 113Da and 113Dd are operated to increase magnetic resistance of the magnetic circuit in the stator magnetic paths 113Ar and 113Bl. Because the stator magnetic flux generators 113Am and 113Bm are a magnetic flux generator that generates a constant magnetic flux, the magnetic flux flows mainly through the stator magnetic paths 113Al and 113Br. The magnetic flux that flows as described above makes the N pole at the magnetic pole end 114*b* stronger than that at the magnetic pole end 114*a* and makes the S pole at the magnetic pole end 114*c* stronger than that at the magnetic pole end 114*d*.

As a result, the magnetic flux appearing at the magnetic pole ends 114*b* and 114*c* mainly operates on the rotor magnetic flux generator 112A. This magnetic flux rotates (counterclockwise in the figure) the rotor magnetic flux generator 112A around the rotation center 112B until it enters the balanced state in step 6 in FIG. 48C and FIG. 48D.

As described above, repeatedly performing step 1 to step 6 rotates the rotor magnetic flux generator 112A.

Figure 49A:
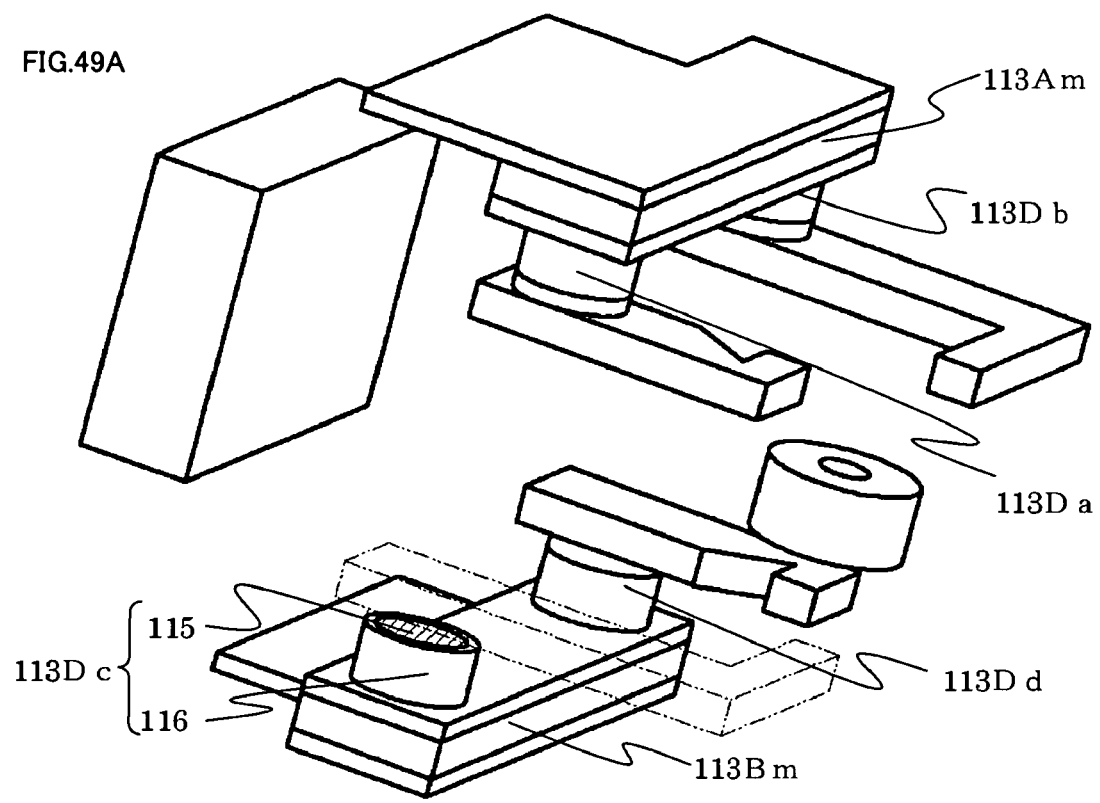
FIG. 49 is a perspective diagram and an enlarged cross sectional diagram showing the configuration of magnetic flux control means in the magnetic drive apparatus of the present invention.
Figure 49B:
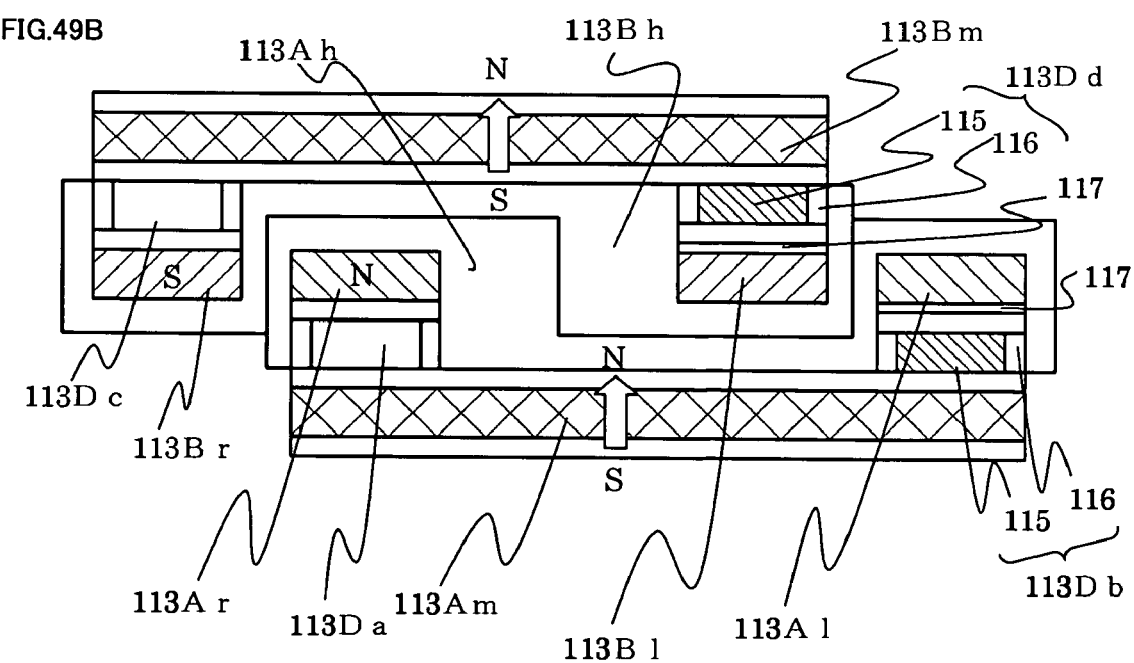

Next, the configuration and the operation of the magnetic flux control means in the magnetic drive apparatus 111*a* according to the present invention will be described. FIG. 49A and FIG. 49B show a practical configuration example of the magnetic flux control means 113Da to 113Dd. The magnetic flux control means 113Da to 113Dd all have the same configuration.

Each of the magnetic flux control means 113Da to 113Dd comprises a magnetostrictive member 115 whose magnetic characteristics vary according to an applied stress and a stress application element 116 that applies stress to the magnetostrictive member 115. The magnetostrictive member 115 is formed as a post (for example, columnar form). The stress application element 116 is formed as a tube (for example, circular cylindrical form) made of a material that generates stress upon receiving an electrical signal, such as a piezoelectric element, and is arranged next to and around the magnetostrictive member 115.

The magnetostrictive member 115 and the stator magnetic flux generators 113Am and 113Bm are arranged in such a way that the magnetic flux direction between the magnetic pole pair of the ferromagnetic magnetostrictive member 115 is the same as the magnetic flux direction between the magnetic pole ends of the stator magnetic flux generators 113Am and 113Bm.

The stress application element 116 is arranged so that its stress application direction is the same as the direction between the magnetic pole pair of the ferromagnetic magnetostrictive member 115 and compressive force is applied to the magnetostrictive member 115. The stress direction and stress magnitude of the stress application element 116 can be controlled by the control signal.

Next, how the magnetic flux control means 113Db and 113Dd change the magnetic resistance will be described with the magnetic flux control means 113Db and 113Dd as an example. FIG. 49B is an enlarged cross sectional diagram showing the magnetic units 113A and 113B in step 2 in FIG. 46C.

As shown in FIG. 49, the compressive force of the stress application element 116 operates on and compresses the magnetostrictive member 115. When compressed, the magnetostrictive member 115 has its permeability changed. The magnetic resistance of the magnetic circuit passing through the magnetostrictive member 115 increases by the permeability change known as the Villari effect. Stator magnetic paths 113Al and 113Bl are fit into and joined to the concave part formed on holding members 113Ah and 113Bh, respectively. At this time, when the magnetic flux control means 113Db and 113Dd are shrunk by the operation of the stress application element 116, a small gap 117 is generated between the stator magnetic paths 113Al and 113Bl and the magnetic flux control means 113Db and 113Dd. As a result, this gap as well as the increase in the magnetic resistance due to the permeability change further increases the magnetic resistance of the magnetic circuit passing through the magnetostrictive member 115.

An increase in the magnetic resistance of the stator magnetic paths 113Al and 113Bl in a closed magnetic circuit having a fixed amount of magnetic flux results in an increase in the amount of magnetic flux in the other stator magnetic paths 113Ar and 113Br where the magnetic resistance is not increased. Although not shown, the magnetic flux control means 113Da and 113Dc can also be controlled in the same manner. That is, a decrease in the amount of magnetic flux in the stator magnetic paths 113Ar and 113Br results in an increase in the amount of magnetic flux in the stator magnetic paths 113Al and 113Bl.

Controlling the magnetic flux control means 113Da to 113Dd in the above configuration allows the amount of magnetic flux, which flows to the stator magnetic paths 113Al, 113Bl, 113Ar, and 113Br, to be controlled. The magnetic drive apparatus 111*a* according to the present invention implements a driving apparatus that uses this magnetic flux control and eliminates the need for excitation coils. This magnetic drive apparatus eliminates the need for the excitation coils, reduces the energy consumption due to a copper loss such as that generated by the excitation coils, and reduces power consumption. Because the excitation coils are not required, the design of the driving apparatus does not depend on the coil diameter, making it possible to make the apparatus compact and low profile.

The effect specific to the above configuration is as follows.

The magnetic drive apparatus 111*a* according to the present invention has a configuration in which the permanent magnets (that is, the stator magnetic flux generators 113Am and 113Bm) have the same magnetization direction and the flat plates are laminated. This configuration makes the assembly process easy and simplifies the stator magnetization process.

In addition, the arrangement of the magnetic units 113A and 113B in such a way that the magnetic flux direction vector between the magnetic pole ends of each set (that is, between the magnetic pole ends 114*a* and 114*c* and magnetic pole ends 114*b* and 114*d*) is in the same plane as the magnetic flux direction vector between the pair of magnetic poles of the rotor magnetic flux generator 112A allows all magnetic fluxes, which contribute to the driving of the rotor, to be put in the same plane and eliminates the vertical components that do not contribute to the rotational driving. This arrangement generates neither operation force into the direction in which the rotational axis of the rotor magnetic flux generator 112A is tilted nor a friction loss caused by the operation force. Therefore, the magnetic drive apparatus 111a according to the present invention can further decrease the amount of energy required for the driving.

The magnetic flux control means 113Da to 113Dd of the magnetic drive apparatus 111a according to the present invention each have a unique configuration in which the stress application element 116 is arranged next to and around the magnetostrictive member 115. This unique configuration allows stress to be applied equally to the magnetostrictive member 115 and effectively generates the Villari effect.

Because the magnetization direction between the pair of magnetic poles of the magnetostrictive member 115 is the same as that between the pair of magnetic poles of the stator magnetic flux generators 113Am and 113Bm, the directions of all pairs of magnetic poles of all ferromagnetic magnets are the same and, therefore, the magnetization process is required only once when the stator is manufactured.

The stress application element 116 applies compressive force, not tensile force, to the magnetostrictive member 115 that is fragile and thus improves the life of the material constituting the magnetostrictive member 115. At the same time, the change in the magnetic resistance, made by the Villari effect and the small gap 117, allows the amount of magnetic flux to be controlled more effectively.

Figure 50A:
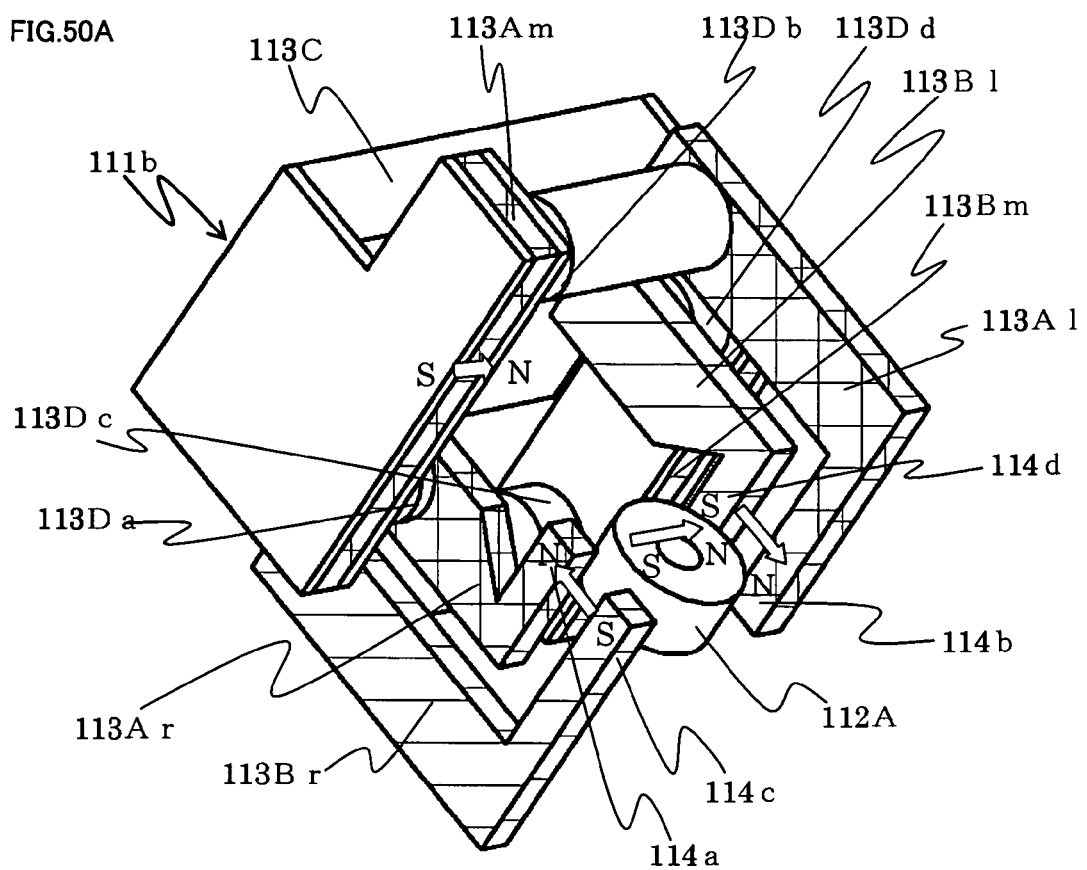
FIG. 50 is an assembly diagram and a development showing another configuration example of the magnetic drive apparatus of the present invention.

Next, the following describes another configuration example (fourth configuration example) of the magnetic drive apparatus according to the present invention. FIG. 50 is a diagram showing another configuration example of the magnetic drive apparatus according to the present invention. FIG. 50A shows the assembly diagram of this magnetic drive apparatus, and FIG. 50B shows the development of this magnetic drive apparatus.

Figure 50B:
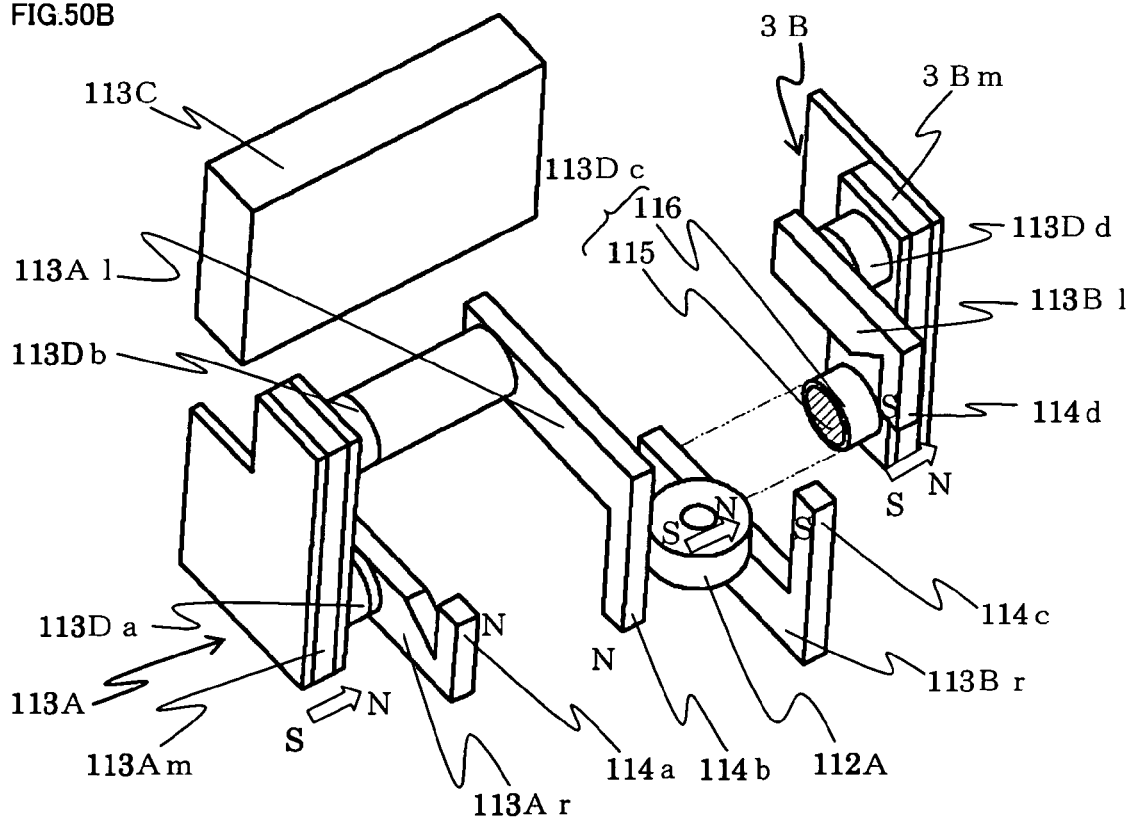

As shown in FIG. 50A and FIG. 50B, the poles of the stator magnetic flux generators 113Am and 113Bm are branched into multiples in this configuration example, with each of the branch ends (114a-114d) being a single magnetic pole that is magnetically separated. The magnetic pole ends of different polarity are combined into two sets of magnetic pole ends (a set of 114a and 114c and a set of 114b and 114d). Those sets are arranged in such a way that the magnetic flux direction vector between the magnetic pole ends 114a, 114c and magnetic pole ends 114b, 114d is in the same plane as the magnetic flux direction vector between the pair of magnetic poles of the rotor magnetic flux generator 112A. In addition, the magnetization direction of the magnetic poles of the rotor 112 is made orthogonal to the axial direction of the rotor, and the magnetization direction of the magnetic poles of the stator magnetic flux generators 113Am and 113Bm is made orthogonal to the axial direction of the rotor 112.

This configuration makes the magnetic flux direction between the pair of magnetic poles of the rotor magnetic flux generator 112A oriented in the same direction as the magnetization direction of the magnetic poles of the stator magnetic flux generators 113Am and 113Bm.

This configuration puts all directions, that is, the direction between the pair of magnetic poles of the magnetostrictive member 115, the direction between the pair of magnetic poles of the stator magnetic flux generators 113Am and 113Bm, and the magnetic flux direction between the pair of magnetic poles of the rotor magnetic flux generator 112A, in the same direction. This arrangement allows the magnetization process to be done with the pairs of magnetic poles of all ferromagnetic materials of the magnetic drive apparatus 111b oriented in the same direction. Therefore, the arrangement requires only one magnetization process of the magnetic drive apparatus 111b.

The steps for rotating the rotor magnetic flux generator 112A in this configuration example are the same as those in FIG. 45-FIG. 49 and therefore the description of the steps is omitted.

The configuration described above allows the magnetic flux control means 113Da-113Dd to control the magnetic flux flowing through the stator magnetic paths 113Al, 113Ar, 113Bl, and 113Br. As in the examples shown in FIG. 45-FIG. 49, the magnetic drive apparatus 111b according to the present invention eliminates the need for excitation coils. The configuration that does not require excitation coils reduces power energy consumption due to a copper loss of the excitation coils and reduces the power consumption. At the same time, the configuration that does not require excitation coils allows the magnetic drive apparatus to be designed regardless of the coil diameter and makes the magnetic drive apparatus compact and low profile.

Next, with reference to FIG. 51-FIG. 53, a first configuration example to a third configuration example of the magnetic flux control means using the above modes will be described.

Magnetic flux control means comprises a magnetostrictive member whose magnetic characteristics vary according to applied stress and a stress application element arranged next to and around the magnetostrictive member for applying stress to it. The stress application direction of the stress application element is made the same as the direction between the pair of magnetic poles of the magnetostrictive member, and the stress generated by the stress application element is applied to the magnetostrictive member as a compressive force. The magnetic characteristics of the magnetostrictive member vary according to the stress applied by the stress application element. Therefore, the magnetic resistance of a magnetic circuit and the amount of magnetic flux that flows can be controlled by adjusting the stress applied by the stress application element.

FIG. 51 is a diagram showing a first configuration example of magnetic flux control means. Magnetic flux control means 200 comprises a magnetostrictive member 205 and a stress application element 206 that surrounds the magnetostrictive member 205 for applying stress to the magnetostrictive member 205. The stress application element 206 is, for example, a piezoelectric member for generating a compressive stress.

In the first configuration example, the length of the stress application element 206 is set longer than the length of the magnetostrictive member 205 in the stress application direction (vertical direction in FIG. 51), and the ends of the stress application element 206 and the magnetostrictive member 205 are held by a pair of soft magnetic members 202U and 202D. The soft magnetic members 202U and 202D form a magnetic circuit via a magnetic path 201.

Figure 51A:
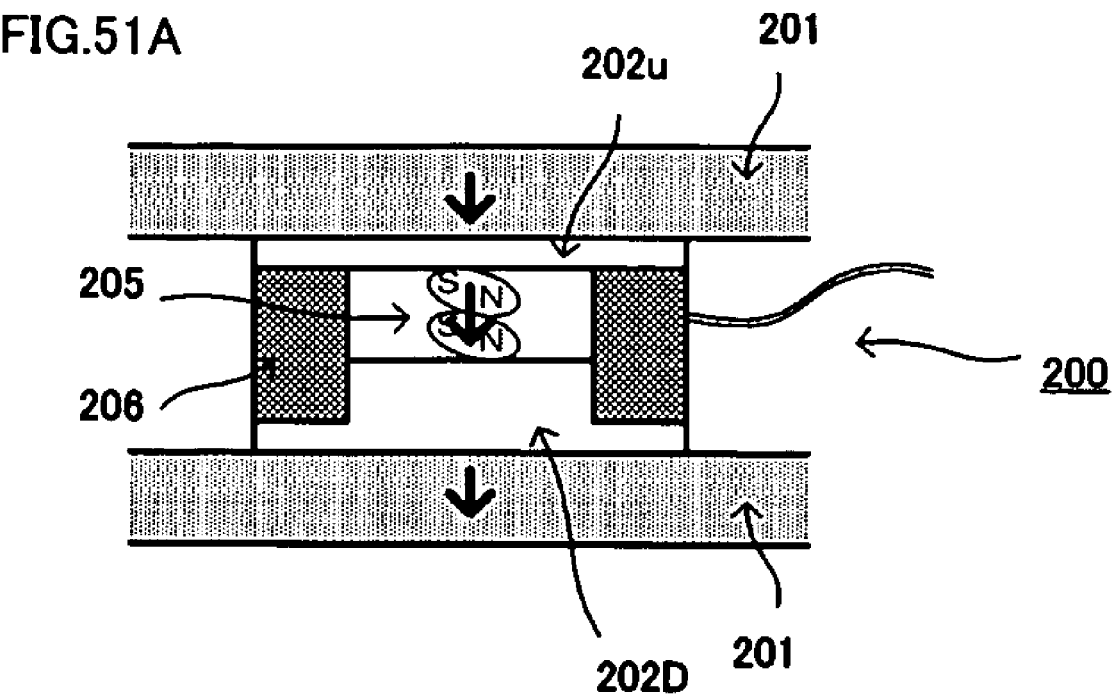
FIG. 51 is a diagram showing a first configuration example of magnetic flux control means of the present invention.

FIG. 51A shows the state in which the stress application element 206 does not apply stress to the magnetostrictive member 205 and the magnetostrictive member 205 is not compressed. At this time, because the permeability of the magnetostrictive member 205 is high, the magnetic resistance is decreased and therefore the amount of magnetic flux flowing through the soft magnetic member 202U, the magnetostrictive member 205, and the soft magnetic member 202D is not decreased greatly.

Figure 51B:
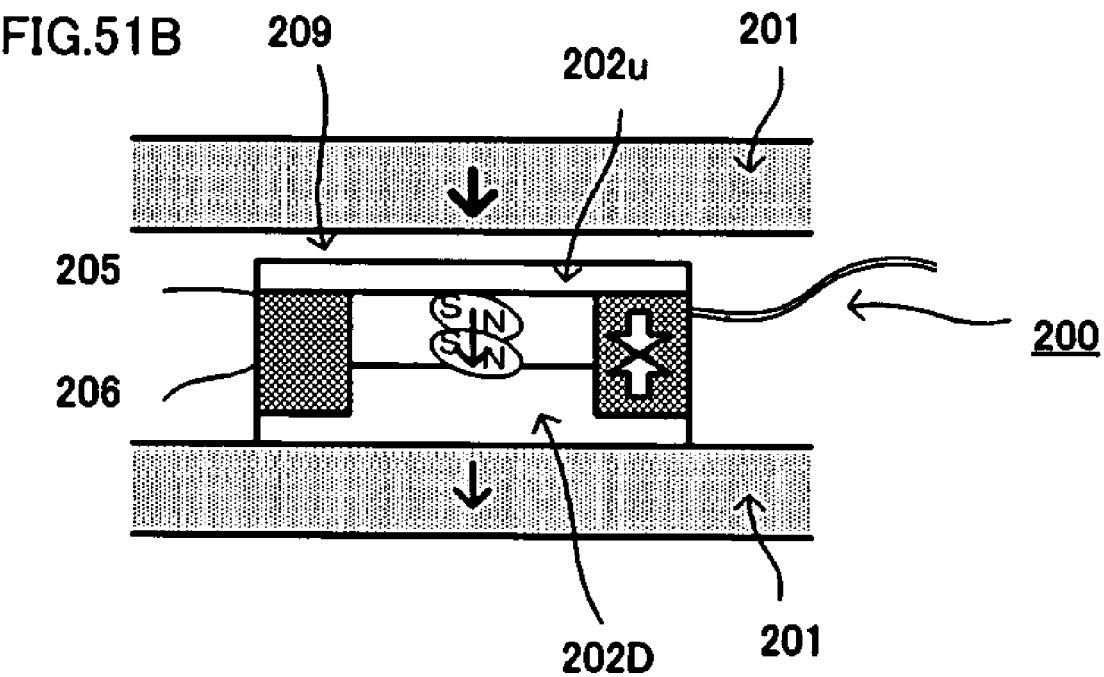

On the other hand, FIG. 51B shows the state in which the stress application element 206 applies stress to the magnetostrictive member 205 and the magnetostrictive member 205 is compressed. At this time, because the permeability of the magnetostrictive member 205 is low, the magnetic resistance is increased and therefore the amount of magnetic flux flowing through the soft magnetic member 202U, the magnetostrictive member 205, and the soft magnetic member 202D is decreased greatly.

In addition, when the magnetostrictive member 205 is compressed, a gap 209 is generated between the soft magnetic member 202U (or soft magnetic member 202D) and a magnetic path 201. This gap 209, normally high in magnetic resistance, further decreases the amount of magnetic flux.

The length of the stress application element 206, if set longer than the length of the magnetostrictive member 205, could cause the stress application element 206 to apply greater stress to the magnetostrictive member 205 for greater magnetostriction.

The magnetic flux control means in the second configuration example and the third configuration example has pressurization means to pressurize the magnetostrictive member. This pressurization means applies stress to the magnetostrictive member to eliminate a stress dead zone that is generated due to the initial characteristics of the magnetostrictive member.

FIG. 52 is a diagram showing a second configuration example of the magnetic flux control means Magnetic flux control means 210 comprises a magnetostrictive member 205, a stress application element 206 that surrounds the magnetostrictive member 205 for applying stress to the magnetostrictive member 205, and pressurization means 207 for pressurizing the magnetostrictive member 205 in advance. The pressurization means 207, for example, an elastic body such as a washer, is provided between a soft magnetic member 202U (or soft magnetic member 202D) and a magnetic path 201 for pressurizing the magnetostrictive member 205.

Figure 52A:
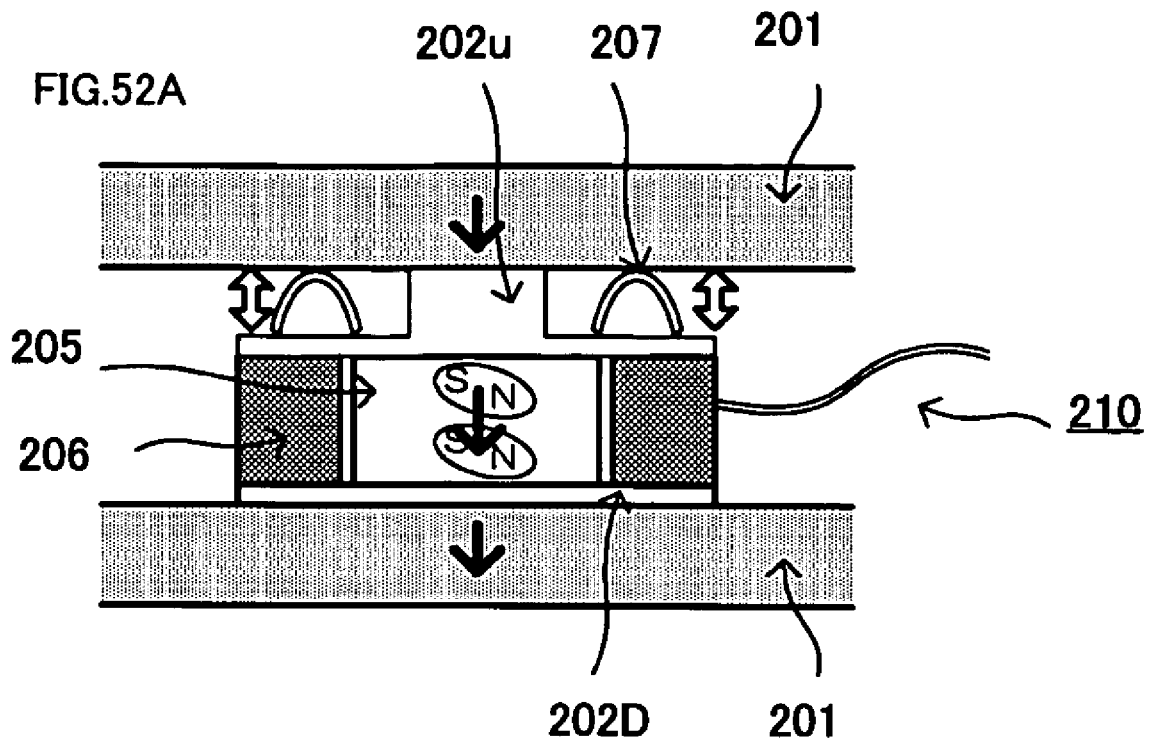
FIG. 52 is a diagram showing a second configuration example of magnetic flux control means of the present invention.

FIG. 52A shows the state in which the stress application element 206 does not apply stress to the magnetostrictive member 205 and the magnetostrictive member 205 is compressed only by the pressurization means 207. At this time, the permeability of the magnetostrictive member 205 is decreased slightly according to the stress applied by the pressurization means 207, the magnetic resistance is increased slightly, and the amount of magnetic flux flowing through the soft magnetic member 202U, the magnetostrictive member 205, and the soft magnetic member 202D is decreased slightly.

Figure 52B:
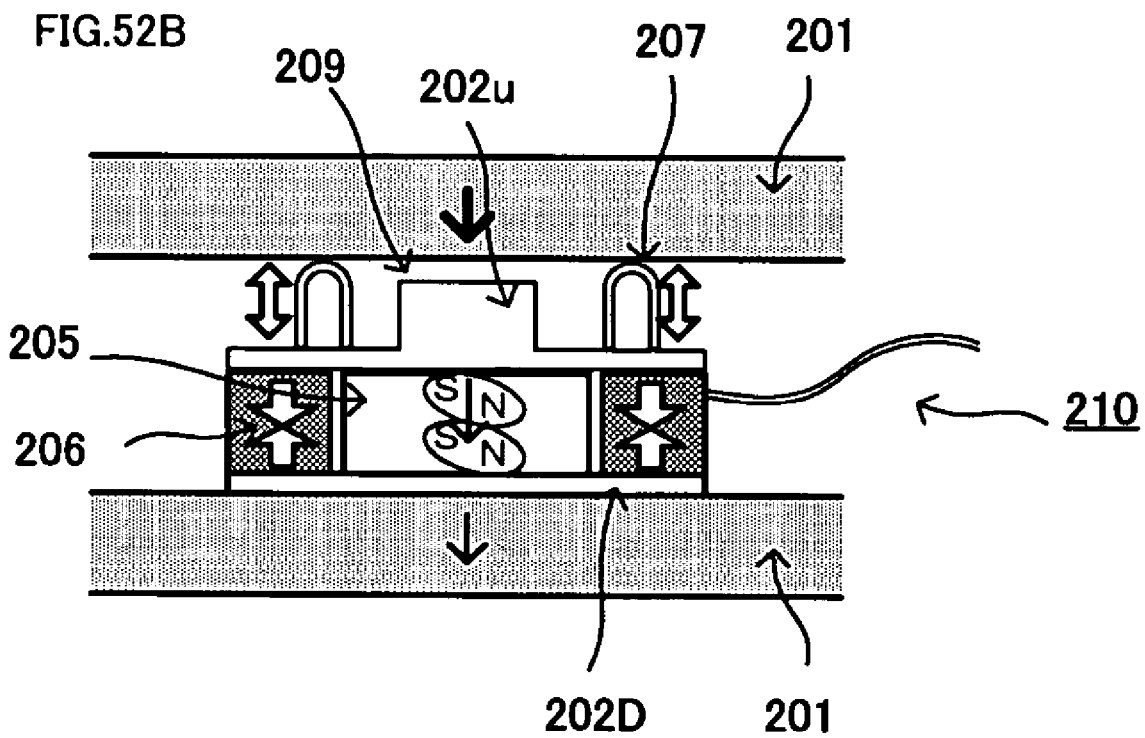

On the other hand, FIG. 52B shows the state in which the stress application element 206 applies stress to the magnetostrictive member 205 and the magnetostrictive member 205 is compressed by both the stress application element 206 and the pressurization means 207. At this time, the permeability of the magnetostrictive member 205 becomes low, the magnetic resistance becomes high, and the amount of magnetic flux flowing through the soft magnetic member 202U, the magnetostrictive member 205, and the soft magnetic member 202D is decreased greatly.

FIG. 53 is a diagram showing a third configuration example of magnetic flux control means. Magnetic flux control means 220 comprises a magnetostrictive member 205, a stress application element 206 that surrounds the magnetostrictive member 205 for applying stress to the magnetostrictive member 205, and pressurization means 208 for pressurizing the magnetostrictive member 205 in advance. The pressurization means 208, for example, a piezoelectric material for generating expansion, is provided between a soft magnetic member 202U (or soft magnetic member 202D) and a magnetic path 201 for pressurizing the magnetostrictive member 205.

Figure 53A:
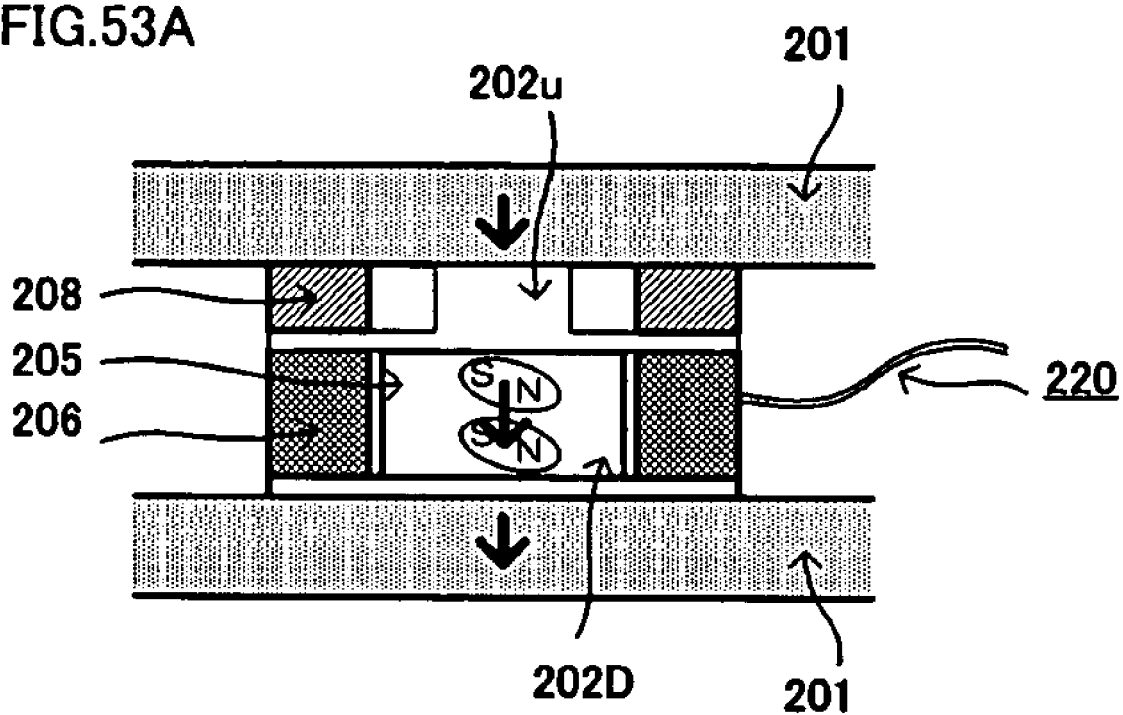
FIG. 53 is a diagram showing a third configuration example of magnetic flux control means of the present invention.

FIG. 53A shows the state in which the stress application element 206 does not apply stress to the magnetostrictive member 205 and the magnetostrictive member 205 is compressed only by the pressurization means 208. At this time, the permeability of the magnetostrictive member 205 is decreased slightly according to the stress applied by the pressurization means 208, the magnetic resistance is increased slightly, and the amount of magnetic flux flowing through the soft magnetic member 202U, the magnetostrictive member 205, and the soft magnetic member 202D is decreased slightly.

Figure 53B:
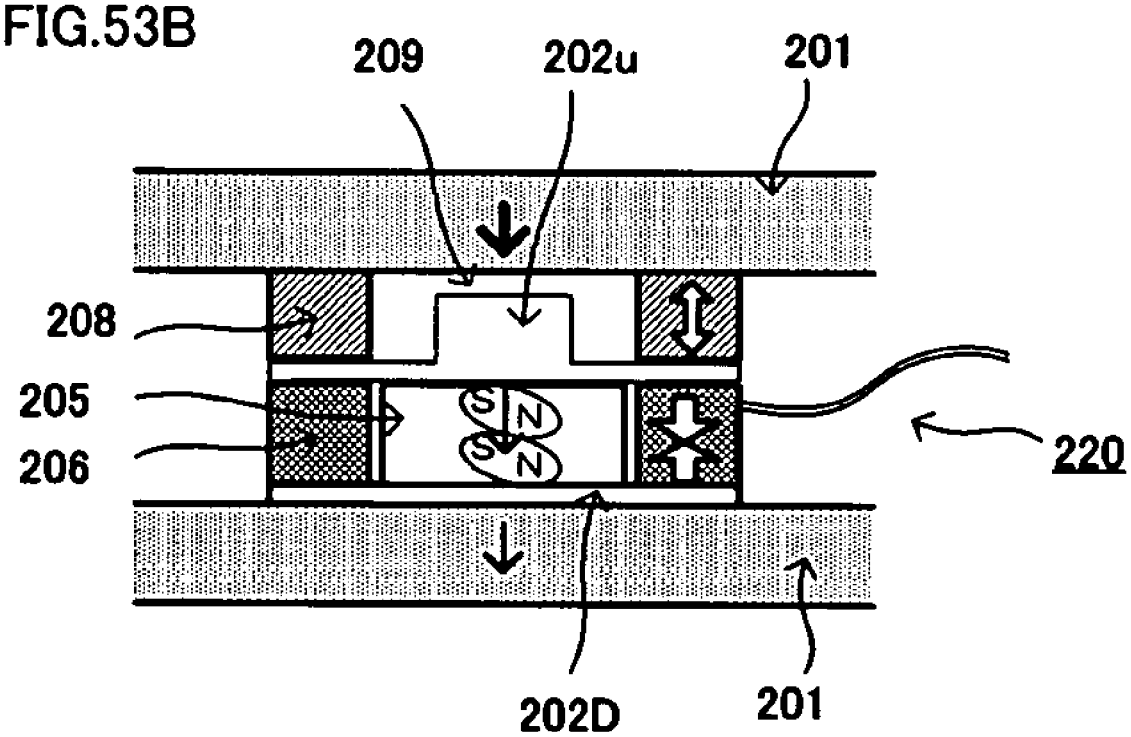

On the other hand, FIG. 53B shows the state in which the stress application element 206 applies stress to the magnetostrictive member 205 and the magnetostrictive member 205 is compressed by both the stress application element 206 and the pressurization means 208. At this time, the permeability of the magnetostrictive member 205 becomes low, the magnetic resistance becomes high, and the amount of magnetic flux flowing through the soft magnetic member 202U, the magnetostrictive member 205, and the soft magnetic member 202D is decreased greatly.

The pressurization means 208 can adjust the pressurization force by the voltage applied to the piezoelectric member to control the amount of magnetic flux.

As in the first configuration example, when the magnetostrictive member 205 is compressed in the second and third configuration examples, a gap 209 is generated between the soft magnetic member 202U (or soft magnetic member 202D) and a magnetic path 201. This gap 209, normally high in magnetic resistance, further decreases the amount of magnetic flux.

The magnetic flux control means in the second and third configuration examples can also be arranged in a laminated form. FIG. 54 is a diagram showing the laminated arrangement of magnetic flux control means in the second configuration example, and FIG. 55 is a diagram showing the laminated arrangement of magnetic flux control means in the third configuration example. Although four magnetic flux control means, 210a-210d and 220a-220d, are laminated in the examples in FIG. 54 and FIG. 55, respectively, the number of laminations is not limited to four.

Figure 54A:
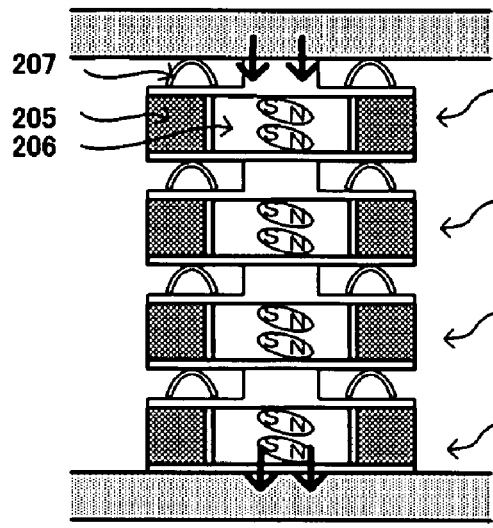
FIG. 54 is a diagram showing the laminated configuration of magnetic flux control means in a second configuration example of the present invention.
Figure 54B:
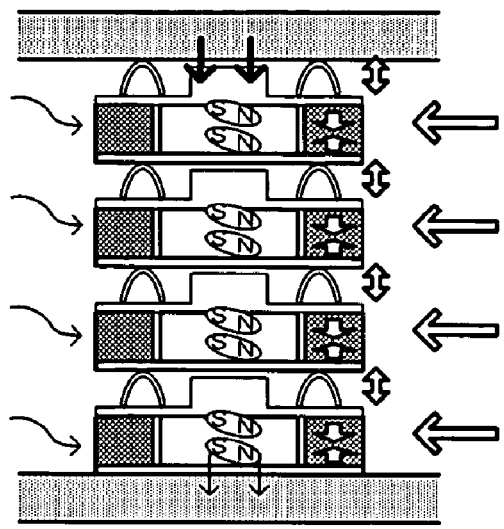
Figure 54C:
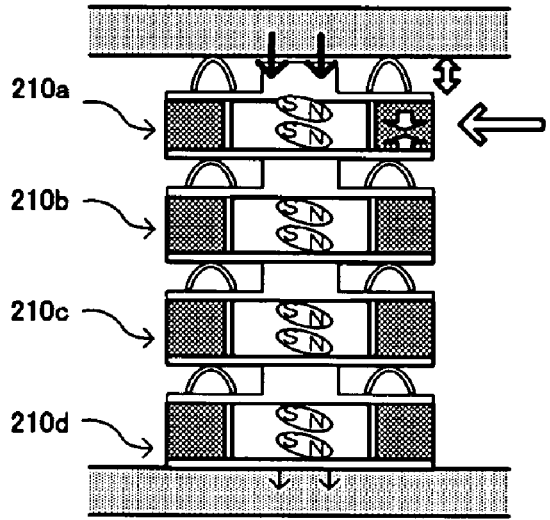
Figure 54D:
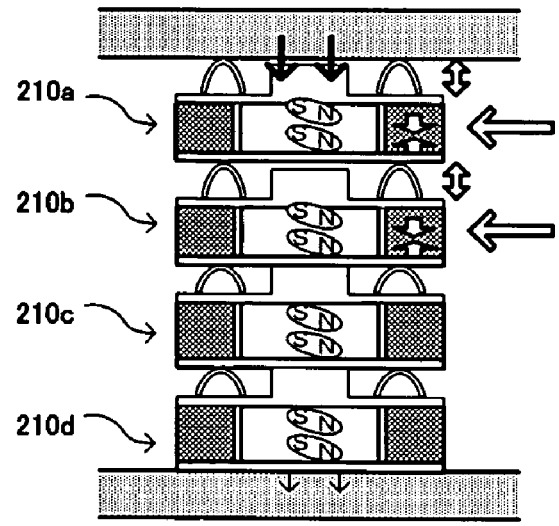

FIG. 54A shows the state in which none of magnetic flux control means 210a-210d are compressed, FIG. 54B shows the state in which all magnetic flux control means 210a-210d are compressed, FIG. 54C shows the state in which only the magnetic flux control means 210a is compressed, and FIG. 54D shows the state in which the magnetic flux control means 210a and 210b are compressed.

Figure 55A:
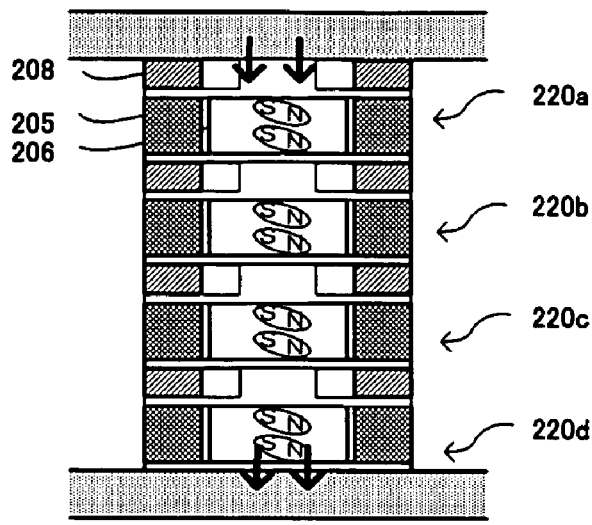
FIG. 55 is a diagram showing the laminated configuration of magnetic flux control means in a third configuration example of the present invention.
Figure 55B:
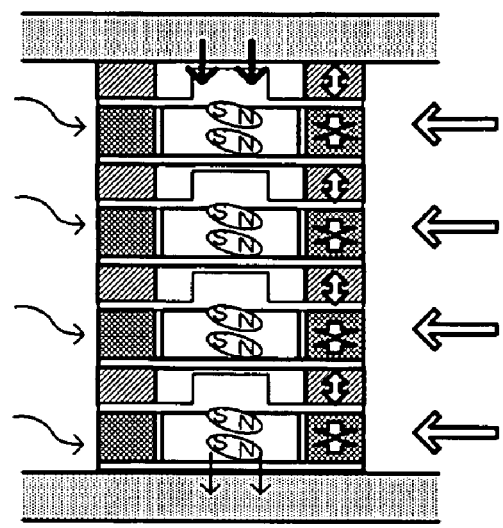
Figure 55C:
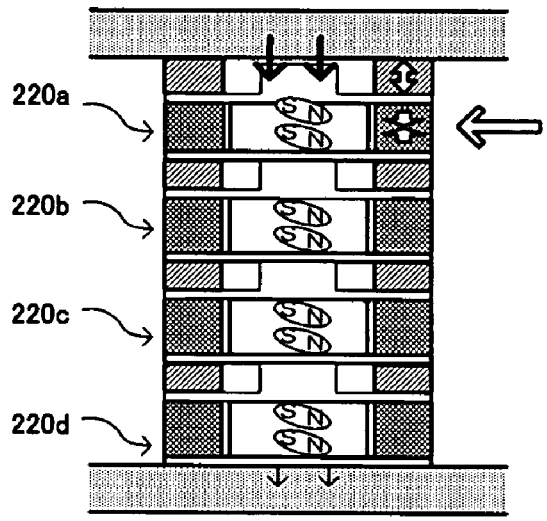
Figure 55D:
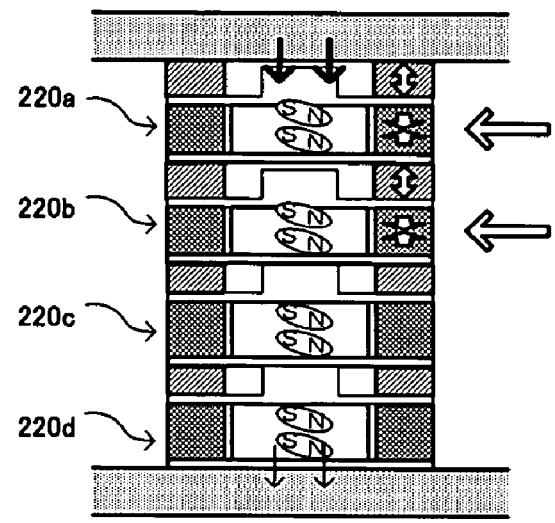

FIG. 55A shows the state in which none of magnetic flux control means 220a-220d are compressed, FIG. 55B shows the state in which all magnetic flux control means 220a-220d are compressed, FIG. 55C shows the state in which only the magnetic flux control means 220a is compressed, and FIG. 55D shows the state in which the magnetic flux control means 220a and 220b are compressed.

In this laminated configuration, the magnetic flux control means can be driven all at a time or individually as described above. When all magnetic flux control means are driven at a time, the voltage required for driving each stress application element for generating the same amount of magnetic flux can be lower than that required for driving the stress application element of single magnetic flux control means.

In addition, the individual control of the magnetic flux control means allows the amount of magnetic flux to be fine adjusted, and the flow of magnetic flux to be controlled more flexibly.

The magnetic drive apparatus according to the present invention can be applied not only to the rotational operation but also to various types of operations such as the linear operation, switching operation, and twisting operation.

The invention claimed is:

1. A magnetic drive apparatus comprising:
a rotor having a rotor magnetic flux generator;
a stator having a stator magnetic flux generator and stator magnetic paths; and
magnetic flux controller provided in intermediate positions in said stator magnetic paths for controlling a magnetic flux flowing through the stator magnetic paths,
wherein said stator magnetic paths divide both poles of said stator magnetic flux generator into multiple branches with each branch end being a magnetic pole end of a single magnetic pole that is magnetically separated,
the magnetic pole ends are arranged around said rotor at a predetermined angle,
said magnetic flux controller controls magnetic characteristics of said stator magnetic paths to control a flow of the magnetic flux flowing to said magnetic pole ends in order to switch a balance between positive and negative magnetic forces appearing at the magnetic pole ends, and
the rotor is rotated with respect to the stator by switching the balance between positive and negative magnetic forces to change a direction of the magnetic flux flowing to the rotor.
wherein said magnetic flux controller comprises a variable magnetic characteristics member whose magnetic characteristics are variable and magnetic characteristics controller for controlling magnetic characteristics of the variable magnetic characteristics member, and
said magnetic characteristics controller is next to, embedded in, or mixed with said variable magnetic characteristics member, and
wherein said magnetic characteristics controller is one of:
a stress application element that applies stress to the variable magnetic characteristics member to control magnetic characteristics of the variable magnetic characteristics member, and
a temperature application element that changes a temperature of the variable magnetic characteristics member to control magnetic characteristics of the variable magnetic characteristics member, and
wherein each of said application members controls the magnetic characteristics according to a change in a physical amount caused by a control signal.

2. The magnetic drive apparatus according to claim 1, wherein said stator has a laminated configuration in which the magnetic pole ends of the same pole are each arranged in one of different planes and each of magnetic fluxes passing between the magnetic pole ends forms a magnetic path in one of different planes via said rotor.

3. The magnetic drive apparatus according to claim 1, wherein the magnetic pole ends of said stator are arranged in the same plane and a magnetic flux passing between the magnetic pole ends forms a magnetic path via the same plane as that of a magnetic flux between a magnetic pole pair of said rotor.

4. The magnetic drive apparatus according to claim 1, wherein a part of said stator magnetic paths is crossed, one on top of the other, and the magnetic pole ends of said stator are arranged around the rotor in the same plane with the magnetic pole ends of two magnetic characteristics arranged alternately.

5. The magnetic drive apparatus according to claim 1, wherein said magnetic drive apparatus comprises a plurality of sets of said stator and said magnetic flux controller.

6. The magnetic drive apparatus according to claim 1, wherein a plurality of rotors and stators are arranged linearly, two-dimensionally, or on faces of a three-dimensional solid and said stators share a stator magnetic flux generator between neighboring rotors connected by branched stator magnetic paths.

7. The magnetic drive apparatus according to claim 1, wherein the magnetic pole ends around said rotor are arranged at an equal interval.

8. The magnetic drive apparatus according to claim 1, wherein said magnetic characteristics controller is:
a magnetic field application element that changes a magnetic field of the variable magnetic characteristics member to control magnetic characteristics of said variable magnetic characteristics member.

9. The magnetic drive apparatus according to claim 1, further comprising movement direction regulator that causes asymmetry in magnetic characteristics around said rotor for determining a rotational direction of the rotor.

10. The magnetic drive apparatus according to claim 9, wherein said movement direction regulator is notches, formed on the magnetic pole ends of said stator, for making the magnetic characteristics asymmetric with respect to said rotor.

11. The magnetic drive apparatus according to claim 9, wherein said movement direction regulator comprises a variable magnetic characteristics material provided around said rotor and magnetic characteristics controller for controlling magnetic characteristics of the variable magnetic characteristic material and
the magnetic characteristics controller selectively changes the magnetic characteristics of the variable magnetic characteristics material to make the magnetic characteristics asymmetric with respect to said rotor.

12. The magnetic drive apparatus according to claim 1, further comprising magnetic flux detector that detects an intensity of a magnetic flux flowing through a stator magnetic path leading to said magnetic pole ends for detecting a distribution of a magnetic flux flowing from the magnetic pole ends to said rotor.

13. The magnetic drive apparatus according to claim 12, wherein said magnetic flux detector, which is an induction coil or a magnetic sensor, is provided next to, or embedded in, said stator magnetic path.

14. The magnetic drive apparatus according to claim 1, further comprising a movement regulation processing unit for determining whether to rotate the rotor based on a detection signal from said magnetic flux detector.

15. The magnetic drive apparatus according to claim 1, further comprising magnetic flux adjuster for adjusting a balance of the magnetic flux in stator magnetic paths at no-operation time based on a detection signal from said magnetic flux detector.

16. The magnetic drive apparatus according to claim 1, wherein said magnetic flux adjuster also acts as said magnetic characteristics controller.

17. The magnetic drive apparatus according to claim 1, wherein each of opposed surfaces of neighboring magnetic pole ends is shaped into a concave form.

18. A magnetic drive apparatus comprising:
a rotor having a rotor magnetic flux generator;
a stator having a stator magnetic flux generator and stator magnetic paths; and magnetic flux controller provided in intermediate positions in said stator magnetic paths for controlling a magnetic flux flowing through the stator magnetic paths, wherein said stator magnetic paths divide both poles of said stator magnetic flux generator into multiple branches with each branch end being a magnetic pole end of a single magnetic pole that is magnetically separated, the magnetic pole ends are arranged around said rotor at a predetermined angle, said magnetic flux controller controls magnetic characteristics of said stator magnetic paths to control a flow of the magnetic flux flowing to said magnetic pole ends in order to switch a balance between positive and negative magnetic forces appearing at the magnetic pole ends, and the rotor is rotated with respect to the stator by switching the balance between positive and negative magnetic forces to change a direction of the magnetic flux flowing to the rotor, wherein said magnetic flux controller comprises a variable magnetic characteristics member whose magnetic characteristics are variable and magnetic characteristics controller for controlling magnetic characteristics of the variable magnetic characteristics member, and said magnetic characteristics controller is next to, embedded in, or mixed with said variable magnetic characteristics member, and wherein said variable magnetic characteristics member is a magnetostrictive member whose magnetic characteristics vary according to an application of stress and said magnetic characteristics controller is a stress application element that surrounds said magnetostrictive member and applies stress to the magnetostrictive member.

* * * * *